(12) United States Patent
Nielsen et al.

(10) Patent No.: US 9,563,863 B2
(45) Date of Patent: Feb. 7, 2017

(54) MARKING APPARATUS EQUIPPED WITH TICKET PROCESSING SOFTWARE FOR FACILITATING MARKING OPERATIONS, AND ASSOCIATED METHODS

(75) Inventors: Steven Nielsen, North Palm Beach, FL (US); Curtis Chambers, Palm Beach Gardens, FL (US); Jeffrey Farr, Jupiter, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 222 days.

(21) Appl. No.: 12/703,809

(22) Filed: Feb. 11, 2010

(65) Prior Publication Data

US 2010/0205032 A1 Aug. 12, 2010

Related U.S. Application Data

(60) Provisional application No. 61/151,760, filed on Feb. 11, 2009, provisional application No. 61/151,778, (Continued)

(30) Foreign Application Priority Data

Feb. 10, 2010 (CA) ...................................... 2692110

(51) Int. Cl.
*G06Q 10/06* (2012.01)
*G06Q 10/10* (2012.01)
(Continued)

(52) U.S. Cl.
CPC ............ *G06Q 10/063* (2013.01); *G06Q 10/06* (2013.01); *G06Q 10/0631* (2013.01);
(Continued)

(58) Field of Classification Search
USPC ....................................................... 705/7.26
See application file for complete search history.

(56) References Cited

U.S. PATENT DOCUMENTS

| 4,251,813 A | 2/1981 | Carre |
| 4,970,683 A | 11/1990 | Harshaw et al. |

(Continued)

FOREIGN PATENT DOCUMENTS

| CA | 2388572 | 5/2001 |
| CA | 2510111 | 7/2004 |

(Continued)

OTHER PUBLICATIONS

CGA, Common Ground Alliance, Best Practices, Version 1.0, Apr. 2003, 93 pages.
(Continued)

*Primary Examiner* — Matthew Gart
*Assistant Examiner* — Nadja Chong Cruz
(74) *Attorney, Agent, or Firm* — Cooley LLP

(57) ABSTRACT

Marking apparatus and methods, in which first ticket information relating to a locate request ticket is received, and second ticket information derived from the first ticket information is displayed on a display device of the marking apparatus. A field technician may provide some input to generate an electronic record or log of technician activity during a marking operation. In one example, a checklist may be generated (e.g., based at least in part on the first ticket information) and displayed locally to the technician as a guide to perform and verify various aspects of the operation. In another example, a set of instructions or "workflow" may be generated to guide the technician through a sequence of steps to perform the marking operation. Performance via a process guide (e.g., checklist or workflow) may be interactive in that the technician may provide input, or automated/
(Continued)

semi-automated by analyzing various information collected by the marking apparatus with respect to the ticket information and/or other available information germane to the operation.

62 Claims, 26 Drawing Sheets

Related U.S. Application Data filed on Feb. 11, 2009, provisional application No. 61/172,843, filed on Apr. 27, 2009, provisional application No. 61/174,081, filed on Apr. 30, 2009.

(51) Int. Cl.
  *B05B 12/08* (2006.01)
  *B05B 12/12* (2006.01)
  *B65D 83/20* (2006.01)

(52) U.S. Cl.
  CPC ... *G06Q 10/0633* (2013.01); *G06Q 10/06311* (2013.01); *G06Q 10/06398* (2013.01); *G06Q 10/063112* (2013.01); *G06Q 10/103* (2013.01); *B05B 12/08* (2013.01); *B05B 12/12* (2013.01); *B65D 83/203* (2013.01)

(56) References Cited

U.S. PATENT DOCUMENTS

| | | | |
|---|---|---|---|
| 5,267,147 A | 11/1993 | Harshaw et al. | |
| 5,399,844 A | 3/1995 | Holland | |
| 5,454,074 A | 9/1995 | Hartel et al. | |
| 5,490,089 A | 2/1996 | Smith et al. | |
| 5,546,445 A | 8/1996 | Dennison et al. | |
| 5,576,973 A | 11/1996 | Haddy | |
| 5,893,906 A * | 4/1999 | Daffin | G06Q 10/10 700/100 |
| 5,918,565 A | 7/1999 | Casas | |
| 5,920,312 A * | 7/1999 | Wagner et al. | 715/763 |
| 5,920,846 A | 7/1999 | Storch et al. | |
| 6,169,517 B1 | 1/2001 | Eslambolchi | |
| 6,262,720 B1 | 7/2001 | Jeffrey et al. | |
| 6,286,763 B1 * | 9/2001 | Reynolds | G06K 7/10386 235/472.01 |
| 6,421,725 B1 | 7/2002 | Vermilyea et al. | |
| 6,430,562 B1 | 8/2002 | Kardos et al. | |
| 6,587,851 B1 | 7/2003 | Ditcharo | |
| 6,684,250 B2 | 1/2004 | Anderson | |
| 6,751,553 B2 | 6/2004 | Young | |
| 6,751,554 B1 | 6/2004 | Asher et al. | |
| 6,753,891 B1 | 6/2004 | Chohan et al. | |
| 6,845,148 B1 | 1/2005 | Beamon | |
| 6,938,048 B1 | 8/2005 | Jilk et al. | |
| 6,941,514 B2 | 9/2005 | Bradford | |
| 6,958,690 B1 | 10/2005 | Asher et al. | |
| 7,003,443 B2 | 2/2006 | Ford | |
| 7,016,855 B2 | 3/2006 | Eaton et al. | |
| 7,111,318 B2 | 9/2006 | Vitale et al. | |
| 7,289,890 B2 | 10/2007 | Mitchell et al. | |
| 7,340,037 B1 | 3/2008 | Jean et al. | |
| 7,372,247 B1 * | 5/2008 | Giusti et al. | 324/67 |
| 7,392,486 B1 | 6/2008 | Gyde et al. | |
| 7,433,830 B2 | 10/2008 | Ingman | |
| 7,469,247 B2 | 12/2008 | Cossins et al. | |
| 7,626,496 B1 | 12/2009 | Asher et al. | |
| 7,640,105 B2 | 12/2009 | Nielsen et al. | |
| 7,773,095 B1 * | 8/2010 | Badrak et al. | 345/619 |
| 7,986,246 B2 | 7/2011 | Angelis et al. | |
| 8,311,765 B2 | 11/2012 | Nielsen et al. | |
| 8,473,148 B2 | 6/2013 | Nielsen et al. | |
| 8,480,332 B2 | 7/2013 | Miller | |
| 8,532,341 B2 | 9/2013 | Nielsen et al. | |
| 8,543,937 B2 | 9/2013 | Nielsen et al. | |
| 8,577,707 B2 | 11/2013 | Nielsen et al. | |
| 8,589,201 B2 | 11/2013 | Nielsen et al. | |
| 8,589,202 B2 | 11/2013 | Nielsen et al. | |
| 8,612,090 B2 | 12/2013 | Nielsen et al. | |
| 8,612,148 B2 | 12/2013 | Nielsen et al. | |
| 8,612,271 B2 | 12/2013 | Nielsen et al. | |
| 8,612,276 B1 | 12/2013 | Nielsen et al. | |
| 8,620,726 B2 | 12/2013 | Nielsen et al. | |
| 8,626,571 B2 | 1/2014 | Nielsen et al. | |
| 8,630,463 B2 | 1/2014 | Nielsen et al. | |
| 8,700,325 B2 | 4/2014 | Nielsen et al. | |
| 9,183,646 B2 | 11/2015 | Nielsen et al. | |
| 2001/0014877 A1 | 8/2001 | Defrancesco | |
| 2002/0032693 A1 | 3/2002 | Chiou | |
| 2002/0138543 A1 | 9/2002 | Teng et al. | |
| 2002/0143596 A1 | 10/2002 | Carmody | |
| 2002/0161604 A1 * | 10/2002 | Kardos et al. | 705/1 |
| 2002/0184068 A1 | 12/2002 | Krishnan et al. | |
| 2002/0184235 A1 | 12/2002 | Young | |
| 2002/0188562 A1 | 12/2002 | Igarashi | |
| 2003/0004776 A1 | 1/2003 | Perrella et al. | |
| 2003/0065805 A1 | 4/2003 | Barnes | |
| 2003/0110184 A1 | 6/2003 | Gibson et al. | |
| 2003/0130820 A1 | 7/2003 | Lane, III | |
| 2004/0059588 A1 | 3/2004 | Burritt | |
| 2004/0128613 A1 | 7/2004 | Sinisi | |
| 2004/0236620 A1 | 11/2004 | Chauhan et al. | |
| 2005/0027733 A1 | 2/2005 | Donahue | |
| 2005/0033620 A1 | 2/2005 | Gloor et al. | |
| 2005/0055233 A1 | 3/2005 | Wenzlau et al. | |
| 2005/0075968 A1 * | 4/2005 | Apostolides | G06Q 10/06 705/38 |
| 2005/0102173 A1 | 5/2005 | Barker et al. | |
| 2005/0182638 A1 | 8/2005 | Odent et al. | |
| 2006/0015475 A1 | 1/2006 | Birkner et al. | |
| 2006/0020417 A1 * | 1/2006 | Koch | G01C 17/28 702/150 |
| 2006/0026020 A1 | 2/2006 | Waite et al. | |
| 2006/0085133 A1 | 4/2006 | Young | |
| 2006/0085396 A1 | 4/2006 | Evans et al. | |
| 2006/0087402 A1 * | 4/2006 | Manning et al. | 340/3.1 |
| 2006/0245572 A1 | 11/2006 | Asher | |
| 2006/0282280 A1 * | 12/2006 | Stotz et al. | 705/1 |
| 2007/0083517 A1 | 4/2007 | Prince et al. | |
| 2007/0116185 A1 | 5/2007 | Savoor | |
| 2007/0129817 A1 | 6/2007 | Cadiz et al. | |
| 2007/0219722 A1 * | 9/2007 | Sawyer | G01C 15/00 702/1 |
| 2008/0021863 A1 | 1/2008 | Evans | |
| 2008/0096610 A1 | 4/2008 | Shin et al. | |
| 2008/0180319 A1 | 7/2008 | Islam | |
| 2008/0228529 A1 | 9/2008 | Willson | |
| 2008/0245299 A1 | 10/2008 | Nielsen et al. | |
| 2008/0288267 A1 | 11/2008 | Asher et al. | |
| 2008/0294988 A1 | 11/2008 | Nicholas et al. | |
| 2008/0311928 A1 | 12/2008 | Millard | |
| 2009/0013928 A1 | 1/2009 | Nielsen et al. | |
| 2009/0064171 A1 | 3/2009 | Davis et al. | |
| 2009/0132269 A1 | 5/2009 | Perrill | |
| 2009/0157746 A1 | 6/2009 | More et al. | |
| 2009/0201178 A1 | 8/2009 | Nielsen et al. | |
| 2009/0201311 A1 | 8/2009 | Nielsen et al. | |
| 2009/0202101 A1 | 8/2009 | Nielsen et al. | |
| 2009/0202110 A1 | 8/2009 | Nielsen et al. | |
| 2009/0202111 A1 | 8/2009 | Nielsen et al. | |
| 2009/0202112 A1 | 8/2009 | Nielsen et al. | |
| 2009/0204238 A1 | 8/2009 | Nielsen et al. | |
| 2009/0204466 A1 | 8/2009 | Nielsen et al. | |
| 2009/0204614 A1 | 8/2009 | Nielsen et al. | |
| 2009/0204625 A1 | 8/2009 | Nielsen et al. | |
| 2009/0207019 A1 | 8/2009 | Nielsen et al. | |
| 2009/0208642 A1 | 8/2009 | Nielsen et al. | |
| 2009/0210098 A1 | 8/2009 | Nielsen et al. | |
| 2009/0210284 A1 | 8/2009 | Nielsen et al. | |
| 2009/0210285 A1 | 8/2009 | Nielsen et al. | |
| 2009/0210297 A1 | 8/2009 | Nielsen et al. | |
| 2009/0210298 A1 | 8/2009 | Nielsen et al. | |
| 2009/0237408 A1 | 9/2009 | Nielsen et al. | |
| 2009/0238414 A1 | 9/2009 | Nielsen et al. | |

(56) References Cited

U.S. PATENT DOCUMENTS

| | | |
|---|---|---|
| 2009/0238415 A1 | 9/2009 | Nielsen et al. |
| 2009/0238416 A1 | 9/2009 | Nielsen et al. |
| 2009/0238417 A1 | 9/2009 | Nielsen et al. |
| 2009/0241045 A1 | 9/2009 | Nielsen et al. |
| 2009/0241046 A1 | 9/2009 | Nielsen et al. |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0084532 A1 | 4/2010 | Nielsen et al. |
| 2010/0085054 A1 | 4/2010 | Nielsen et al. |
| 2010/0085185 A1 | 4/2010 | Nielsen et al. |
| 2010/0085376 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0086677 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0090858 A1 | 4/2010 | Nielsen et al. |
| 2010/0094553 A1 | 4/2010 | Nielsen et al. |
| 2010/0117654 A1 | 5/2010 | Nielsen et al. |
| 2010/0149964 A1 | 6/2010 | Asher |
| 2010/0153151 A1 | 6/2010 | Toenjes |
| 2010/0161359 A1 | 6/2010 | Asher |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0201706 A1 | 8/2010 | Nielsen et al. |
| 2010/0205031 A1 | 8/2010 | Nielsen et al. |
| 2010/0205195 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0205555 A1 | 8/2010 | Nielsen et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0268786 A1 | 10/2010 | Nielsen et al. |
| 2010/0272885 A1* | 10/2010 | Olsson ............... B65D 83/203 427/137 |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0093162 A1 | 4/2011 | Nielsen et al. |
| 2011/0093304 A1 | 4/2011 | Nielsen et al. |
| 2011/0093306 A1 | 4/2011 | Nielsen et al. |
| 2011/0095885 A9 | 4/2011 | Nielsen et al. |
| 2011/0117272 A1 | 5/2011 | Nielsen et al. |
| 2011/0131081 A1 | 6/2011 | Nielsen et al. |
| 2011/0135163 A1 | 6/2011 | Nielsen et al. |
| 2011/0137769 A1 | 6/2011 | Nielsen et al. |
| 2011/0236588 A1 | 9/2011 | Nielsen et al. |
| 2011/0249394 A1 | 10/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0282542 A9 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2012/0274476 A1 | 11/2012 | Nielsen et al. |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |
| 2013/0044918 A1 | 2/2013 | Nielsen et al. |
| 2013/0085670 A1 | 4/2013 | Nielsen et al. |
| 2013/0103318 A1 | 4/2013 | Nielsen et al. |
| 2013/0135343 A1 | 5/2013 | Nielsen et al. |
| 2013/0147637 A1 | 6/2013 | Nielsen et al. |
| 2013/0174072 A9 | 7/2013 | Nielsen et al. |
| 2013/0186333 A1 | 7/2013 | Nielsen et al. |
| 2013/0194303 A1 | 8/2013 | Nielsen et al. |
| 2013/0231984 A1 | 9/2013 | Nielsen et al. |
| 2013/0233883 A1 | 9/2013 | Nielsen et al. |
| 2013/0251894 A1 | 9/2013 | Nielsen et al. |
| 2013/0265138 A1 | 10/2013 | Nielsen et al. |
| 2013/0268199 A1 | 10/2013 | Nielsen et al. |
| 2013/0287500 A1 | 10/2013 | Miller |
| 2013/0315449 A1 | 11/2013 | Nielsen et al. |
| 2014/0022272 A1 | 1/2014 | Nielsen et al. |
| 2014/0035587 A1 | 2/2014 | Nielsen et al. |
| 2014/0074970 A1 | 3/2014 | Nielsen et al. |
| 2014/0122149 A1 | 5/2014 | Nielsen et al. |
| 2014/0236656 A1 | 8/2014 | Nielsen et al. |
| 2014/0278661 A1 | 9/2014 | Nielsen et al. |
| 2014/0304041 A1 | 10/2014 | Nielsen et al. |
| 2014/0321717 A1 | 10/2014 | Nielsen et al. |
| 2014/0334878 A1 | 11/2014 | Miller |
| 2014/0347396 A1 | 11/2014 | Nielsen et al. |
| 2015/0009608 A1 | 1/2015 | Nielsen et al. |
| 2015/0149242 A1 | 5/2015 | Nielsen et al. |
| 2015/0170089 A1 | 6/2015 | Nielsen et al. |
| 2015/0185778 A1 | 7/2015 | Nielsen et al. |
| 2015/0193717 A1 | 7/2015 | Nielsen et al. |
| 2015/0234819 A1 | 8/2015 | Nielsen et al. |

(56) References Cited

U.S. PATENT DOCUMENTS

| | | | |
|---|---|---|---|
| 2015/0253449 | A1 | 9/2015 | Nielsen et al. |
| 2015/0269500 | A1 | 9/2015 | Nielsen et al. |
| 2015/0339607 | A1 | 11/2015 | Nielsen et al. |

FOREIGN PATENT DOCUMENTS

| | | |
|---|---|---|
| CA | 2579081 | 4/2008 |
| CA | 2623761 | 10/2008 |

OTHER PUBLICATIONS

CGA, Common Ground, Study of One-Call Systems and Damage Prevention Best Practices, Aug. 1999, 262 pages.
Pickus, J., "CALL USA—Automating "Call Before You Dig" Processes for a Major Utility," GITA's Annual Conference on Apr. 25-28, 2004, 19 pages.
U.S. Appl. No. 13/186,116, filed Jul. 19, 2011, Nielsen et al.
U.S. Appl. No. 12/704,485, filed Feb. 11, 2010, Nielsen et al.
U.S. Appl. No. 12/823,028, filed Jun. 24, 2010, Nielsen et al.
U.S. Appl. No. 12/837,330, filed Jul. 15, 2010, Nielsen et al.
U.S. Appl. No. 12/837,343, filed Jul. 15, 2010, Nielsen et al.
U.S. Appl. No. 12/837,353, filed Jul. 15, 2010, Nielsen et al.
U.S. Appl. No. 12/837,368, filed Jul. 15, 2010, Nielsen et al.
U.S. Appl. No. 12/837,379, filed Jul. 15, 2010, Nielsen et al.
U.S. Appl. No. 12/837,385, filed Jul. 15, 2010, Nielsen et al.
U.S. Appl. No. 12/840,461, filed Jul. 21, 2010, Nielsen et al.
U.S. Appl. No. 12/840,467, filed Jul. 21, 2010, Nielsen et al.
U.S. Appl. No. 12/840,476, filed Jul. 21, 2010, Nielsen et al.
U.S. Appl. No. 12/840,481, filed Jul. 21, 2010, Nielsen et al.
Doyle, K., UGI Utilities: Delivering enhanced service, Energy Digital, http://www.energydigital.com/company-report/ugi-utilities-delivering-enhanced-service (original publication date unknown), retrieved Aug. 1, 2011, 3 pages.
Engica, "Q4 Permit System," Dec. 2003, http://www.engica.com/DS_0302_Permit_Broc.pdf, 19 pages.
InMaps Develops Critical Database Link to Keep UGI Automation on Track, Holderness, NH, Sep. 2006, http://www.inmaps.com/InMaps-develops-critical-database-link-to-keep-ugi-automation-on-track, 1 page.
International Search Report and Written Opinion, Application No. PCT/US2010/00334, Oct. 27, 2011.
International Search Report, Application No. PCT/US2011/45198, Sep. 22, 2011.
Office Action dated Jan. 31, 2012 from U.S. Appl. No. 12/837,330.
Office Action dated Feb. 29, 2012 from U.S. Appl. No. 12/704,485.
Office Action dated Jul. 8, 2010 from Canadian Application No. 2,692,110, filed Feb. 10, 2010.
Office Action dated Oct. 11, 2011 from Canadian Application No. 2,692,110.
Office Action dated Oct. 11, 2011 from Canadian Application No. 2,706,195.
Pelican Corp., beforeUdig mobile, http://www.pelicancorp.com/index.php?option=com_content&view=article&id=145&Itemid=133, original publication date unknown, printed Aug. 30, 2011, 1 page.
Pelican Corp., DigSAFE OneCall Key Capabilities, http://www.pelicancorp.com/index.php?option=com_content&view=article&id=104&Itemid=121, original publication date unknown, printed Aug. 30, 2011, 2 pages.
Pelican Corp., DigSAFE Pro Automated Plan Response Server, http://www.pelicancorp.com/index.php?option=com_content&view=article&id=48&Itemid=68, original publication date unknown, printed Aug. 30, 2011, 2 pages.
Pelican Corp., DigSAFE Pro Automation Workflow, http://www.pelicancorp.com/index.php?option=com_content&view=article&id=119&Itemid=124, original publication date unknown, printed Aug. 30, 2011, 2 pages.
Pelican Corp., DigSAFE Pro New and Updated features for version 2.4, http://www.pelicancorp.com/index.php?option=com_content&view=article&id=151&Itemid=91, original publication date unknown, printed Aug. 30, 2011, 2 pages.
Pelican Corp., How beforeUdig works, http://www.pelicancorp.com/index.php?option=com_content&view=article&id=114&Itemid=105, original publication date unknown, printed Aug. 30, 2011, 1 page.
Pelican Corp., Using beforeUdig, http://www.pelicancorp.com/index.php?option=com_content&view=article&id=115&Itemid=106, original publication date unknown, printed Aug. 30, 2011, 1 page.
Permitprospector.com, Dec. 2009, http://web.archive.org/web/20090417141145/http://www.permitprospector.com, 3 pages.
Stahovich, David M. et al., "Automated and Integrated Call Before You Dig," Proceedings of GITA 2005, GITA's 18th Annual Conference, Mar. 6-9, 2005, Denver, CO, online: GIS for Oil & Gas Conference 2002 <http://www.gisdevelopment.net/proceedings/gita/2005/papers/76.pdf>.
UGI Utilities Selects KEMA for FLAME Project Implementation, Burlington, Massachusetts, Electric Energy Publications, Inc., Feb. 10, 2004, http://www.eet-d.com/?p.=show_news&id=17641, 2 pages.
UGI Utilities, Inc., FLAME Project White Paper, (original publication date unknown), received Aug. 3, 2011, 12 pages.
360 Scheduling, 360 Operations Guide 4.9.6 User Guide, 360 Technologies Ltd., Nottingham, UK, 2005-2008, 46 pages.
360 Scheduling, 360 Schema Interface 4.9.6 User Guide, 360 Technologies Ltd., Nottingham, UK, 2005-2008, 257 pages.
CGA, Common Ground Alliance, Best Practices, Version 3.0, Mar. 2006, 100 pages.
Muller et al., "A Simulation-Based Work Order Release Mechanism for a Flexible Manufacturing System," Dec. 1990, IEEE Article, pp. 599-602.
Office Action dated Mar. 14, 2012 from U.S. Appl. No. 12/837,353.
Office Action dated Mar. 27, 2012 from U.S. Appl. No. 12/837,343.
Office Action dated Mar. 28, 2012 from U.S. Appl. No. 12/837,368.
Office Action dated Mar. 28, 2012 from U.S. Appl. No. 12/837,379.
Office Action dated Mar. 28, 2012 from U.S. Appl. No. 12/840,467.
Office Action dated Mar. 28, 2012 from U.S. Appl. No. 12/840,476.
Office Action dated Mar. 29, 2012 from U.S. Appl. No. 12/840,481.
Office Action dated May 8, 2012 from U.S. Appl. No. 12/837,385.
Office Action dated Jun. 6, 2012 from U.S. Appl. No. 12/840,461.
Sasaki et al., "Development of 'Intelligent WorkFlow System' Using Know-how Acquired Based on Work Order," Dec. 1997, IEEE, pp. 430-437.
Zhang, Y. et al., "Evaluation of Auditory and Visual Feedback on Task Performance in a Virtual Assembly Environment," Presence, vol. 15, No. 6, Dec. 2006.
Opinion and Order Following Motion for Judgment on Pleadings, Jan. 21, 2015; Case 2:13-cv-00346-MSD-LRLVAED *CertusView Technologies, LLC v. S&N Locating Services*; (Eastern District of Virginia).
Memorandum of Law In Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit A to Memorandum of Law In Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J to Memorandum of Law In Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-1 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).

(56) References Cited

OTHER PUBLICATIONS

Exhibit J-2 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-3 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.* (Eastern District of Virginia).
Exhibit J-4 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-5 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-6 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-7 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.* (Eastern District of Virginia).
Exhibit J-8 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-9 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-10 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-11 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-12 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-13 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-14 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-15 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-16 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-17 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-18 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-19 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-20 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-21 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-22 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-23 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
CertusView's Response in Opposition to S&N's Motion for Exceptional Case Finding and Attorneys' Fees filed Feb. 27, 2015; Case 2:13-cv-00346-MSD-TEM; *CertusView Technologies, LLC* v. *S&N Locating Services, LLC et al.*, (Eastern District of Virginia).
Reply in Support of Defendants' Motion for Exceptional Case Finding and Attorneys' Fees filed Mar. 9, 2015; Case 2:13-cv-00346-MSD-TEM; *CertusView Technologies, LLC* v. *S&N Locating Services, LLC et al.*, (Eastern District of Virginia).
Memorandum Order regarding Functional Equivalency Objections and Sanctions Objections filed Mar. 11, 2015; Case 2:13-cv-00346-MSD-TEM; *CertusView Technologies, LLC* v. *S&N Locating Services, LLC et al.*, (Eastern District of Virginia).
Office Action dated Mar. 25, 2015 from U.S. Appl. No. 14/063,417.
U.S. Appl. No. 14/259,843, filed Apr. 23, 2014, Nielsen et al.
Office Action dated Sep. 22, 2014 from Canadian Application No. 2,692,110.
Office Action dated Sep. 4, 2014 from U.S. Appl. No. 14/259,843.
Office Action dated Feb. 24, 2014 from Canadian Application No. 2,692,110.
Office Action dated Mar. 25, 2014 from U.S. Appl. No. 12/837,343.
Office Action dated Apr. 8, 2014 from U.S. Appl. No. 12/837,368.
Notice of Allowance dated Dec. 16, 2013 from U.S. Appl. No. 12/704,485.
Virginia Pilot Project, Incorporating GPS Technology to Enhance One-Call Damage Prevention, Phase I—Electronic White Lining Project Report, Nov. 2007, 50 pages.
City of Birmingham, "Permit Inquiry System," Available Mar. 27, 2009, Retrieved on Mar. 18, 2013 from <<http://permits.informationbirmingham.com/>>, 7 pages.

(56) References Cited

OTHER PUBLICATIONS

Office Action dated Mar. 13, 2013 from Canadian Application No. 2,706,195.
Office Action dated Mar. 25, 2013 from U.S. Appl. No. 13/186,116.
Office Action dated Apr. 30, 2013 from Canadian Application No. 2,692,110.
Office Action dated May 23, 2013 from U.S. Appl. No. 12/837,343.
Office Action dated Jun. 5, 2013 from U.S. Appl. No. 12/837,368.
Office Action dated Jul. 16, 2013 from U.S. Appl. No. 12/823,028.
Office Action dated Jul. 26, 2013 from Canadian Appl. No. 2,706,195.
Patent Examination Report No. 1, Australian Application No. 2010263261, Mar. 1, 2013.
Township of Randolph, "Construction Permits," Available Online Mar. 30, 2009, Retrieved Mar. 19, 2013 from <<http://www.randolphnj.org/townhall/construction_permits/>>, 2 pages.
Office Action dated Oct. 9, 2013 from U.S. Appl. No. 13/186,116.
Weld County: Department of Public Works, "Permits and Applications—Public Works," available online Jun. 7, 2010 at http://www.co.weld.co.us/Departments/PublicWorks/Permits/Applications.html.
Office Action dated Oct. 8, 2013 from Canadian Application No. 2,692,110.
Dockter, L., Development of an Underground Utility Damage Prevention Plan (UUDPP) for Company XYZ, The Graduate College, University of Wisconsin-Stout, 2008, http://www2.uwstout.edu/content/lib/thesis/2008/2008dockterl.pdf.
Office Action dated Apr. 15, 2014 from U.S. Appl. No. 12/840,467.
Office Action dated Jul. 8, 2013 from U.S. Appl. No. 12/840,467.
Responsive Expert Report of Dr. Randel Dymond, P.E. to the Expert Report of Mr. Ivan Zatkovich dated Sep. 30, 2014, filed Nov. 13, 2014; *CertusView Technologies, LLC v. S&N Locating Services, LLC et al.*, (Eastern District of Virginia).
CertusView's Reply in Support of its Motion to Strike and in the Alternative Dismiss S&N's First Amended Answer and Counterclaims filed Mar. 2, 2015; *CertusView Technologies, LLC v. S&N Locating Services, LLC et al.*, (Eastern District of Virginia).
CertusView's Request for Leave to File a Sur-Reply in Support of its Opposition to Defendants' Motion for Attorney's Fees filed Mar. 18, 2015; *CertusView Technologies, LLC v. S&N Locating Services, LLC et al.*, (Eastern District of Virginia).
Defendants' Response to CertusView's Motion to Strike and in the Alternative Dismiss S&N's First Amended Answer and Counterclaims filed Feb. 23, 2015; *CertusView Technologies, LLC v. S&N Locating Services, LLC et al.*, (Eastern District of Virginia).
Defendant's Response to CertusView's Objections to the Magistrate Judge's Order Awarding Sanctions on S&N's Motion to Compel filed Feb. 23, 2015; *CertusView Technologies, LLC v. S&N Locating Services, LLC et al.*, (Eastern District of Virginia).
Defendants' Response to CertusView's Objections to the Magistrate Judge's Order Allowing S&N's Amended Answer and Counterclaims filed Feb. 17, 2015; Case 2:13-cv-00346-MSD-TEM; *CertusView Technologies, LLC v. S&N Locating Services, LLC et al.*, (Eastern District of Virginia).
Opinion and Order to Plaintiffs Rule 72 Objections to the Magistrate Judge's Jan. 16, 2015 Order Granting Defendant's Leave to Amend their Answer and Counterclaims, and on Plaintiff's Motion to Strike and in the Alternative Dismiss S&N's First Amended Answer and Counterclaims, filed May 22, 2015; *CertusView Technologies, LLC v. S&N Locating Services, LLC et al.*, (Eastern District of Virginia).
Common Ground Alliance, Best Practices Version 6.0, Feb. 2009, online: CGA Best Practices Archive; http://www.commongroundalliance.com; 104 pages.
Office Action dated Mar. 20, 2015 from Canadian Application No. 2,706,195.
Office Action dated May 19, 2015 from Canadian Application No. 2,885,962.
Office Action dated May 15, 2015 from U.S. Appl. No. 13/186,116.
Notice of Filing of Defendants' Second Amended Answer and Counterclaims filed Jun. 12, 2015; Case No. 2:13-cv-346 (MSD) (TEM); *CertusView Technologies, LLC v. S&N Locating Services, LLC et al.*, (Eastern District of Virginia).
S&N Locating Services, LLC's and S&N Communications, Inc.'s Second Amended Answer, Affirmative Defenses, and Counterclaims to Plaintiff's First Amended Complaint filed Jun. 12, 2015; Case No. 2:13-cv-346 (MSD) (TEM); *CertusView Technologies, LLC v. S&N Locating Services, LLC et al.*, (Eastern District of Virginia).
Office Action dated Jul. 7, 2015 from Canadian Application No. 2,739,094.
Memorandum in Support of CertusView's Motion for Summary Judgment on S&N's Inequitable Conduct Counterclaims filed Jul. 22, 2015; Case 2:13-cv-00346-MSD-TEM; *CertusView Technologies, LLC v. S&N Locating Services, LLC et al.*, (Eastern District of Virginia) (Parts 1, 2, 3 and 4).
Memorandum in Support of S&N's Response to CertusView's Motion for Summary Judgment on S&N's Inequitable Conduct Counterclaims filed Jul. 29, 2015; Case 2:13-cv-00346-MSD-TEM; *CertusView Technologies, LLC v. S&N Locating Services, LLC et al.*, (Eastern District of Virginia).
CertusView's Reply in Support of its Motion for Summary Judgment on S&N's Inequitable Conduct Counterclaims filed Aug. 3, 2015; Case 2:13-cv-00346-MSD-TEM; *CertusView Technologies, LLC v. S&N Locating Services, LLC et al.*, (Eastern District of Virginia).
Memorandum Order filed Aug. 7, 2015; Case 2:13-cv-00346-MSD-TEM; *CertusView Technologies, LLC v. S&N Locating Services, LLC et al.*, (Eastern District of Virginia).
City of Eugene, Department of Public Works, Policies and Procedures, Utility and Right-of-Way Permits, Construction Within and Use of the Public Way, edition Jan. 14, 2004, 60 pages.
Office Action dated Jul. 25, 2014 from U.S. Appl. No. 13/186,116.
Office Action dated May 5, 2014 from U.S. Appl. No. 12/837,385.
Office Action dated Jul. 24, 2014 from Canadian Application No. 2,706,195
Lewis et al., Spatially Enabling Office/Field Workflows at Eastern Municipal Water District, esri Vietnam, 2007, 3 pages.
Office Action dated Mar. 11, 2015 from U.S. Appl. No. 12/837,379.
Office Action dated Feb. 5, 2015 from Canadian Application No. 2,692,110.
Office Action dated Feb. 26, 2015 from U.S. Appl. No. 14/259,843.
Office Action dated Jan. 29, 2013 from U.S. Appl. No. 12/704,485.
Office Action dated Sep. 13, 2012 from Australian Patent Application No. 2010214100.
Office Action dated Oct. 12, 2012 from U.S. Appl. No. 12/837,330.
Office Action dated Oct. 24, 2012 from U.S. Appl. No. 12/837,343.
Office Action dated Oct. 24, 2012 from U.S. Appl. No. 12/837,379.
Office Action dated Oct. 31, 2012 from U.S. Appl. No. 12/837,368.
Office Action dated Nov. 8, 2012 from U.S. Appl. No. 12/837,353.
Office Action dated Nov. 21, 2012 from U.S. Appl. No. 12/840,467.
Office Action dated Nov. 21, 2012 from U.S. Appl. No. 12/840,476.
Office Action dated Nov. 21, 2012 from U.S. Appl. No. 12/840,481.
Office Action dated Dec. 7, 2012 from U.S. Appl. No. 12/823,028.
Office Action dated Jul. 16, 2012 from Canadian Application No. 2,692,110.
Office Action dated Jul. 30, 2012 from Canadian Application No. 2,706,195.
Office Action dated Dec. 5, 2012 from U.S. Appl. No. 12/840,461.
S&N Locating Services, LLC's and S&N Communications, Inc.'s First Amended Answer, Affirmative Defenses, and Counterclaims to Plaintiff's First Amended Complaint filed Jan. 23, 2015; Case No. 2:13-cv-346 (MSD) (TEM); *CertusView Technologies, LLC v. S&N Locating Services, LLC et al.*, (Eastern District of Virginia).
CertusView's Objections to the Magistrate Judge's Order Allowing S&N's Amended Answer and Counterclaims filed Feb. 2, 2015; Case No. 2:13-cv-346 (MSD) (TEM); *CertusView Technologies, LLC v. S&N Locating Services, LLC et al.*, (Eastern District of Virginia).
Office Action mailed Dec. 4, 2015 from U.S. Appl. No. 12/837,330.
Examiner's Answer to Appeal Brief dated Sep. 29, 2015 from U.S. Appl. No. 12/837,343.
Examiner's Answer to Appeal Brief dated Oct. 6, 2015 from U.S. Appl. No. 12/837,385.

(56) References Cited

OTHER PUBLICATIONS

Examiner's Answer to Appeal Brief dated Oct. 16, 2015 from U.S. Appl. No. 12/837,368.
Office Action dated Aug. 12, 2015 from U.S. Appl. No. 12/840,461.
Office Action dated Aug. 13, 2015 from U.S. Appl. No. 12/837,353.
Pipe and Cable Locator, Operations Manual, Vivax-Metrotech Corporation, 2008, 28 pages.
Pre-Excavation Checklist http:/toolboxtopics.com/Checklists/pre%20excavation%20checklist.htm, Feb. 20, 2007, 2 pages.
"Underground Utility Protection Act," retrieved from URL:http://www.pa1call.org/PA811/Public/POCS_Content/Resource_Center/Act287.aspx, signed on Oct. 9, 2008 and made effective on Oct. 9, 2008.
Griffin, J., "Reducing Damage to Underground Utilities," Underground Construction, p. 31(3), Jan. 2005.
Stout et al., "Process Devised for Monitoring Leak Threats Using GIS," Pipeline & Gas Journal, vol. 236, No. 2, pp. 32-37, Feb. 2009.
Opinion and Order filed Aug. 2, 2016; Case 2:13-cv-346-MSD-RJK; *CertusView Technologies, LLC* v. *S&N Locating Services, LLC et al.* (Eastern District of Virginia).
Opinion and Order Denying Plaintiff's Motion for Partial Reconsideration of the Court's Judgment of Patent Ineligibility under 35 U.S.C. § 101 filed Aug. 10, 2016; Case 2:13-cv-346-MSD-RJK; *CertusView Technologies, LLC* v. *S&N Locating Services, LLC et al.* (Eastern District of Virginia).

\* cited by examiner

Ticket 205

302 — ----------PENNSYLVANIA UNDERGROUND UTILITY LINE PROTECTION REQUEST----------

304A — Serial Number--[20083771309]-[000] Channel#--[2013026][0313]

Message Type--[NEW][EXCAVATION][ROUTINE]

County--[BUCKS]            Municipality--[BENSALEM TWP]
Work Site--[4600 STREET RD]
    Nearest Intersection--[RT 1]    Second Intersection--[]
    Subdivision--[]                 Site Marked in White--[Y]
Location Information--
304B —  [STARTING AT POLE NUMBER 24860 AT THE ENTRANCE OF TREVOSE CORPORATE CENTER
    AND PROCEEDING IN THE GRASS AROUND THE SIDE OF THE BLDG, THEN CROSS THE
    PARKING LOT TO THE BLDG.]
    Caller Lat/Lon--[]
Mapped Type--[P]  Mapped Lat/Lon--
    [40.132592/-74.975081,40.131366/-74.976162,40.127260/-74.966020,
306 — 40.124067/-74.963559,40.126120/-74.960651,40.128714/-74.964454]
    Map Graphic--[http://www.palcall.org/ViewMap/view.aspx?sn=20083771309]

Type of Work--[INSTL CONDUIT]                      Depth--[18-30IN]
Extent of Excavation--[392FT]       Method of Excavation--[DRILL, TRENCHER]
308 — Street--[ ] Sidewalk--[ ] Pub Prop--[ ] Pvt Prop--[X] Other--[]

Lawful Start Dates--[06-Jan-09] Through [15-Jan-09]
        Scheduled Excavation Date--[06-Jan-09] Dig Time--[0700] Duration--[3 DAYS]
                Response Due Date--[05-Jan-09]

310 — Caller--[ JOE LOCATOR ]            Phone--[ 123-456-7890 ] Ext--[]
Excavator--[JACK SMITH CONSTRUCTION]     Homeowner/Business--[B]
Address--[17 WILLOW RD]
City--[PALMER]                 State--[PA] Zip--[18045]
FAX--[610-258-9238] Email--[JACKSMITHLLC@YAHOO.COM]
Work Being Done For--[VERIZON FTTP AND INFRASOURCE]

312 — Person to Contact--[ANDREW JONES]          Phone--[732-690-8274] Ext--[]
Best Time to Call--[ANYTIME ]

316 — Prepared--[31-Dec-08] at [2019] by [JANE DOE]

Job Number--[8A37020-002]

314 — Remarks---
    []

FP 0  FP =BUCKS CNTY W&SA    HR 0  HR =AQUA PA INC         HR10  HR1=BENSALEM TWP
KD 0  KD =PECO WRTR          XZ 0  XZ =COMCAST CABLE B     YI 0  YI =VERIZON BRSM

Serial Number--[20083771309]-[000]

---------- Copyright (c) 2008 by Pennsylvania One Call System, Inc. ----------

FIG. 4

Work Order
215

512
502
514A
514B
508
504

506

510

516

```
Work Order Id:  28955

Ticket Number:  20083771309-000

Scheduled Work Begin Date/Time:    04-Jan-2009  9:00AM
Expected Duration:                 1 Hour Due Date:   05-Jan-2009
Type:       Utility Locate
Priority:   3-ROUTINE Dispatch Address:
    Address1:   4600 E STREET RD
    Address2:
    Address3:
    City:       Feasterville Trevose    State:  PA  Zip: 18045
    County:     BUCKS         Municipality: BENSALEM TWP
    Nearest Intersection:   RT 1    Second Intersection: {}

Excavation Information:
    Work Being Done For:    VERIZON  FTTP  AND INFRASOURCE
    Project Type:
    Type of Work:       INSTL CONDUIT       Depth:      18-30IN
    Extent:             392FT               Method:     DRILL, TRENCHER
    Street--[ ] Sidewalk--[ ] Pub Prop--[ ] Pvt Prop--[X] Other--[]

Excavator Information:
    Name:       JACK SMITH CONSTRUCTION     Homeowner/Business--[B]
    Address:    17 WILLOW RD
    City:       PALMER                      State:  PA  Zip: 18045
    FAX #:      610-258-9238                Email:  JACKSMITHLLC@YAHOO.COM Site Information-
    From Address1:  4600 STREET RD      To Address1:
    From Address2:                      To Address2:
    From Address3:                      To Address3:
    City:                               State:  PA  Zip: 18045
    County:         BUCKS               Municipality: BENSALEM TWP
    Subdivision Name:                   Site Marked in White--[Y]

Locate Instructions:
    {STARTING AT POLE NUMBER 24860 AT THE ENTRANCE OF TREVOSE CORPORATE CENTER
     AND PROCEEDING IN THE GRASS AROUND THE SIDE OF THE BLDG, THEN CROSS THE
     PARKING LOT TO THE BLDG.}

Caller Information:
    Name:       JOE LOCATOR         Phone:  123-456-7890  Ext:
    Contact:    JOE LOCATOR         Phone:  123-456-7890  Ext:
    Best Time to Call:   ANYTIME Remarks--
    {}
```

Work Order Task

```
0001  Utility Locate   Gas         PECO WRTR ( KD )
0002  Utility Locate   Electric    PECO WRTR ( KD )
0003  Utility Locate   CATV        COMCAST CABLE B ( X2 )
```

FIG. 8

Checklist 1100

Electric power
- ☑ Marked
- ☐ Cleared
- ☐ Not marked or cleared

Gas
- ☐ Marked
- ☑ Cleared
- ☐ Not marked or cleared

Communications
- ☑ Marked
- ☐ Cleared
- ☐ Not marked or cleared

Water
- ☑ Marked
- ☐ Cleared
- ☐ Not marked or cleared

FIG. 11

MARKING APPARATUS EQUIPPED WITH TICKET PROCESSING SOFTWARE FOR FACILITATING MARKING OPERATIONS, AND ASSOCIATED METHODS

CROSS-REFERENCES TO RELATED APPLICATIONS

This application claims a priority benefit, under 35 U.S.C. §119(a), to Canadian application serial no. 2,692,110, entitled "Methods, Apparatus, and Systems for Facilitating and/or Verifying Locate and/or Marking Operations," filed on Feb. 10, 2010.

This application claims a priority benefit, under 35 U.S.C. §119(e), to U.S. Provisional Patent Application Ser. No. 61/174,081, filed on Apr. 30, 2009, entitled "METHODS AND APPARATUS FOR GENERATING AND PROCESSING WORKFLOWS IN CONNECTION WITH LOCATE OPERATIONS."

This application also claims a priority benefit, under 35 U.S.C. §119(e), to U.S. Provisional Patent Application Ser. No. 61/172,843, filed on Apr. 27, 2009, entitled "LOCATE TECHNICIAN CHECKLIST INTEGRATED IN A MARKING DEVICE AND/OR LOCATING EQUIPMENT AND METHODS OF USING SAME."

This application also claims a priority benefit, under 35 U.S.C. §119(e), to U.S. Provisional Patent Application Ser. No. 61/151,760, filed on Feb. 11, 2009, entitled "LOCATE TECHNICIAN CHECKLIST INTEGRATED IN A MARKING DEVICE AND/OR LOCATING EQUIPMENT AND METHODS OF USING SAME."

This application also claims a priority benefit, under 35 U.S.C. §119(e), to U.S. Provisional Patent Application Ser. No. 61/151,778, filed on Feb. 11, 2009, entitled "MARKING DEVICE THAT HAS A TICKET MANAGEMENT MECHANISM INTEGRATED THEREIN AND ASSOCIATED METHODS."

Each of the above-identified applications is incorporated by reference herein in its entirety.

BACKGROUND

Field service operations may be any operation in which companies dispatch technicians and/or other staff to perform certain activities, for example, installations, services and/or repairs. Field service operations may exist in various industries, examples of which include, but are not limited to, network installations, utility installations, security systems, construction, medical equipment, heating, ventilating and air conditioning (HVAC) and the like.

An example of a field service operation in the construction industry is a so-called "locate and marking operation," also commonly referred to more simply as a "locate and/or marking operation" (or sometimes merely as a "locate"). In a typical locate and marking operation, a locate technician visits a work site at which there is a plan to disturb the ground (e.g., excavating, digging one or more holes and/or trenches, boring, etc.) to determine a presence or an absence of one or more underground facilities (such as various types of utility cables and pipes) in a dig area to be excavated or otherwise disturbed at the work site. In some instances, a locate and marking operation may be requested for a "design" project, in which there may be no immediate plan to excavate or otherwise disturb the ground, but nonetheless information about a presence or absence of one or more underground facilities at a work site may be valuable to inform a planning, permitting and/or engineering design phase of a future construction project.

In many states, an excavator who plans to disturb ground at a work site is required by law to notify any potentially affected underground facility owners prior to undertaking an excavation activity. Advance notice of excavation activities may be provided by an excavator (or another party) by contacting a "one-call center." One-call centers typically are operated by a consortium of underground facility owners for the purposes of receiving excavation notices and in turn notifying facility owners and/or their agents of a plan to excavate. As part of an advanced notification, excavators typically provide to the one-call center various information relating to the planned activity, including a location (e.g., address) of the work site and a description of the dig area to be excavated or otherwise disturbed at the work site.

FIG. 1 illustrates an example in which a locate and marking operation is initiated as a result of an excavator 10 providing an excavation notice to a one-call center 20. An excavation notice also is commonly referred to as a "locate request," and may be provided by the excavator to the one-call center via an electronic mail message, an information entry via a website maintained by the one-call center, or a telephone conversation between the excavator and a human operator at the one-call center. The locate request may include an address or some other location-related information describing the geographic location of a work site at which the excavation is to be performed, as well as a description of the dig area (e.g., a text description), such as its location relative to certain landmarks and/or its approximate dimensions, within which there is a plan to disturb the ground at the work site. One-call centers similarly may receive locate requests for design projects (for which, as discussed above, there may be no immediate plan to excavate or otherwise disturb the ground).

Using the information provided in a locate request for planned excavation or design projects, the one-call center identifies certain underground facilities that may be present at the indicated work site. For this purpose, many one-call centers typically maintain a collection "polygon maps" which indicate, within a given geographic area over which the one-call center has jurisdiction, generally where underground facilities may be found relative to some geographic reference frame or coordinate system.

Polygon maps typically are provided to the one-call centers by underground facility owners within the jurisdiction of the one call center ("members" of the one-call center). A one-call center first provides the facility owner/member with one or more maps (e.g., street or property maps) within the jurisdiction, on which are superimposed some type of grid or coordinate system employed by the one-call center as a geographic frame of reference. Using the maps provided by the one-call center, the respective facilities owners/members draw one or more polygons on each map to indicate an area within which their facilities generally are disposed underground (without indicating the facilities themselves). These polygons themselves do not precisely indicate geographic locations of respective underground facilities; rather, the area enclosed by a given polygon generally provides an over-inclusive indication of where a given facilities owner's underground facilities are disposed. Different facilities owners/members may draw polygons of different sizes around areas including their underground facilities, and in some instances such polygons can cover appreciably large geographic regions (e.g., an entire subdivision of a residential area), which may further obfuscate the actual/precise location of respective underground facilities.

Based on the polygon maps collected from the facilities owners/members, the one-call center may in some instances create composite polygon maps to show polygons of multiple different members on a single map. Whether using single member or composite polygon maps, the one-call center examines the address or location information provided in the locate request and identifies a significant buffer zone around an identified work site so as to make an over-inclusive identification of facilities owners/members that may have underground facilities present (e.g., to err on the side of caution). In particular, based on this generally over-inclusive buffer zone around the identified work site (and in some instances significantly over-inclusive buffer zone), the one-call center consults the polygon maps to identify which member polygons intersect with all or a portion of the buffer zone so as to notify these underground facility owners/members and/or their agents of the proposed excavation or design project. Again, it should be appreciated that the buffer zones around an indicated work site utilized by one-call centers for this purpose typically embrace a geographic area that includes but goes well beyond the actual work site, and in many cases the geographic area enclosed by a buffer zone is significantly larger than the actual dig area in which excavation or other similar activities are planned. Similarly, as noted above, the area enclosed by a given member polygon generally does not provide a precise indication of where one or more underground facilities may in fact be found.

In some instances, one-call centers may also or alternatively have access to various existing maps of underground facilities in their jurisdiction, referred to as "facilities maps." Facilities maps typically are maintained by facilities owners/members within the jurisdiction and show, for respective different utility types, where underground facilities purportedly may be found relative to some geographic reference frame or coordinate system (e.g., a grid, a street or property map, latitude and longitude coordinates, etc.). Facilities maps generally provide somewhat more detail than polygon maps provided by facilities owners/members; however, in some instances the information contained in facilities maps may not be accurate and/or complete. For at least this reason, whether using polygon maps or facilities maps, as noted above the one-call center utilizes a significant buffer zone around an identified work site so as to make an over-inclusive identification of facilities owners/members that may have underground facilities present.

Once facilities implicated by the locate request are identified by a one-call center (e.g., via the polygon map/buffer zone process), the one-call center generates a "locate request ticket" (also known as a "locate ticket," or simply a "ticket"). The locate request ticket essentially constitutes an instruction to inspect a work site and typically identifies the work site of the proposed excavation or design and a description of the dig area, typically lists on the ticket all of the underground facilities that may be present at the work site (e.g., by providing a member code for the facility owner whose polygon falls within a given buffer zone), and may also include various other information relevant to the proposed excavation or design (e.g., the name of the excavation company, a name of a property owner or party contracting the excavation company to perform the excavation, etc.). The one-call center sends the ticket to one or more underground facility owners 40 and/or one or more locate service providers 30 (who may be acting as contracted agents of the facility owners) so that they can conduct a locate and marking operation to verify a presence or absence of the underground facilities in the dig area. For example, in some instances, a given underground facility owner 40 may operate its own fleet of locate technicians (e.g., locate technician 45), in which case the one-call center 20 may send the ticket to the underground facility owner 40. In other instances, a given facility owner 40 may contract with a locate service provider 30 to receive locate request tickets and perform locate and marking operations on behalf of the facility owner 40. In response to a received locate request ticket, the locate service provider may dispatching a locate technician 50 to verify a presence or absence of the underground facilities in the prescribed dig area.

Upon receiving the locate ticket, a locate service provider or a facility owner (hereafter referred to as a "ticket recipient") may dispatch a locate technician to the work site of planned excavation to determine a presence or absence of one or more underground facilities in the dig area to be excavated or otherwise disturbed. A typical first step for the locate technician includes utilizing an underground facility "locate device," which is an instrument or set of instruments (also referred to commonly as a "locate set") for detecting facilities that are concealed in some manner, such as cables and pipes that are located underground. The locate device is employed by the technician to verify the presence or absence of underground facilities indicated in the locate request ticket as potentially present in the dig area (e.g., via the facility owner member codes listed in the ticket). This process is often referred to as a "locate operation."

In one example of a locate operation, an underground facility locate device is used to detect electromagnetic fields that are generated by an applied signal provided along a length of a target facility to be identified. In this example, a locate device may include both a signal transmitter to provide the applied signal (e.g., which is coupled by the locate technician to a tracer wire disposed along a length of a facility), and a signal receiver which is generally a hand-held apparatus carried by the locate technician as the technician walks around the dig area to search for underground facilities. The transmitter is connected via a connection point to a target object (in this example, underground facility) located in the ground, and generates the applied signal coupled to the underground facility via the connection point (e.g., to a tracer wire along the facility), resulting in the generation of a magnetic field. The magnetic field in turn is detected by the locate receiver, which itself may include one or more detection antenna. The locate receiver indicates a presence of a facility when it detects electromagnetic fields arising from the applied signal. Conversely, the absence of a signal detected by the locate receiver of generally indicates the absence of the target facility.

In yet another example, a locate device employed for a locate operation may include a single instrument, similar in some respects to a conventional metal detector. In particular, such an instrument may include an oscillator to generate an alternating current that passes through a coil, which in turn produces a first magnetic field. If a piece of electrically conductive metal is in close proximity to the coil (e.g., if an underground facility having a metal component is below/near the coil of the instrument), eddy currents are induced in the metal and the metal produces its own magnetic field, which in turn affects the first magnetic field. The instrument may include a second coil to measure changes to the first magnetic field, thereby facilitating detection of metallic objects.

In addition to the locate operation, the locate technician also generally performs a "marking operation," in which the technician marks the presence (and in some cases the absence) of a given underground facility in the dig area based on the various signals detected (or not detected) during the locate operation. For this purpose, the locate technician conventionally utilizes a "marking device" to dispense a marking material on, for example, the ground, pavement, or another surface along a detected underground facility. Marking material may be any material, substance, compound, and/or element, used or which may be used separately or in combination to mark, signify, and/or indicate. Examples of marking materials may include, but are not limited to, paint, chalk, dye, and/or iron. Marking devices, such as paint marking wands and/or paint marking wheels, provide a convenient method of dispensing marking materials onto surfaces, such as onto the surface of the ground or pavement.

In some environments, arrows, flags, darts, or other types of physical marks may be used to mark the presence or absence of an underground facility in a dig area, in addition to or as an alternative to a material applied to the ground (such as paint, chalk, dye, tape) along the path of a detected utility. The marks resulting from any of a wide variety of materials and/or objects used to indicate a presence or absence of underground facilities generally are referred to as "locate marks." Often, different color materials and/or physical objects may be used for locate marks, wherein different colors correspond to different utility types. For example, the American Public Works Association (APWA) has established a standardized color-coding system for utility identification for use by public agencies, utilities, contractors and various groups involved in ground excavation (e.g., red=electric power lines and cables; blue=potable water; orange=telecommunication lines; yellow=gas, oil, steam). In some cases, the technician also may provide one or more marks to indicate that no facility was found in the dig area (sometimes referred to as a "clear").

As mentioned above, the foregoing activity of identifying and marking a presence or absence of one or more underground facilities generally is referred to for completeness as a "locate and marking operation." However, in light of common parlance adopted in the construction industry, and/or for the sake of brevity, one or both of the respective locate and marking functions may be referred to in some instances simply as a "locate operation" or a "locate" (i.e., without making any specific reference to the marking function). Accordingly, it should be appreciated that any reference in the relevant arts to the task of a locate technician simply as a "locate operation" or a "locate" does not necessarily exclude the marking portion of the overall process. At the same time, in some contexts a locate operation is identified separately from a marking operation, wherein the former relates more specifically to detection-related activities and the latter relates more specifically to marking-related activities.

Inaccurate locating and/or marking of underground facilities can result in physical damage to the facilities, property damage, and/or personal injury during the excavation process that, in turn, can expose a facility owner or contractor to significant legal liability. When underground facilities are damaged and/or when property damage or personal injury results from damaging an underground facility during an excavation, the excavator may assert that the facility was not accurately located and/or marked by a locate technician, while the locate contractor who dispatched the technician may in turn assert that the facility was indeed properly located and marked. Proving whether the underground facility was properly located and marked can be difficult after the excavation (or after some damage, e.g., a gas explosion), because in many cases the physical locate marks (e.g., the marking material or other physical marks used to mark the facility on the surface of the dig area) will have been disturbed or destroyed during the excavation process (and/or damage resulting from excavation).

U.S. Publication No. 2006/0282280, naming inventors Stotz et al. and entitled "Ticket and Data Management" (hereafter "Stotz"), is directed to a locate device (i.e., a "locator") including a GPS receiver, wherein the locate device is configured to update or reconfigure ticket data based on a located utility line. If a targeted utility line cannot be detected by the locate device for reasons such as interference or excessive depth, the locate device can nonetheless update ticket data with GPS coordinates of the undetectable utility line. GPS coordinates of the entire locate or some portion thereof can also be included in the reconfigured ticket data. Once the locate device has reconfigured the ticket data, the reconfigured ticket data may be transmitted to a network.

U.S. Publication No. 2003/0130820, naming inventor Lane, III, and entitled "Work Order System" (hereafter "Lane"), is not particularly directed to locate and/or marking operations, but rather is more generally directed to gathering and disseminating information relating to maintenance operations. More specifically, Lane discloses a work order system for maintaining and analyzing records relating to maintenance operations performed by service technicians in a hotel, apartment, office building, hospital, and the like. When performing a work order, a technician continuously logs actions taken into a system database using a wireless personal digital assistant (PDA). Via the wireless PDA, the technician can also access a decision option hierarchy that contains, at each tier or level, an alphabetically sorted list of options to be selected by the technician. Starting from high-level descriptions such as whether the work order is performed inside or outside of a building, the technician navigates through multiple option screens to drill down to a specific issue.

SUMMARY

As noted above, a locate request ticket issued by a one-call center essentially constitutes an instruction to inspect a work site and conduct a locate and/or marking operation. In practice, one-call centers in different jurisdictions may have different formats for the tickets they generate, and the information content of such tickets also may differ from jurisdiction to jurisdiction (e.g., there may or may not be a required minimum amount of information that must be included in a ticket, such as the ticket due date or deadline by which a locate and/or marking operation must be performed in response to an incoming ticket, etc.). In some instances, ticket format and/or information content may in some respects be dictated by regulations, statutes, guidelines, and the like. Also, different one-call centers may obtain information from different sources and package the information into tickets in different manners according to the information source. For example, depending on the particular excavator who provides an excavation notice and the particular one-call center that accepts and processes the excavation notice, a resulting locate request ticket may identify the location and boundaries of a proposed work site/dig area in a number of different ways (e.g., using street addresses, map grids, and/or latitudinal and longitudinal (lat/long) coordinates).

Accordingly, ticket recipients who perform and/or contract out locate and/or marking operations are accustomed to the notion that presently there is no standardized format or standardized information content for locate request tickets. As such, ticket recipients conventionally employ various customized techniques for receiving tickets, deriving relevant information from tickets, and dispatching technicians in response to tickets. In some instances, dispatched technicians may be provided with copies of the tickets themselves, while in other instances they may be provided with some type of work order that includes information derived from received tickets (for purposes of the present disclosure, information included in or derived from tickets as issued by a one-call center is referred to as "ticket information"). In either case, however, Applicants have recognized and appreciated that information provided to technicians dispatched to perform a locate and/or marking operation may not necessarily be in a consistent and/or orderly format from job to job, and/or may not be complete in some respects. As a result, in some instances it may be difficult for the technician to readily, predictably, and/or consistently construe the information provided, and/or there may be significant opportunity for misunderstanding elements of the information provided, which may lead to inefficient and/or unsatisfactory locate and/or marking operations.

In view of the foregoing, various embodiments of the present invention relate to systems, methods and apparatus for facilitating and/or verifying locate and/or marking operations, for example, by providing interactive guidance to a technician working in the field based at least in part on ticket information. In various exemplary implementations described in detail below, one or more aspects of ticket information (examples of which include, but are not limited to, the use, content, formatting, organization, processing, analysis, appearance and/or presentation mode of available ticket information) are enhanced and/or improved in some manner so as to facilitate and/or verify efficient, effective and satisfactory performance of the locate and/or marking operation.

For example, in one aspect, systems, methods, and apparatus according to some inventive embodiments disclosed herein facilitate viewing of ticket information provided to a dispatched technician on a display device available in the field, such as a display device integrated with one or more pieces of locating equipment used in the field by the technician (e.g., a locate transmitter, a locate receiver, a marking device, a combined locate and marking device, etc.). More specifically, a ticket as generated by a one-call center and received by a locate contractor, for example, and/or information derived from the ticket and presented in some manner differently than the original ticket, may be displayed on one or more pieces of locating equipment used by a technician to perform a locate and/or marking operation so that the technician has ready access to such information during the operation(s) to facilitate performance thereof.

Beyond mere display of ticket information "locally" to a dispatched technician (e.g., on equipment used to perform a locate and/or marking operation), in another aspect systems, methods, and apparatus according to some inventive embodiments disclosed herein provide for some type of interaction with displayed ticket information (e.g., verifying, updating and/or manipulating ticket information) by the technician in "real-time," e.g., during performance of the locate and/or marking operation. In this manner, the technician may provide some input (e.g., via a user interface of locating equipment being used by the technician) to generate an electronic record or log of technician activity during the locate and/or marking operation, based at least in part on the ticket information.

For example, as part of a technician activity log, the technician may provide one or more indications (e.g., via the user interface) that certain facilities indicated in the ticket information were or were not located, were or were not marked, were or were not accessible, one or more characteristics of marks used, etc. Additionally, in some implementations the technician may enter (e.g., via the user interface) textual information as notes to be included in the electronic record or log of technician activity, which notes describe, for example, various aspects of the work performed during the locate and/or marking operation, the environment of the work site/dig area in which the operation(s) is/are performed, conditions present at the work site, and the like. Similarly, the technician may provide one or more digital photographs (e.g., via a digital camera, which in some instances may be integrated with/communicatively coupled to one or more pieces of locating equipment), and/or one or more voice recordings (e.g., via a digital audio recorder, which in some instances may be integrated with/communicatively coupled to one or more pieces of locating equipment) to be included in the record/log of technician activity.

In yet another aspect, systems, methods and apparatus according to some inventive embodiments disclosed herein provide for a process guide to be provided to a technician to facilitate performance of a locate and/or marking operation. Generally speaking, a process guide may include any information provided to the technician, in any of a variety of formats (e.g., text and/or graphical information displayed on a display device, one or more other visual indications, audible indications, tactile indications, etc.), that somehow facilitates performance of the locate and/or marking operation. Such information may include, but is not limited to, process recommendations and/or instructions, a list of tasks to attend to as part of the operation, requests for various information to be provided by the technician and/or acquired by the locating equipment, and the like.

For example, in one exemplary implementation, a process guide is provided as a "technician checklist" to be generated based at least in part on ticket information. In some exemplary implementations, such a checklist may be provided to the technician locally on one or more pieces of locating equipment during performance of a locate and/or marking operation and used by the technician as a guide to perform and/or verify various aspects of the operation(s). For example, a checklist may include a list of one or more types of facilities to be located and/or marked pursuant to the ticket information; as each item in the checklist is addressed by the technician, the status of the item may be "checked-off" either manually by the technician (e.g., via the user interface of the locating equipment) or automatically/semi-automatically (e.g., by analyzing various information collected by the locating equipment with respect to the ticket information and/or other information germane to the locate and/or marking operation).

In addition to or as an alternative to a technician checklist, in yet another aspect systems, methods and apparatus according to some inventive embodiments disclosed herein provide for guided locate and/or marking operations by generating, based at least in part on the ticket information, various process recommendations/instructions, prompts, alerts, and the like that may be useful to the technician when performing the locate and/or marking operation. For example, in one exemplary implementation, a ticket is processed to extract relevant information so as to generate a set of instructions and/or prompts, also referred to herein as a "workflow," for guiding the technician (e.g., in an orderly step-by-step fashion or sequence of steps) through the locate and/or marking operation. Various aspects of such a workflow may be conveyed to the technician using any of a variety of sensory mechanisms including, but not limited to, visual cues or queries (e.g., displayed on a display screen, a heads-up display (HUD) and/or one or more lighted indicators associated with one or more pieces of locating equipment), audible cues (e.g., provided by speakers or buzzers associated with one or more pieces of locating equipment), and/or tactile cues (e.g., vibrating a portion, such as a handle, of one or more pieces of locating equipment). As discussed above, in other aspects, execution of a guided locate and/or marking operation via a workflow may be interactive, in that the technician may need to respond to cues or queries (e.g., before proceeding to a next step in the workflow). Additionally, in combination with, or as an alternative to, technician responses, respective steps of a workflow may be met/verified automatically/semi-automatically (e.g., by analyzing various information collected by the locating equipment with respect to the ticket information and/or other available information germane to a given step of the workflow).

The various concepts introduced above and described in further detail below may be implemented in various apparatus associated with locate and/or marking operations. For example, ticket reception and any attendant processing, parsing, analysis, formatting, etc. of ticket information may be implemented all or in part on: one or more pieces of locating equipment used by a technician; a docking station for the one or more pieces of locating equipment (e.g., disposed in the technician's vehicle); a personal computer, personal digital assistant (PDA), or other communication/processing device used or carried by the technician and/or situated in the technician's vehicle; and/or a central server or one or more other computers (e.g., which may be operated by a locate contractor and/or facility owner dispatching technicians to perform locate and/or marking operations). Similarly, generation of one or more technician checklists and/or workflows for guided locate and/or marking operations, based at least in part on ticket information, may be accomplished all or in part by any one or more of the apparatus indicated above (e.g., one or more pieces of locating equipment; docking station; technician computer or PDA; central server or other remote computer, etc.).

In sum, one embodiment of the present invention is directed to a method for generating a process recommendation and/or instruction based on ticket data specifying a locate operation to be performed by a locate technician. The locate operation comprises identifying, using at least one physical locate mark, a presence or an absence of at least one underground facility within a dig area, wherein at least a portion of the dig area may be excavated or disturbed during excavation activities. The method comprises: A) electronically receiving the ticket data at a locate and/or marking device; B) processing the ticket data to identify information relating to the locate operation; and C) generating a process recommendation and/or instruction based at least in part on the identified information.

Another embodiment is directed to a method for generating an alert based on ticket data specifying a locate operation to be performed by a locate technician. The locate operation comprises identifying, using at least one physical locate mark, a presence or an absence of at least one underground facility within a dig area, wherein at least a portion of the dig area may be excavated or disturbed during excavation activities. The method comprises: A) electronically receiving the ticket data at a locate and/or marking device; B) processing the ticket data to identify ticket-based information relating to the locate operation; C) comparing the ticket-based information to device-based information generated by the locate and/or marking device; and D) generating an alert based at least in part on the comparison performed in C).

Another embodiment is directed to a method for generating, during a locate operation performed by a locate technician, an alert based on a facilities map of a dig area. The locate operation comprises identifying, using at least one physical locate mark, a presence or an absence of at least one underground facility within the dig area, wherein at least a portion of the dig area may be excavated or disturbed during excavation activities. The method comprises: A) electronically receiving the facilities map at a locate and/or marking device; B) processing data associated with the facilities map to identify map-based information relating to at least one facility; C) comparing the map-based information to device-based information generated by the locate and/or marking device; and D) generating an alert based at least in part on the comparison performed in C).

Another embodiment is directed to a method for automatically processing a check list for a locate operation to be performed by a locate technician. The locate operation comprises identifying, using at least one physical locate mark, a presence or an absence of at least one underground facility within a dig area, wherein at least a portion of the dig area may be excavated or disturbed during excavation activities. The method comprises: A) displaying a check list for a locate operation on a display of a locate and/or marking device, the check list comprising at least one check list item; B) determining, based at least on part on an input from at least one input device of the locate and/or marking device, a status of the at least one check list item; C) automatically updating the check list based on the determined status of the at least one check list item to generate an updated check list; and D) displaying the updated check list on the display.

Another embodiment is directed to an apparatus for use in connection with a locate operation performed by a locate technician. The locate operation comprises identifying a presence or an absence of at least one underground facility within a dig area, wherein at least a portion of the dig area may be excavated or disturbed during excavation activities. The apparatus comprises: a display device; a memory to store processor-executable instructions; and a processing unit coupled to the display device and the memory. Upon execution of the processor-executable instructions by the processing unit, the processing unit: controls the display device to display a check list for a locate operation, the check list comprising at least one check list item; determines a status of the at least one check list item; updates the check list based on the determined status of the at least one check list item to generate an updated check list; and controls the display device to display the updated check list.

Another embodiment is directed to at least one computer-readable medium encoded with instructions that, when executed on at least one processing unit, perform a method for automatically processing a check list for a locate operation to be performed by a locate technician. The locate operation comprises identifying, using at least one physical locate mark, a presence or an absence of at least one underground facility within a dig area, wherein at least a portion of the dig area may be excavated or disturbed during excavation activities. The method comprises: A) rendering, on a display, a check list for a locate operation on a display of a locate and/or marking device, the check list comprising at least one check list item; B) determining, based at least on part on an input from at least one input device of the locate and/or marking device, a status of the at least one check list item; C) automatically updating the check list based on the determined status of the at least one check list item to generate an updated check list; and D) rendering, on the display, the updated check list on the display.

Another embodiment is directed to a method for creating a check list for a locate operation performed by a locate technician. The locate operation comprises identifying, using at least one physical locate mark, a presence or an absence of at least one underground facility within a dig area, wherein at least a portion of the dig area may be excavated or disturbed during excavation activities. The method comprises: A) acquiring information concerning a locate operation from a ticket and/or an associated facilities map; B) based on the information concerning a locate operation, determining at least one action to be performed during the locate operation; and C) generating a check list for the locate operation, the check list comprising at least one check list item representing the at least one action to be performed during the locate operation.

Another embodiment is directed to an apparatus for use in connection with a locate operation performed by a locate technician. The locate operation comprises identifying a presence or an absence of at least one underground facility within a dig area, wherein at least a portion of the dig area may be excavated or disturbed during excavation activities. The apparatus comprises: a memory to store processor-executable instructions; and a processing unit coupled to the memory. Upon execution of the processor-executable instructions by the processing unit, the processing unit: acquires information concerning a locate operation from a ticket and/or an associated facilities map; based on the information concerning a locate operation, determines at least one action to be performed during the locate operation; and generates a check list for the locate operation, the check list comprising at least one check list item representing the at least one action to be performed during the locate operation.

Another embodiment is directed to at least one computer-readable medium encoded with instructions that, when executed on at least one processing unit, perform a method for creating a check list for a locate operation performed by a locate technician. The locate operation comprises identifying, using at least one physical locate mark, a presence or an absence of at least one underground facility within a dig area, wherein at least a portion of the dig area may be excavated or disturbed during excavation activities. The method comprises: A) acquiring information concerning a locate operation from a ticket and/or an associated facilities map; B) based on the information concerning a locate operation, determining at least one action to be performed during the locate operation; and C) generating a check list for the locate operation, the check list comprising at least one check list item representing the at least one action to be performed during the locate operation.

Another embodiment is directed to a method for processing a check list for a locate operation to be performed by a locate technician. The locate operation comprises identifying, using at least one physical locate mark, a presence or an absence of at least one underground facility within a dig area, wherein at least a portion of the dig area may be excavated or disturbed during excavation activities. The method comprises: A) displaying a check list for a locate operation on a display of a locate and/or marking device, the check list comprising at least one check list item; B) receiving an input concerning a status of the at least one check list item; C) updating the check list based on the status of the at least one check list item to generate an updated check list; and D) displaying the updated check list on the display.

Another embodiment is directed to an apparatus for use in connection with a locate operation performed by a locate technician. The locate operation comprises identifying a presence or an absence of at least one underground facility within a dig area, wherein at least a portion of the dig area may be excavated or disturbed during excavation activities. The apparatus comprises: a display device; a communication interface; a memory to store processor-executable instructions; and a processing unit coupled to the display device, communication interface, and the memory. Upon execution of the processor-executable instructions by the processing unit, the processing unit: controls the display device to display a check list for a locate operation on a display of a locate and/or marking device, the check list comprising at least one check list item; receives, via the communication interface, an input concerning a status of the at least one check list item; updates the check list based on the status of the at least one check list item to generate an updated check list; and controls the display device to display the updated check list.

Another embodiment is directed to at least one computer-readable medium encoded with instructions that, when executed on at least one processing unit, perform a method for processing a check list for a locate operation to be performed by a locate technician. The locate operation comprises identifying, using at least one physical locate mark, a presence or an absence of at least one underground facility within a dig area, wherein at least a portion of the dig area may be excavated or disturbed during excavation activities. The method comprises: A) rendering, on a display, a check list for a locate operation on a display of a locate and/or marking device, the check list comprising at least one check list item; B) receiving an input concerning a status of the at least one check list item; C) updating the check list based on the status of the at least one check list item to generate an updated check list; and D) rendering, on the display, the updated check list.

Another embodiment is directed to an apparatus for generating a workflow in connection with a locate operation performed by a locate technician. The locate operation comprises identifying and/or marking a presence or an absence of at least one underground facility within a dig area, wherein at least a portion of the dig area may be excavated or disturbed during excavation activities. The apparatus comprises: a communication interface; a memory to store processor-executable instructions; and a processing unit coupled to the communication interface and the memory. Upon execution of the processor-executable instructions by the processing unit, the processing unit: acquires information relating to the locate operation; acquires a workflow template, the workflow template comprising a template for a series of tasks to be performed in connection with the locate operation; based on the information relating to the a locate operation, processes the workflow template to include information specific to the locate operation and thereby generate the workflow; and controls the communication interface and/or the memory to electronically transmit and/or electronically store the workflow.

Another embodiment is directed to a method for generating a workflow in connection with a locate operation performed by a locate technician. The locate operation comprises identifying and/or marking a presence or an absence of at least one underground facility within a dig area, wherein at least a portion of the dig area may be excavated or disturbed during excavation activities. The method comprises: A) electronically acquiring information relating to the locate operation; B) electronically acquiring a workflow template, the workflow template comprising template for a series of tasks to be performed in connection with the locate operation; C) based on the information relating to the a locate operation, processing the workflow template to include information specific to the locate operation and thereby generate the workflow; and D) electronically transmitting and/or electronically storing the workflow.

Another embodiment is directed to at least one computer-readable medium encoded with instructions that, when executed on at least one processing unit, perform a method for generating a workflow in connection with a locate operation performed by a locate technician. The locate operation comprises identifying and/or marking a presence or an absence of at least one underground facility within a dig area, wherein at least a portion of the dig area may be excavated or disturbed during excavation activities. The method comprises: A) acquiring information relating to the locate operation; B) acquiring a workflow template, the workflow template comprising template for a series of tasks to be performed in connection with the locate operation; C) based on the information relating to the a locate operation, processing the workflow template to include information specific to the locate operation and thereby generate the workflow; and D) electronically transmitting and/or electronically storing the workflow.

Another embodiment is directed to an apparatus for processing a workflow in connection with a locate operation performed by a locate technician. The locate operation comprises identifying and/or marking a presence or an absence of at least one underground facility within a dig area, wherein at least a portion of the dig area may be excavated or disturbed during excavation activities. The apparatus comprises: a display device; a memory to store processor-executable instructions; and a processing unit coupled to the display device and the memory. Upon execution of the processor-executable instructions by the processing unit, the processing unit: controls the display device to display the workflow for a locate operation, the workflow comprising a series of tasks to be performed in connection with the locate operation; determines a status of at least one task of the series of tasks based on at least one input to the processing unit; and stores, in the memory, a status indication corresponding to the at least one task based on the determined status of the at least one task.

Another embodiment is directed to a method for processing a workflow in connection with a locate operation performed by a locate technician. The locate operation comprises identifying and/or marking a presence or an absence of at least one underground facility within a dig area, wherein at least a portion of the dig area may be excavated or disturbed during excavation activities. The method comprises: A) displaying, via a display device, the workflow for a locate operation, the workflow comprising a series of tasks to be performed in connection with the locate operation; B) determining a status of at least one task of the series of tasks based on at least one input; and C) storing, in memory, a status indication corresponding to the at least one task based on the determined status of the at least one task.

Another embodiment is directed to at least one computer-readable medium encoded with instructions that, when executed on at least one processing unit, perform a method for processing a workflow in connection with a locate operation performed by a locate technician. The locate operation comprises identifying and/or marking a presence or an absence of at least one underground facility within a dig area, wherein at least a portion of the dig area may be excavated or disturbed during excavation activities. The method comprises: A) rendering, via a display device, the workflow for a locate operation, the workflow comprising a series of tasks to be performed in connection with the locate operation; B) determining a status of at least one task of the series of tasks based on at least one input; and C) storing, in memory, a status indication corresponding to the at least one task based on the determined status of the at least one task.

Another embodiment is directed to a marking apparatus for performing a marking operation to mark on ground, pavement, or other surface a presence or an absence of at least one underground facility. The apparatus comprises: an actuator to dispense a marking material so as to form at least one locate mark on the ground, pavement or other surface to mark the presence or the absence of the at least one underground facility; at least one user interface including at least one display device; at least one communication interface; a memory to store processor-executable instructions, wherein the processor-executable instructions include ticket processing software; and a processor communicatively coupled to the memory, the at least one communication interface, the at least one user interface, and the actuator, wherein upon execution of the ticket processing software by the processor, the processor: receives via the at least one communication interface first ticket information relating to at least one locate request ticket pertaining to the marking operation; and controls the at least one display device so as to display second ticket information on the at least one display device, wherein the second ticket information is derived from the first ticket information.

Another embodiment is directed to a method for facilitating a marking operation performed by a marking apparatus to mark on ground, pavement, or other surface a presence or an absence of at least one underground facility. The method comprises: A) receiving at the marking apparatus first ticket information relating to at least one locate request ticket pertaining to the marking operation; and B) displaying on at least one display device of the marking apparatus second ticket information derived from the first ticket information.

Another embodiment is directed to at least one computer readable storage medium encoded with at least one program including processor-executable instructions that, when executed by a processor, perform a method for facilitating a marking operation performed by a marking apparatus to mark on ground, pavement, or other surface a presence or an absence of at least one underground facility. The method comprises: A) displaying on at least one display device of the marking apparatus ticket information derived from at least one locate request ticket pertaining to the marking operation.

Another embodiment is directed to an apparatus for facilitating a locate and/or marking operation, the locate and/or marking operation comprising detecting and/or marking a presence or an absence of at least one underground facility within a dig area, wherein at least a portion of the dig area is planned to be excavated or disturbed during excavation activities. The apparatus comprises: at least one communication interface; a memory to store processor-executable instructions, wherein the processor-executable instructions include ticket processing software; and a processor communicatively coupled to the memory and the at least one communication interface, wherein upon execution of the ticket processing software by the processor, the processor: A) receives via the at least one communication interface ticket information relating to at least one locate request ticket pertaining to the locate and/or marking operation; and B) generates and/or executes a process guide for the locate and/or marking operation based at least in part on the ticket information.

Another embodiment is directed to a method for facilitating a locate and/or marking operation, the locate and/or marking operation comprising detecting and/or marking a presence or an absence of at least one underground facility within a dig area, wherein at least a portion of the dig area is planned to be excavated or disturbed during excavation activities. The method comprises: A) electronically receiving first ticket information relating to at least one locate request ticket pertaining to the locate and/or marking operation; and B) generating a process guide for the locate and/or marking operation based at least in part on the first ticket information.

Another embodiment is directed to at least one computer readable medium encoded with at least one program including processor-executable instructions that, when executed by a processor, perform a method for facilitating a locate and/or marking operation, the locate and/or marking operation comprising detecting and/or marking a presence or an absence of at least one underground facility within a dig area, wherein at least a portion of the dig area is planned to be excavated or disturbed during excavation activities. The method comprises: A) electronically receiving first ticket information relating to at least one locate request ticket pertaining to the locate and/or marking operation; and B) generating a process guide for the locate and/or marking operation based at least in part on the first ticket information.

Another embodiment is directed to a computer-implemented method executed by at least one processor for generating a checklist in connection with a locate and/or marking operation to detect and/or mark a presence or an absence of at least one underground facility within a dig area, wherein at least a portion of the dig area is planned to be excavated or disturbed during excavation activities. The method comprises: A) acquiring ticket information that is derived based on a ticket and/or a work order associated with a locate and/or marking operation; B) based on the acquired ticket information, determining at least one task to be performed by a locate technician in connection with the locate and/or marking operation; and C) generating a checklist comprising a plurality of checklist items to be processed pursuant to the locate and/or marking operation, at least one of the checklist items corresponding to the at least one task to be performed by the locate technician.

Another embodiment is directed to at least one computer-readable medium encoded with instructions that, when executed, perform a method for generating a checklist in connection with a locate and/or marking operation to detect and/or mark a presence or an absence of at least one underground facility within a dig area, wherein at least a portion of the dig area is planned to be excavated or disturbed during excavation activities. The method comprises: A) acquiring ticket information derived based on a ticket and/or a work order associated with a locate and/or marking operation; B) based on the acquired ticket information, determining at least one task to be performed by a locate technician in connection with the locate and/or marking operation; and C) generating a checklist comprising a plurality of checklist items to be processed pursuant to the locate and/or marking operation, at least one of the checklist items corresponding to the at least one task to be performed by the locate technician.

Another embodiment is directed to a system for generating a checklist in connection with a locate and/or marking operation to detect and/or mark a presence or an absence of at least one underground facility within a dig area, wherein at least a portion of the dig area is planned to be excavated or disturbed during excavation activities. The system comprising at least one processor programmed to: A) acquire ticket information derived based on a ticket and/or a work order associated with a locate and/or marking operation; B) based on the acquired ticket information, determine at least one task to be performed by a locate technician in connection with the locate and/or marking operation; and C) generate a checklist comprising a plurality of checklist items to be processed pursuant to the locate and/or marking operation, at least one of the checklist items corresponding to the at least one task to be performed by the locate technician.

Another embodiment is directed to a computer-implemented method for processing a checklist in connection with a locate and/or marking operation to detect a presence or an absence of at least one underground facility within a dig area, wherein at least a portion of the dig area is planned to be excavated or disturbed during excavation activities. The method comprises: A) displaying a checklist to a locate technician performing a locate and/or marking operation, the checklist comprising a plurality of checklist items to be processed pursuant to the locate and/or marking operation; B) determining a status of at least one of the checklist items based at least in part on an input received in connection with the locate and/or marking operation; and C) generating an updated checklist based on the status of the at least one of the checklist items.

Another embodiment is directed to at least one computer-readable medium encoded with instructions that, when executed, perform a method for processing a checklist in connection with a locate and/or marking operation to detect a presence or an absence of at least one underground facility within a dig area, wherein at least a portion of the dig area is planned to be excavated or disturbed during excavation activities. The method comprises: A) displaying a checklist to a locate technician performing a locate and/or marking operation, the checklist comprising a plurality of checklist items to be processed pursuant to the locate and/or marking operation; B) determining a status of at least one of the checklist items based at least in part on an input received in connection with the locate and/or marking operation; and C) generating an updated checklist based on the status of the at least one of the checklist items.

Another embodiment is directed to a system for processing a checklist in connection with a locate and/or marking operation to detect a presence or an absence of at least one underground facility within a dig area, wherein at least a portion of the dig area is planned to be excavated or disturbed during excavation activities. The system comprises at least one processor programmed to: A) display, on a display device, a checklist to a locate technician performing a locate and/or marking operation, the checklist comprising a plurality of checklist items to be processed pursuant to the locate and/or marking operation; B) determine a status of at least one of the checklist items based at least in part on an input received in connection with the locate and/or marking operation; and C) generate an updated checklist based on the status of the at least one of the checklist items.

Another embodiment is directed to a system for generating a workflow in connection with a locate and/or marking operation to detect and/or mark a presence or an absence of at least one underground facility within a dig area, wherein at least a portion of the dig area is planned to be excavated or disturbed during excavation activities. The system comprises at least one processor programmed to: A) acquire ticket information that is derived based on a ticket and/or a work order associated with a locate and/or marking operation; B) based on the acquired ticket information, generate a workflow comprising a series of tasks to be performed by a locate technician in connection with the locate and/or marking operation; and C) transmit the workflow via a communication interface and/or store the workflow in a memory.

Another embodiment is directed to a computer-implemented method executed by at least one processor for generating a workflow in connection with a locate and/or marking operation to detect and/or mark a presence or an absence of at least one underground facility within a dig area, wherein at least a portion of the dig area is planned to be excavated or disturbed during excavation activities. The method comprises: A) acquiring ticket information that is derived based on a ticket and/or a work order associated with a locate and/or marking operation; B) based on the acquired ticket information, generating a workflow comprising a series of tasks to be performed by a locate technician in connection with the locate and/or marking operation; and C) transmitting the workflow via a communication interface and/or storing the workflow in a memory.

Another embodiment is directed to at least one computer-readable medium encoded with instructions that, when executed, perform a method for generating a workflow in connection with a locate and/or marking operation to detect and/or mark a presence or an absence of at least one underground facility within a dig area, wherein at least a portion of the dig area is planned to be excavated or disturbed during excavation activities. The method comprises: A) acquiring ticket information that is derived based on a ticket and/or a work order associated with a locate and/or marking operation; B) based on the acquired ticket information, generating a workflow comprising a series of tasks to be performed by a locate technician in connection with the locate and/or marking operation; and C) transmitting the workflow via a communication interface and/or storing the workflow in a memory.

Another embodiment is directed to a system for generating a workflow in connection with a locate and/or marking operation to detect and/or mark a presence or an absence of at least one underground facility within a dig area, wherein at least a portion of the dig area is planned to be excavated or disturbed during excavation activities. The system comprises at least one processor programmed to: A) acquire a workflow comprising a series of tasks to be performed in connection with a locate and/or marking operation; B) display, on a display device, one or more workflow outputs in accordance with the workflow, each workflow output being generated based on at least one of the series of tasks in the workflow; C) determine a status of at least one task of the series of tasks based on at least one input received in connection with the locate and/or marking operation; and D) generate an updated workflow based on at least in part on the status determined in C).

Another embodiment is directed to a computer-implemented method executed by at least one processor for generating a workflow in connection with a locate and/or marking operation to detect and/or mark a presence or an absence of at least one underground facility within a dig area, wherein at least a portion of the dig area is planned to be excavated or disturbed during excavation activities. The method comprises: A) acquiring a workflow comprising a series of tasks to be performed in connection with a locate and/or marking operation; B) displaying, on a display device, one or more workflow outputs in accordance with the workflow, each workflow output being generated based on at least one of the series of tasks in the workflow; C) determining a status of at least one task of the series of tasks based on at least one input received in connection with the locate and/or marking operation; and D) generating an updated workflow based on at least in part on the status determined in C).

Another embodiment is directed to at least one computer-readable medium encoded with instructions that, when executed, perform a method for generating a workflow in connection with a locate and/or marking operation to detect and/or mark a presence or an absence of at least one underground facility within a dig area, wherein at least a portion of the dig area is planned to be excavated or disturbed during excavation activities. The method comprises: A) acquiring a workflow comprising a series of tasks to be performed in connection with a locate and/or marking operation; B) displaying, on a display device, one or more workflow outputs in accordance with the workflow, each workflow output being generated based on at least one of the series of tasks in the workflow; C) determining a status of at least one task of the series of tasks based on at least one input received in connection with the locate and/or marking operation; and D) generating an updated workflow based on at least in part on the status determined in C).

For purposes of the present disclosure, the term "dig area" refers to a specified area of a work site within which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" refers to any apparatus and/or device for detecting and/or inferring the presence or absence of any facility, including without limitation, any underground facility. In various examples, a locate device may include both a locate transmitter and a locate receiver (which in some instances may also be referred to collectively as a "locate instrument set," or simply "locate set").

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "actuate" or "trigger" (verb form) are used interchangeably to refer to starting or causing any device, program, system, and/or any combination thereof to work, operate, and/or function in response to some type of signal or stimulus. Examples of actuation signals or stimuli may include, but are not limited to, any local or remote, physical, audible, inaudible, visual, non-visual, electronic, mechanical, electromechanical, biomechanical, biosensing or other signal, instruction, or event. The terms "actuator" or "trigger" (noun form) are used interchangeably to refer to any method or device used to generate one or more signals or stimuli to cause or causing actuation. Examples of an actuator/trigger may include, but are not limited to, any form or combination of a lever, switch, program, processor, screen, microphone for capturing audible commands, and/or other device or method. An actuator/trigger may also include, but is not limited to, a device, software, or program that responds to any movement and/or condition of a user, such as, but not limited to, eye movement, brain activity, heart rate, other data, and/or the like, and generates one or more signals or stimuli in response thereto. In the case of a marking device or other marking mechanism (e.g., to physically or electronically mark a facility or other feature), actuation may cause marking material to be dispensed, as well as various data relating to the marking operation (e.g., geographic location, time stamps, characteristics of material dispensed, etc.) to be logged in an electronic file stored in memory. In the case of a locate device or other locate mechanism (e.g., to physically locate a facility or other feature), actuation may cause a detected signal strength, signal frequency, depth, or other information relating to the locate operation to be logged in an electronic file stored in memory.

The terms "locate and marking operation," "locate operation," and "locate" generally are used interchangeably and refer to any activity to detect, infer, and/or mark the presence or absence of an underground facility. In some contexts, the term "locate operation" is used to more specifically refer to detection of one or more underground facilities, and the term "marking operation" is used to more specifically refer to using a marking material and/or one or more marking objects to mark a presence or an absence of one or more underground facilities. The term "locate technician" refers to an individual performing a locate operation. A locate and marking operation often is specified in connection with a dig area, at least a portion of which may be excavated or otherwise disturbed during excavation activities.

The term "user" refers to an individual utilizing a locate device and/or a marking device and may include, but is not limited to, land surveyors, locate technicians, and support personnel.

The terms "locate request" and "excavation notice" are used interchangeably to refer to any communication to request a locate and marking operation. The term "locate request ticket" (or simply "ticket") refers to any communication or instruction to perform a locate operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility. The term "historical ticket" refers to past tickets that have been completed.

The following U.S. published applications and patents are hereby incorporated herein by reference:

U.S. Pat. No. 7,640,105, issued Dec. 29, 2009, filed Mar. 13, 2007, and entitled "Marking System and Method With Location and/or Time Tracking;"

U.S. publication no. 2008-0245299-A1, published Oct. 9, 2008, filed Apr. 4, 2007, and entitled "Marking System and Method;"

U.S. publication no. 2009-0013928-A1, published Jan. 15, 2009, filed Sep. 24, 2008, and entitled "Marking System and Method;"

U.S. publication no. 2009-0238414-A1, published Sep. 24, 2009, filed Mar. 18, 2008, and entitled "Virtual White Lines for Delimiting Planned Excavation Sites;"

U.S. publication no. 2009-0241045-A1, published Sep. 24, 2009, filed Sep. 26, 2008, and entitled "Virtual White Lines for Delimiting Planned Excavation Sites;"

U.S. publication no. 2009-0238415-A1, published Sep. 24, 2009, filed Sep. 26, 2008, and entitled "Virtual White Lines for Delimiting Planned Excavation Sites;"

U.S. publication no. 2009-0241046-A1, published Sep. 24, 2009, filed Jan. 16, 2009, and entitled "Virtual White Lines for Delimiting Planned Excavation Sites;"

U.S. publication no. 2009-0238416-A1, published Sep. 24, 2009, filed Jan. 16, 2009, and entitled "Virtual White Lines for Delimiting Planned Excavation Sites;"

U.S. publication no. 2009-0237408-A1, published Sep. 24, 2009, filed Jan. 16, 2009, and entitled "Virtual White Lines for Delimiting Planned Excavation Sites;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Locate Operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0324815-A1, published Dec. 31, 2009, filed Apr. 24, 2009, and entitled "Marking Apparatus and Marking Methods Using Marking Dispenser with Machine-Readable ID Mechanism;"

U.S. publication no. 2010-0006667-A1, published Jan. 14, 2010, filed Apr. 24, 2009, and entitled "Marker Detection Mechanisms for use in Marking Devices And Methods of Using Same;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0238417-A1, published Sep. 24, 2009, filed Feb. 6, 2009, and entitled "Virtual White Lines for Indicating Planned Excavation Sites on Electronic Images;"

U.S. publication no. 2009-0202112-A1, published Aug. 13, 2009, filed Feb. 11, 2009, and entitled "Searchable Electronic Records of Underground Facility Locate Marking Operations;"

U.S. publication no. 2009-0204614-A1, published Aug. 13, 2009, filed Feb. 11, 2009, and entitled "Searchable Electronic Records of Underground Facility Locate Marking Operations;"

U.S. publication no. 2009-0327024-A1, published Dec. 31, 2009, filed Jun. 26, 2009, and entitled "Methods and Apparatus for Quality Assessment of a Field Service Operation;"

U.S. publication no. 2010-0010862-A1, published Jan. 14, 2010, filed Aug. 7, 2009, and entitled, "Methods and Apparatus for Quality Assessment of a Field Service Operation Based on Geographic Information;"

U.S. publication No. 2010-0010863-A1, published Jan. 14, 2010, filed Aug. 7, 2009, and entitled, "Methods and Apparatus for Quality Assessment of a Field Service Operation Based on Multiple Scoring Categories;"

U.S. publication no. 2010-0010882-A1, published Jan. 14, 2010, filed Aug. 7, 2009, and entitled, "Methods and Apparatus for Quality Assessment of a Field Service Operation Based on Dynamic Assessment Parameters;" and U.S. publication no. 2010-0010883-A1, published Jan. 14, 2010, filed Aug. 7, 2009, and entitled, "Methods and Apparatus for Quality Assessment of a Field Service Operation Based on Multiple Quality Assessment Criteria."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the invention;

FIG. 4 shows an example of a locate request ticket that may be processed according to various embodiments of the present invention.

FIG. 8 shows an example of a work order that may be generated via one implementation of the ticket processing method of FIG. 6 or the workforce guidance and monitoring system of FIG. 7, according to some embodiments of the present invention.

FIG. 11 illustrates an exemplary process guide in the form of checklist generated by the method of FIG. 6 or the system of FIG. 7, according to some embodiments of the present invention.

DETAILED DESCRIPTION

Figure 1:
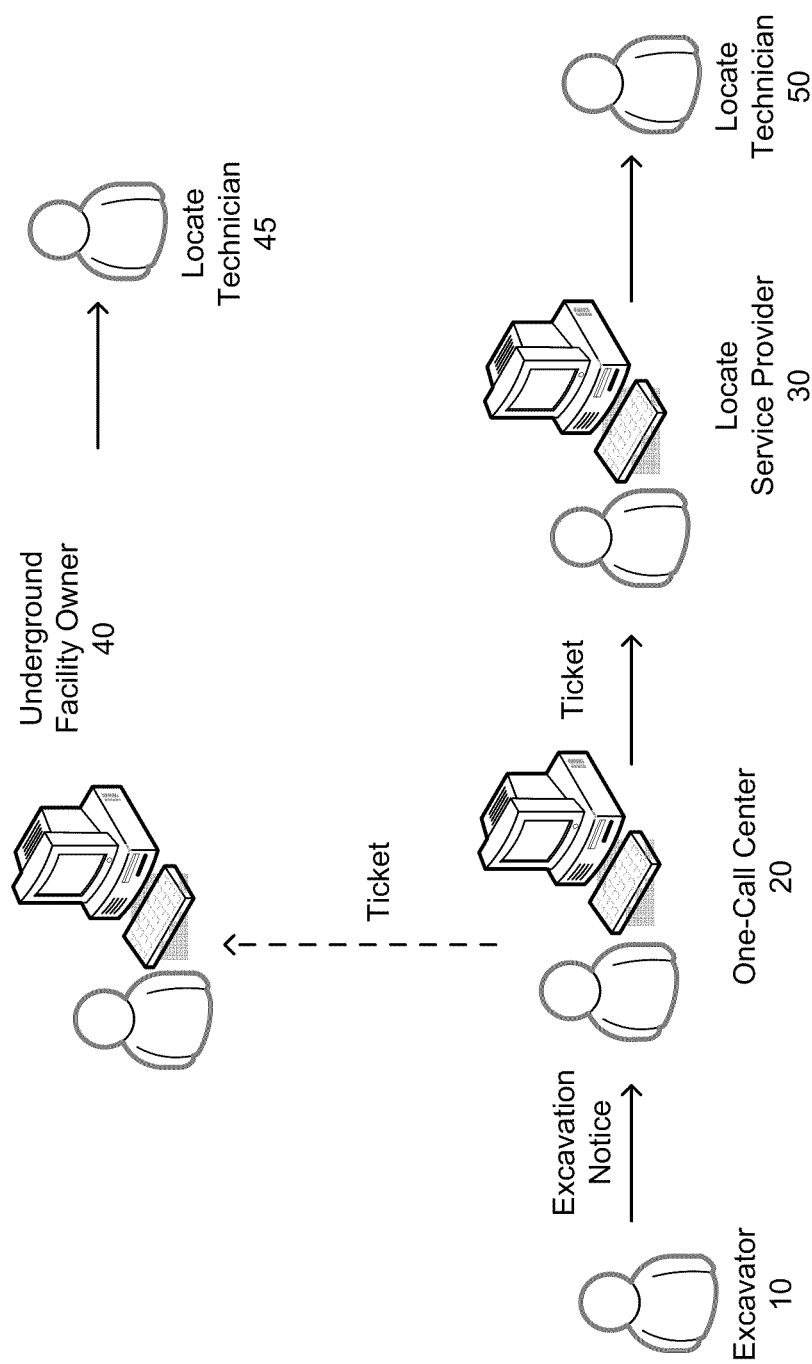
FIG. 1 shows an example in which a locate and marking operation is initiated as a result of an excavator providing an excavation notice to a one-call center.

Following below are more detailed descriptions of various concepts related to, and embodiments of, inventive systems, methods and apparatus for facilitating and/or verifying locate and/or marking operations. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

I. Overview

Applicants have recognized and appreciated that, in conventional practice, information provided to technicians dispatched to perform locate and/or marking operations may in some instances be incomplete, inaccurate and/or inconsistent in one or more aspects. Additionally, the manner in which the information is presented to the technicians may not always be consistent and/or orderly. As a result, it may be difficult for a technician to readily construe the information provided, and there may be significant opportunity for misinterpreting elements of the requested locate and/or marking operation, which may adversely affect the quality and efficiency of locate and/or marking operations. Accordingly, in various exemplary implementations described in detail below, the information provided to technicians in the field, and the presentation thereof, may be enhanced and/or improved in some manner so as to facilitate and/or verify efficient, effective and satisfactory performance of locate and/or marking operations.

Applicants have further recognized and appreciated that the lack of complete and accurate information may in some situations be beyond the control of a locate service provider. For example, the deficiencies may be due to outdated records from facilities owners and/or inaccurate dig area descriptions given by excavators. As another example, working conditions such as weather and/or traffic may have unpredictable variations. For these and other reasons, a technician may often need to respond to unanticipated circumstances in real time, as such circumstances develop, or become apparent, during the course of a locate and/or marking operation. Accordingly, in various exemplary implementations described in detail below, techniques are provided for monitoring a locate and/or marking operation in progress, continually collecting updated information through the monitoring and providing interactive guidance to a technician based on the updated information.

In various exemplary implementations described in detail below, one or more aspects of ticket information (examples of which include, but are not limited to, the use, content, formatting, organization, processing, analysis, appearance and/or presentation mode of available ticket information) are enhanced and/or improved in some manner so as to facilitate and/or verify efficient, effective and satisfactory performance of the locate and/or marking operation. For example, ticket information may be displayed to a technician in the field (e.g., on one or more pieces of locating equipment used by the technician) so as to provide ready access to such information during a locate and/or marking operation to facilitate performance thereof. As noted above, for purposes of the present disclosure "ticket information" refers to any information included in or derived from locate request tickets (e.g., as issued by a one-call center), and any enhancements and/or improvements thereto. "Locating equipment" refers to any device or apparatus used by a technician in connection with performance of a locate and/or marking operation (e.g., a locate device such as a transmitter and/or receiver, a marking device, a combined locate and marking device, etc.).

Beyond display of ticket information "locally" on equipment used to perform a locate and/or marking operation, the technician may be permitted or required to have some type of "real-time" interaction with displayed ticket information (e.g., verifying, updating and/or manipulating ticket information) during performance of the locate and/or marking operation. For example, the technician may provide one or more types of input to generate an electronic record or log of technician activity during the locate and/or marking operation. In various implementations, examples of technician input include, but are not limited to, various "simple" inputs (e.g., using an input device such as mouse, keypad, thumb pad, joystick and/or pushbutton to select an option or provide a status indication via a menu-driven graphical user interface, which may be presented on a piece of locating equipment), text entries to provide technician notes (e.g., via a keypad and/or thumb pad), voice entries (e.g., via a digital audio recorder), and digital photographs (e.g., via a digital camera).

In one embodiment, a "technician checklist" may be generated based at least in part on ticket information and may be displayed locally to a technician as a guide to perform and/or verify various aspects of a locate and/or marking operation. Such a checklist may include a list of one or more work items to be completed or otherwise attended to by the technician in any suitable ordering, which may or may not be the same as the ordering in which the checklist is presented to the technician. In some embodiments, for example, a checklist may include one or more types of facilities to be located and/or marked pursuant to the ticket information. As each item in the checklist is addressed by the technician, the status of the item may be updated (e.g., "checked-off"), either manually by the technician (e.g., via a user interface of the locating equipment) or automatically or semi-automatically (e.g., by analyzing various information collected by the locating equipment with respect to ticket information and/or other information germane to the locate and/or marking operation). The updated status and any associated notes or remarks may be transmitted in essentially real time to a remote computer for further analysis and/or review by supervisory personnel. Additional information and/or guidance may be returned to the technician upon such analysis and/or review, for example, in the event of one or more unanticipated circumstances.

In another embodiment, based at least in part on ticket information, various process recommendations, prompts, alerts, and the like that may be useful to a technician when performing a locate and/or marking operation may be generated and/or presented locally on one or more pieces of locating equipment used by the technician. In one exemplary implementation, a ticket is processed to extract relevant information so as to generate a set of instructions and/or prompts, also referred to herein as a "workflow," for guiding the technician (e.g., in an orderly step-by-step fashion or a sequence of steps) through the locate and/or marking operation. Various aspects of such a workflow may be conveyed to the technician using any of a variety of sensory mechanisms including, but not limited to, visual cues, audible cues, and/or tactile cues (e.g., by vibrating a portion, such as a handle, of one or more pieces of locating equipment). As with a checklist, a workflow may be interactive in that the technician may provide input for updating one or more aspect of the workflow, or workflow implementation may be automated or semi-automated by analyzing various information collected by the locating equipment with respect to the ticket information and/or other available information germane to the locate and/or marking operation. An updated workflow, which may or may not be completed, may also be transmitted in real time to a remote computer for further analysis and/or review by supervisory personnel.

Various concepts discussed herein relating to facilitating and/or verifying performance of a locate and/or marking operation may be implemented in one or more apparatus or devices associated with locate and/or marking operations, examples of which include, but are not limited to, one or more pieces of locating equipment used by a technician, a docking station for the one or more pieces of locating equipment (e.g., disposed in the technician's vehicle), a personal computer, personal digital assistant (PDA), a cellular phone or other communication and/or processing device used or carried by the technician and/or situated in the technician's vehicle, and/or a central server or one or more other computers (e.g., operated by a locate contractor and/or facility owner dispatching technicians to perform locate and/or marking operations). For example, reception, processing and/or use of ticket information may be accomplished entirely on one or more pieces of locating equipment used in the field; alternatively, various functionalities attendant to ticket reception, processing and/or use may be implemented primarily on a central server or remote computer, or distributed in various manners amongst one or more remote computers, a technician's personal and/or vehicle computing equipment, and/or locating equipment used in the field.

Furthermore, although the illustrated embodiments are presented in the context of locate and/or marking operations, it should be appreciated that the various inventive concepts described herein relating generally to guiding and/or monitoring a mobile workforce may be employed in settings other than locate and/or marking operations, as the present disclosure is not limited in this respect.

II. Exemplary Apparatus and System for Information Display and Interaction

Following below is a detailed discussion of a system including an exemplary remote computer and a marking device configured to implement various concepts disclosed herein in connection with facilitating and/or verifying locate and/or marking operations based on ticket information. It should be appreciated, however, that other types of locating equipment and/or one or more other computing devices may be similarly configured to implement any suitable combination of the various concepts disclosed herein, and that the discussion below regarding a remote computer in communication with a marking device is provided primarily for purposes of illustrating at least one possible implementation example. In particular, any of the concepts discussed in detail below similarly may be implemented in connection with a remote computer in communication with a locate receiver or a combined locate and marking device, or systems of one or more marking devices, locate devices, combined locate and marking devices, and one or more remote computers, as described for example in U.S. non-provisional application Ser. No. 12/571,329, entitled "Methods and Apparatus for Generating Electronic Records of Locate Operations," filed on Sep. 30, 2009, which application is hereby incorporated herein by reference.

A. Marking Device

Figure 2:
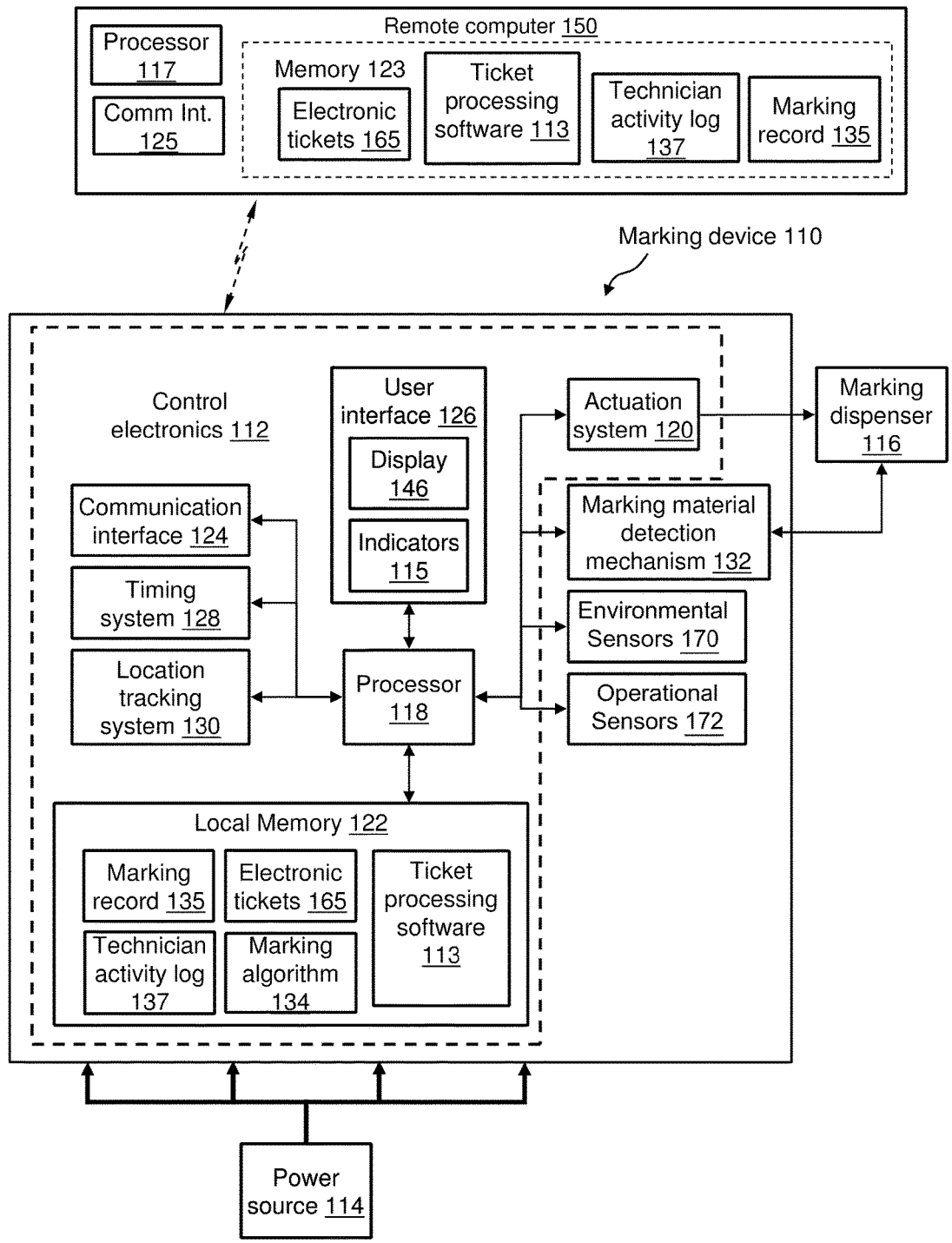
FIG. 2 is a functional block diagram of an exemplary system, including one or more remote computers and a marking device, for processing tickets to facilitate locate and/or marking operations, according to one embodiment of the present invention.
Figure 3:
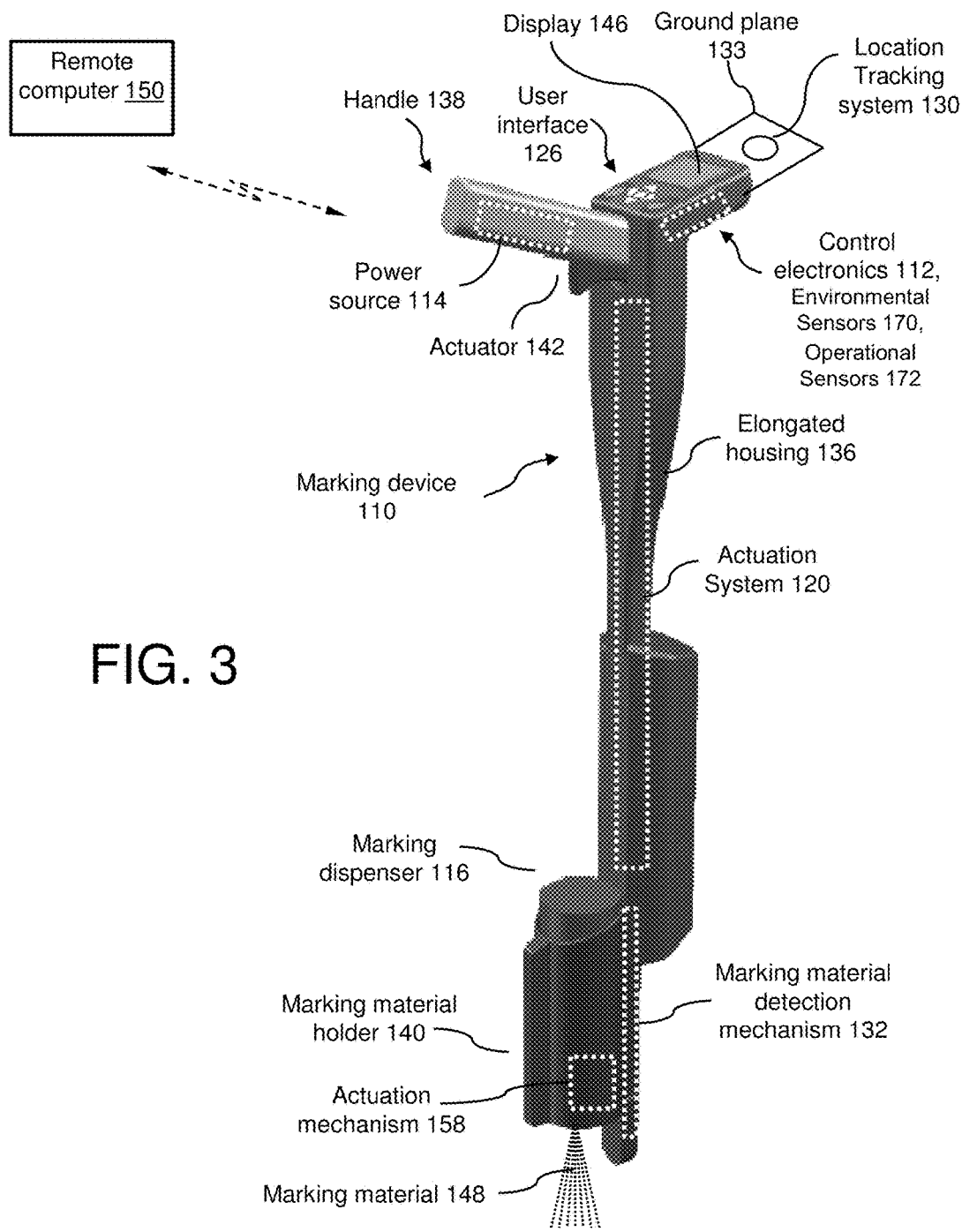
FIG. 3 is a perspective view of the system of FIG. 2, illustrating an exemplary marking device according to one embodiment of the present invention.

FIGS. 2 and 3 illustrate a functional block diagram and perspective view, respectively, of one example of a system including a marking device 110 and optionally a remote computer 150, according to one embodiment of the present invention. One or both of the marking device 110 and the remote computer 150 may be configured to receive and/or use/process tickets or ticket information according to the various concepts discussed herein (e.g., generate checklists and/or workflows to facilitate guided marking operations), as well as electronically generate and store a technician activity log including information regarding the activities of a technician attendant to a locate and/or marking operation, based at least in part on the ticket information.

As shown in FIG. 2, in one embodiment marking device 110 includes control electronics 112, the components of which are powered by a power source 114. Power source 114 may be any power source that is suitable for use in a portable device, such as, but not limited to, one or more rechargeable batteries, one or more non-rechargeable batteries, a solar photovoltaic panel, a standard AC power plug feeding an AC-to-DC converter, and the like.

The marking device 110 is configured to hold a marking dispenser 116, which as shown in FIG. 3 is loaded into a marking material holder 140 of the marking device 110. In one exemplary implementation, the marking dispenser 116 is an aerosol paint canister that contains paint; however, it should be appreciated that the present invention is not limited in this respect, as a marking material dispensed by the marking device 110 may be any material, substance, compound, and/or element, used to mark, signify, and/or indicate. Examples of marking materials may include, but are not limited to, paint, chalk, dye, and/or marking powder.

As also shown in FIG. 2, in one embodiment control electronics 112 of marking device 110 may include, but are not limited to, a processor 118, at least a portion of an actuation system 120 (another portion of which may include one or more mechanical elements), a local memory 122, a communication interface 124, a user interface 126, a timing system 128, and a location tracking system 130.

The processor 118 may be any general-purpose processor, controller, or microcontroller device. Local memory 122 may be any volatile or non-volatile data storage device, such as, but not limited to, a random access memory (RAM) device and a removable memory device (e.g., a universal serial bus (USB) flash drive). As discussed further below in Section IV, the local memory may store ticket processing software 113, which may be a set of processor-executable instructions that when executed by the processor 118 causes the processor to control various other components of the marking device 110 so as to implement various functions discussed herein in connection with ticket information (e.g., generation/display of a technician checklist, workflow, technician input, automated/semi-automated analysis of operations, generation of technician activity log, etc.). Ticket processing software 113 may be, for example, a custom algorithm. The local memory 122 also may store one or more electronic tickets 165 as well as a technician activity log 137 (e.g., generated pursuant to execution of the ticket processing software 113, as discussed further below).

The local memory 122 of the marking device 110 also may store a marking algorithm 134, which may be a set of processor-executable instructions that, when executed by the processor 118, causes the processor to control various other components of the marking device 110 to collect various information relating to use of the marking device 110 (e.g., to dispense marking material so as to mark a presence or an absence of one or more underground facilities) and generate an electronic marking record 135 of a marking operation, which record also may be stored in the local memory 122 and/or transmitted in essentially real-time (as it is being generated) or after completion of a marking operation to a remote device (e.g., remote computer 150).

While FIG. 2 shows the electronic marking record 135 and the technician activity log 137 as distinct elements stored in the local memory 122, it should be appreciated that embodiments of the present invention are not limited in this respect. In particular, various information collected as part of a locate and/or marking operation relating to detection and/or marking of underground facilities (e.g., location data relating to detection/marking, time data relating to detection/ marking, marker characteristic data, etc.), as well as other information that may relate more specifically to technician activity attendant to a locate and/or marking operation (manner in which technician conducted the operation(s), checklist of technician activities, workflow, order/sequence/ timing of technician activities, etc.) may be stored in memory as a single record relating to a given locate and/or marking operation, different components/fields of an electronic record or database, or as distinct records (e.g., relating respectively to marking information and technician activity information).

In one exemplary implementation, a Linux-based processing system for embedded handheld and/or wireless devices may be employed in the marking device 110 to implement various components of the control electronics 112. For example, the Fingertip4™ processing system, including a Marvell PXA270 processor and available from InHand Electronics, Inc. (www.inhandelectronics.com/products/fingertip4), may be used. In addition to the PXA270 processor (e.g., serving as the processor 118), the Fingertip4™ includes flash memory and SDRAM (e.g., serving as local memory 122), multiple serial ports, a USB port, and other I/O interfaces (e.g., to facilitate interfacing with one or more input devices and other components of the marking device), supports a variety of wired and wireless interfaces (WiFi, Bluetooth, GPS, Ethernet) to facilitate implementation of the communication interface 124, and connects to a wide variety of LCD displays (to facilitate implementation of a user interface/display). In yet other exemplary implementations, the processor 118 may be realized by multiple processors that divide/share some or all of the functionality discussed herein in connection with the processor 118. For example, in one implementation, an Atom™ processor available from Intel Corporation of Santa Clara, Calif., may be used alone or in connection with one or more PIC processors to accomplish various functionality described herein.

Communication interface 124 of marking device 110 may be any wired and/or wireless communication interface by which information may be exchanged between marking device 110 and an external or remote device, such as remote computer 150. Examples of wired communication interfaces may include, but are not limited to, USB ports, RS232 connectors, RJ45 connectors, Ethernet, and any combination thereof. Examples of wireless communication interfaces may include, but are not limited to, an Intranet connection, Internet, Bluetooth® technology, Wi-Fi, Wi-Max, IEEE 802.11 technology, radio frequency (RF), Infrared Data Association (IrDA) compatible protocols, Local Area Networks (LAN), Wide Area Networks (WAN), Shared Wireless Access Protocol (SWAP), combination thereof, and other types of wireless networking protocols. The wireless interface may be capable of capturing signals that reflect a user's intent. For example, the wireless interface may include a microphone that can capture a user's intent by capturing the user's audible commands. Alternatively, the wireless interface may interact with a device that monitors a condition of the user, such as eye movement, brain activity, and/or heart rate.

User interface 126 of marking device 110 may be any mechanism or combination of mechanisms by which a user may operate the marking device 110 and by which information that is received and/or generated by the marking device 110 may be presented to the user/technician. User interface 126 may include a set of indicators 115, which may comprise, for example, one or more visual indicators (e.g., LED indicators), one or more audible indicators or audio outputs (e.g., speaker, buzzer, and alarm), one or more tactile indicators, or any combination thereof.

In particular, user interface 126 may include, but is not limited to, a display device (including integrated displays and external displays, such as Head-Up Displays (HUDs)), a touch screen, one or more manual pushbuttons, one or more light-emitting diode (LED) indicators, one or more toggle switches, a keypad, one or more audible indicators (e.g., speaker, buzzer, and alarm), one or more tactile indicators or vibration generators (e.g., to vibrate a handle or other portion of the marking device), and any combination thereof. In one implementation, the user interface 126 includes a "menu/on" button to power up the marking device and provide a menu-driven graphical user interface (GUI) displayed by the display device (e.g., menu items and/or icons displayed on the display device) and navigated by the technician via a joystick or a set of four "up/down/left/right" buttons, as well as a "select/ok" button to take some action pursuant to the selection of a menu item/icon. As described below, the display may also be used in some embodiments of the invention to display tickets and/or ticket information, as well as one or more aspects of information used to generate a log of technician activity attendant to the locate and/or marking operation.

The user interface 126 also may include a speech synthesis component which, in some exemplary implementations, may function in connection with the ticket processing software 113. As is well known, speech synthesis is the artificial production of human speech. In one example, a speech synthesis component of the user interface may provide a text-to-speech (TTS) function, which converts normal language text into speech. For example, text information that is contained in or extracted from received tickets may be converted to speech and delivered to the technician via the user interface as voice information or a voice command.

In various embodiments, the one or more interfaces of the marking device 110—including the communication interface 124 and user interface 126—may be used as input devices to receive information to be stored in the memory 122 as part of various electronic records (e.g., electronic record of marking data 135, technician activity log 137). As noted above, in some cases information received via the interface(s) (e.g., via the communication interface 124) may include copies of tickets themselves (e.g., as generated by a one-call center) or other ticket information regarding underground facilities to be marked during a marking operation. As another example, using an interface such as the user interface 126, service-related information may be input, including an identifier for the marking device used by the technician, an identifier for a technician, and/or an identifier for the technician's employer. Alternatively, some or all of the service-related information similarly may be received via the communication interface 124 (and likewise some or all of the ticket information may be received via the user interface 126).

The actuation system 120 of marking device 110 shown in the block diagram of FIG. 2 may include both electrical and mechanical elements according to various embodiments discussed in further detail below, and for purposes of illustration is shown in FIG. 2 as included as part of the control electronics 112. The actuation system 120 may include a mechanical and/or electrical actuator mechanism (e.g., see the actuator 142 shown in FIG. 3) to provide one or more signals or stimuli as an input to the actuation system 120. Upon receiving one or more signals or stimuli (e.g., actuation/triggering by a locate technician or other user), the actuation system 120 causes marking material to be dispensed from marking dispenser 116. In various embodiments, the actuation system 120 may employ any of a variety of mechanical and/or electrical techniques (e.g., one or more switches or other circuit components, a dedicated processor or the processor 118 executing instructions, one or more mechanical elements, various types of transmitters and receivers, or any combination of the foregoing), as would be readily appreciated by those of skill in the relevant arts, to cause the marking dispenser 116 to dispense marking material in response to one or more signals or stimuli. The actuation system 120 also provides one or more output signals in the form of an actuation signal 121 to the processor 118 to indicate one or more actuations of the marking device, in response to which the processor 118 may acquire/collect various marking information and log data into the electronic record 135.

Location tracking system 130 of marking device 110 constitutes another type of input device that provides marking information, and may include any device that can determine its geographical location to a certain degree of accuracy. For example, location tracking system 130 may include a global positioning system (GPS) receiver or a global navigation satellite system (GNSS) receiver. A GPS receiver may provide, for example, any standard format data stream, such as a National Marine Electronics Association (NMEA) data stream, or other data formats. In other embodiments, location tracking system 130 may include any device or mechanism that may determine location by any other means, such as performing triangulation by use of cellular radiotelephone towers.

In one exemplary implementation, the location tracking system 130 may include an ISM300F2-05-V0005 GPS module available from Inventek Systems, LLC of Westford, Mass. (see www.inventeksys.com/html/ism300f2-c5-v0005.html). The Inventek GPS module includes two UARTs (universal asynchronous receiver/transmitter) for communication with the processor 118, supports both the SIRF Binary and NMEA-0183 protocols (depending on firmware selection), and has an information update rate of 5 Hz. A variety of geographic location information may be requested by the processor 118 and provided by the GPS module to the processor 118 including, but not limited to, time (coordinated universal time—UTC), date, latitude, north/south indicator, longitude, east/west indicator, number and identification of satellites used in the position solution, number and identification of GPS satellites in view and their elevation, azimuth and SNR values, and dilution of precision values. Accordingly, it should be appreciated that in some implementations the location tracking system 130 may provide a wide variety of geographic information as well as timing information (e.g., one or more time stamps) to the processor 118.

With respect to other input devices of the marking device 110 that may provide marking information, the control electronics 112 may also include a timing system 128 having an internal clock (not shown), such as a crystal oscillator device, for processor 118. Additionally, timing system 128 may include a mechanism for registering time with a certain degree of accuracy (e.g., accuracy to the minute, second, or millisecond) and may also include a mechanism for registering the calendar date. In various implementations, the timing system 128 may be capable of registering the time and date using its internal clock, or alternatively timing system 128 may receive its time and date information from the location tracking system 130 (e.g., a GPS system) or from an external timing system, such as a remote computer or network, via communication interface 124. In yet other implementations, a dedicated timing system for providing timing information to be logged in an electronic record 135 may be optional, and timing information for logging into an electronic record may be obtained from the location tracking system 130 (e.g., GPS latitude and longitude coordinates with a corresponding time stamp).

Marking material detection mechanism 132 of the marking device 110 shown in FIG. 2 is another type of input device that provides marking information, and may be any mechanism or mechanisms for determining a presence or absence of a marking dispenser 116 in or otherwise coupled to the marking device 110, as well as determining certain attributes/characteristics of the marking material within marking dispenser 116 when the dispenser is placed in or coupled to the marking device. As shown in FIG. 3, in some embodiments the marking material detection mechanism 132 may be disposed generally in an area proximate to a marking material holder 140 in which a marking dispenser 116 may be placed.

For example, in one embodiment, the marking material detection mechanism 132 may include one or more switch devices (e.g., a make/break single pole/single throw contact switch) disposed at one or more points along the marking material holder 140 and electrically coupled to the processor 118. The switch device(s) may also be coupled to ground or a DC supply voltage, such that when the switch device is in a first state (e.g., closed/making contact) the ground or DC supply voltage is passed to the processor 118 (e.g., via an I/O pin of the processor which provides an interrupt to, or is periodically monitored by, the processor), and when the switch is in a second state (e.g., open/no contact) the ground or DC supply voltage is not passed to the processor 118. When the marking dispenser 116 is present in the holder 140, the switch device(s) is in one of two possible states and when there is no marking dispenser the switch device(s) is in another of the two possible states (e.g., the marking dispenser, when present, may depress the switch device(s) so as to make contact and pass the ground/DC voltage to the processor). In this manner, the marking material detection mechanism 132 may provide a signal to the processor indicating the presence or absence of the marking dispenser 116 in the marking device 110.

The marking material detection mechanism 132 also or alternatively may include a barcode reader to read barcode data from a dispenser 116 and/or a radio-frequency identification (RFID) reader for reading information from an RFID tag that is provided on marking dispenser 116. The RFID tag may include, for example, a unique serial number or universal product code (UPC) that corresponds to the brand and/or type of marking material in marking dispenser 116. The type of information that may be encoded within the RFID tag on marking dispenser 116 may include product-specific information for the marking material, but any information of interest may be stored on an RFID tag. For example, user-specific information and/or inventory-related information may be stored on each RFID tag for a marking dispenser 116 to facilitate inventory tracking of marking materials. In particular, an identifier for a technician may be stored on an RFID tag when the technician is provided with a marking dispenser 116, and information relating to weight, amount dispensed, and/or amount remaining may be written to the RFID tag whenever the marking dispenser is used.

In one exemplary implementation, the marking material detection mechanism 132 may include a Micro RWD MIFARE-ICODE RFID reader module available from IB Technology (Eccel Technology Ltd) of Aylesbury, Buckinghamshire, UK (see www.ibtechnology.co.uk/products/icode.htm). The Micro RWD reader module includes an RS232 communication interface to facilitate communication between the processor 118 and the reader module (e.g., via messages sent as a string of ASCII characters), and supports both reading information from an RFID tag attached to a marking dispenser as well as writing information to an RFID tag attached to the marking dispenser. In one aspect of an exemplary implementation, an antenna constituted by one or more turns of wire (e.g., two turns of awg 26 wire, 6.5 cm in diameter, about 1 uH) is coupled to the Micro RWD reader module and disposed in the marking material holder 140 of the marking device 110 (see FIG. 3), proximate to a marking dispenser 116 when placed in the holder 140, so as to capture close near field signals (e.g., from an RFID tag on the dispenser, within about 2 inches) and exclude far field signals. In another aspect, the Micro RWD reader module may be configured to read RFID tags having an ICODE SLI format (e.g., ISO 15693 ICODE SLI). In yet another aspect, an RFID tag may be affixed to an aerosol paint can serving as the marking dispenser, such that the tag conforms to a plastic cap of the paint can and is disposed at a particular location relative to a notch in the cap (e.g., 90 degrees+/−15 degrees from the notch) that allows access to the spray nozzle of the can and is in a relatively predictable position substantially aligned with the antenna when the paint can is placed in the marking material holder 140. Examples of RFID tags suitable for this purpose are available from BCS Solutions, Inc. (see www.bcssolutions.com/solutions/rfid) and include, but are not limited to, the HF Bullseye Wet Inlay SLA Round 40.

As also shown in FIG. 2, the marking device 110 further may include one or more environmental sensors 170 and/or one or more operational sensors 172, which constitute additional examples of input devices from which marking information may be derived. In particular, one or more environmental sensors associated with a marking device may provide a variety of environmental information in connection with use of the device; similarly, one or more operational sensors associated with the marking device may provide a variety of operational information in connection with use of the marking device. According to various implementations discussed herein, one or both of environmental information and operational information may be used, in some cases in conjunction with ticket information, in connection with a guided marking operation facilitated by a checklist or workflow.

As used herein, environmental sensors are those which sense some condition of the environment in which the marking device is present, but need not sense a condition of the marking device itself. Examples of such environmental sensors include, but are not limited to, temperature sensors, humidity sensors, surface type sensors, light sensors, image sensors (e.g., digital cameras, video cameras) and sound sensors (e.g., microphones, audio recording devices) among others. Environmental sensors may be included with the marking device for one or more of various reasons. For example, information provided by one or more of the environmental sensors may be used to assess whether a marking operation was or is being performed in suitable environmental conditions (e.g., within accepted environmental tolerances). Additionally or alternatively, information provided by one or more environmental sensors may be used to interact with the technician operating the marking device, for example by issuing a notification or warning signal to the technician if the sensed environmental condition is outside of an acceptable range (i.e., out of tolerance). Also, the information from the environmental sensor(s) may trigger an action or alteration of the marking device, such as activating, enabling or disabling a particular component of the marking device. Additionally or alternatively, information provided by one or more environmental sensors may augment other information collected by the marking device, such as any of the types of information described above as being collected by a marking device according to various embodiments herein. In some instances, information from two or more of the environmental sensors may be used in combination.

As used herein, operational sensors are those which sense some operating condition of the marking device. Examples of such operational sensors include, but are not limited to, operational temperature sensors to sense a temperature of various components of the marking device itself, inclinometers to sense the angle of inclination of the marking device, a compass to sense the direction or heading of the marking device, and/or accelerometers to sense some characteristic of motion of the marking device (e.g., the speed at which the marking device is moving, the acceleration of the marking device, etc.), proximity sensors to sense a distance to the ground, among others. Operational sensors may be included with the marking device for one or more of various reasons. For example, information provided by one or more of the operational sensors may be used to assess whether a marking device was or is operating appropriately during a marking operation or whether the marking device was or is being operated (e.g., both electronically and/or physically manipulated) appropriately by the technician (e.g., within accepted tolerances or according to protocols). Additionally or alternatively, information from one or more operational sensors may be used to detect patterns of operation of the technician, such as technician "signatures" in using/manipulating the marking device (e.g., characteristic movements unique to the technician). Additionally or alternatively, information from one or more operational sensors may be used to interact with the technician, for example by issuing a notification or warning signal to the technician in response to the detected operational characteristic falling outside of an acceptable range. Also, the information from the operational sensor(s) may trigger an action or alteration of the marking device, such as activating, enabling or disabling a particular component of the marking device. Additionally or alternatively, information provided by one or more operational sensors may augment other information collected by the marking device, such as any of the types of information previously described herein in connection with other embodiments. In some instances, information from two or more operational sensors may be used in combination. Furthermore, information from one or more operational sensors may be used in combination with information from one or more environmental sensors.

It should be appreciated that some of the sensors described herein may be considered both environmental and operational sensors, either because the sensor senses both an environmental condition and an operating condition of the marking device (i.e., the sensor senses more than one condition) or because a single condition sensed by the sensor may be considered both an environmental condition and an operating condition. For example, an image-capture device (e.g., a digital camera or video camera) may be considered both an environmental sensor (e.g., the image-capture device may capture an image of the surrounding environment) and an operational sensor (e.g., the image-capture device may capture an image of some action the technician has taken, such as dispensing of a marker). Thus, it should be appreciated that while the exemplary sensors noted above are categorized generally as being either environmental or operational for purposes of illustrating some exemplary implementations, the categories are not mutually exclusive, and such categorization is not limiting unless otherwise stated.

More specifically, each of a digital camera and a digital audio recorder may serve as either an environmental or an operational sensor depending on various circumstances. A digital camera may be any image capture device that is suitable for use in a portable device, such as, but not limited to, the types of digital cameras that may be installed in portable phones. A digital camera may be used to capture any images of interest that may be related to performance of a locate and/or marking operation. The digital images from the digital camera may be stored in the local memory 122 in any standard or proprietary image file format (e.g., JPEG, TIFF, BMP, etc.). The digital images from the digital camera may optionally be attached to a certain ticket upon completion of the ticket (e.g., included in/attached to the technician activity log 137).

A digital audio recorder may be any audio capture device that is suitable for use in a portable device. A microphone (not shown) may be associated with a digital audio recorder and disposed on the marking device to facilitate recording of a technician's voice, and/or sounds in the environment or otherwise associated with use of the marking device to dispense a marking material (e.g., sounds produced by an aerosol paint can upon actuation of the marking device). The audio files from the digital audio recorder may be stored in the local memory 122 in any standard or proprietary audio file format (e.g., WAV, MP3, AVI, etc.). Like the digital images, the audio files from the digital audio recorder may optionally be attached to a certain ticket upon completion of the ticket (e.g., included in/attached to the technician activity log 137).

In other embodiments, a marking device may be configured to operate in multiple different modes so as to collect various information relating not only to a marking operation itself, but additionally (or alternatively) various information relating to the work site/dig area in which the marking operation is performed. For example, in one implementation, the marking device may be configured to operate in a first "marking mode" as well as a second "landmark identification mode" (or more simply "landmark mode"). In a "marking mode," marking material may be dispensed with respective actuations of the marking device and various marking information transmitted and/or stored in an electronic record attendant to this process. Alternatively, in a "landmark mode," marking material is not necessarily dispensed with an actuation of the marking device (and in some instances the dispensing of marking material is specifically precluded); instead, a technician positions the marking device proximate to an environmental landmark of interest and, upon actuation, the marking device collects various information about the landmark (hereafter referred to as "landmark information"). Landmark information may include, but is not limited to, geo-location data of an environmental landmark, type of environmental landmark, and a time stamp for any acquired information relating to an environmental landmark. Further details regarding both a marking mode and a landmark mode of operation for the marking device are discussed in U.S. Non-provisional application Ser. No. 12/568,087, entitled "Methods and Apparatus for Generating an Electronic Record of Environmental Landmarks based on Marking Device Actuations," filed on Sep. 28, 2009.

In one embodiment, the optional remote computer 150 may be a centralized computer, such as a central server of an underground facility locate service provider. In another embodiment, remote computer 150 may be a computer that is at or near the work site (i.e., "on-site"), e.g., a computer that is present in a locate technician's vehicle, a personal digital assistant or other computing device carried by the technician, etc. As shown in FIG. 2, the remote computer 150 may include a processor 117, a memory 123, and a communication interface 125, any of which may function similarly to the corresponding components described above in connection with the marking device 110. In particular, the memory 123 of the remote computer 150 may store one or more electronic tickets 165, ticket processing software 113, a technician activity log 137, and an electronic record of marking data 135. As discussed further below, in various embodiments, some or all of the functionality of the ticket processing software 113 may be implemented by executing all or a portion of the software on the remote computer 150, the marking device 110, or both the remote computer 150 and the marking device 110 (e.g., to distribute various aspects of the overall functionality of the ticket processing software amongst one or more remote computers and one or more pieces of locating equipment).

While the functionality of various components of the marking device 110 was discussed above in connection with FIG. 2, FIG. 3 shows some structural aspects of the marking device 110 according to one embodiment. For example, the marking device 110 may include an elongated housing 136 in which is disposed one or more elements of the actuation system 120, one or more elements of the control electronics 112 and the power source 114. Elongated housing 136 may be hollow or may contain certain cavities or molded compartments for installing any components therein, such as the various components of marking device 110 that are shown in FIG. 2. The elongated housing 136 and other structural elements associated with the housing, as discussed below, may be formed of any rigid, semi-rigid, strong, and lightweight material, such as, but not limited to, molded plastic and aluminum.

Incorporated at a proximal end of elongated housing 136 may be a handle 138, which provides a convenient grip by which the user (e.g., the locate technician) may carry the marking device 110 during use (i.e., the exemplary marking device depicted in FIG. 3 is intended to be a hand-held device). In one implementation, the power source 114 may be provided in the form of a removable battery pack housing one or more rechargeable batteries that are connected in series or parallel in order to provide a DC voltage to marking device 110, and disposed within a compartment in the handle 138. Such an arrangement facilitates use of conventional removable/rechargeable battery packs often employed in a variety of cordless power tools, in which the battery pack similarly is situated in a handle of the tool. It should be appreciated, however, that the power source 114 in the form of a battery pack may be disposed in any of a variety of locations within or coupled to the elongated housing 136.

As also shown in FIG. 3, mounted near handle 138 is user interface 126, which may include a display 146. The display 146 may be a touch screen display to facilitate interaction with a user/technician, and/or the user interface also may include one or more buttons, switches, joysticks, a keyboard, and the like to facilitate entry of information by a user/technician. One or more elements of the control electronics 112 (e.g., the processor 118, memory 122, communication interface 124, and timing system 128), as well as one or more environmental sensors 170 and/or one or more operational sensors 172, also may be located in the proximal end of the elongated housing in the vicinity of the user interface 126 and display 146. As with the power source 114, it should be appreciated that one or more elements of the control electronics 112 may be disposed in any of a variety of locations within or coupled to the elongated housing 136.

In the embodiment of FIG. 3, the location tracking system 130 similarly may be positioned on the proximal end of the elongated housing 136 to facilitate substantially unobstructed exposure to the atmosphere; in particular, as illustrated in FIG. 3, the location tracking system 130 may be situated on an a ground plane 133 (providing an electrical ground at least at the antenna frequency of the location tracking system, e.g., at approximately 1.5 GHz) that extends from the proximal end of the housing 136 and is approximately parallel to the ground, surface or pavement when the marking device is being normally operated by a technician (so as to reduce signal modulation with subtle movements of the marking device).

As also shown in FIG. 3, incorporated at the distal end of elongated housing 136 is a marking dispenser holder 140 for holding one or more marking dispensers 116 (e.g., an aerosol paint canister). Dispenser 116 may be one or more replaceable dispensers or one or more reusable refillable dispensers (including a fixed reservoir forming a part of the device 110) or any other suitable dispenser. Also situated at the distal end of the housing is the marking material detection mechanism 132 to detect a presence or absence of the marking dispenser 116 in the marking material holder 140, and/or one or more characteristics of the marking material 148, as well as an actuation mechanism 158, which in some implementations may constitute part of the actuation system 120 and be employed to interact with the marking dispenser 116 so as to effect dispensing of the marking material 148.

With respect to the actuation system 120, as shown in FIG. 3, at least a portion of the actuation system 120 is indicated generally along the length of the elongated housing for purposes of illustration. More specifically, however, in various implementations the actuation system 120 may include multiple components disposed in various places in, on or coupled to the marking device 110. For example, in the embodiment of FIG. 3, the actuation system 120 includes an actuator 142, which for example may be a mechanical mechanism provided at the handle 138 in the form of a trigger that is pulled by a finger or hand of an user/technician. The actuation system 120 further includes the actuation mechanism 158 disposed at the distal end of the marking device that is responsive to the actuator 142 to dispense marking material. In general, in various exemplary implementations, the actuation system 120 may employ any of a variety of mechanical and/or electrical techniques to cause the marking dispenser 116 to dispense marking material 148 in response to one or more signals or stimuli. In the embodiment shown in FIG. 3, the signal/stimulus is initially provided to the actuation system via the mechanical actuator 142; i.e., a locate technician or other user triggers (e.g., pulls/depresses) the actuator 142 to provide a signal/stimulus to the actuation system 120, which in turn operates the actuation mechanism 158 to dispense marking material in response to the signal/stimulus.

In response to the signal/stimulus provided by the actuator 142, as discussed above the actuation system may also provide an actuation signal 121 to the processor 118 to indicate an actuation. Pursuant to the execution by the processor 118 of the marking data algorithm 134, the actuation signal 121 may be used to cause the logging of information that is provided by one or more components of the marking device 110 so as to generate an electronic marking record 135 of the marking operation.

B. Locate Device

As noted earlier, any of the concepts discussed herein in connection with the receipt and/or processing of ticket information, generation of various process guides (e.g., checklists, workflows), and execution of same (as discussed in greater detail below) similarly may be implemented in connection with a remote computer in communication with a locate device, such as a locate transmitter or a locate receiver, as described for example in U.S. non-provisional application Ser. No. 12/571,329, entitled "Methods and Apparatus for Generating Electronic Records of Locate Operations," filed on Sep. 30, 2009, which application is hereby incorporated herein by reference.

Figure 3A:
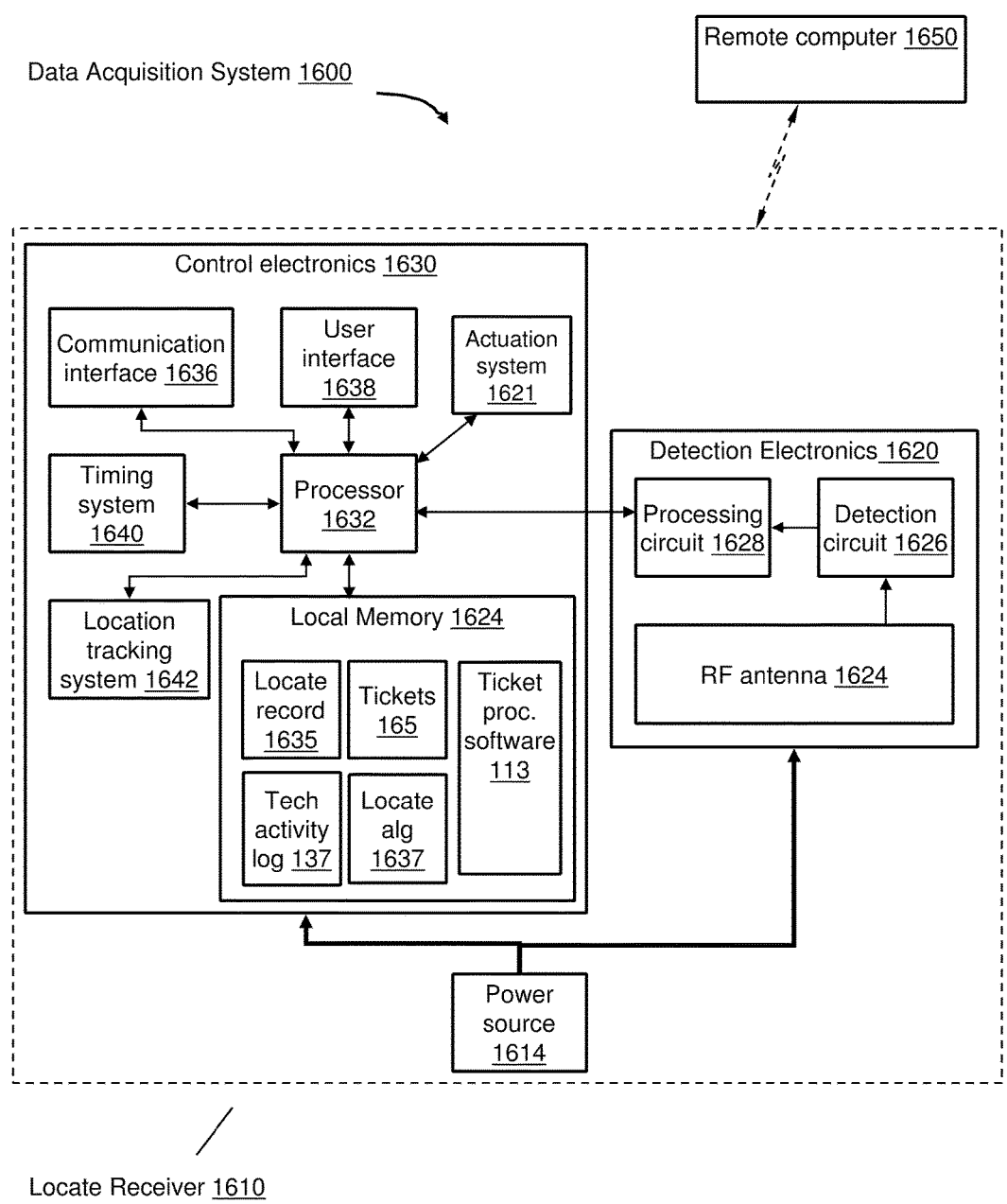
FIGS. 3A and 3B illustrate a functional block diagram and perspective view, respectively, of another example of one or more computers and a locate receiver for processing tickets to facilitate locate and/or marking operations, according to one embodiment of the present invention.
Figure 3B:
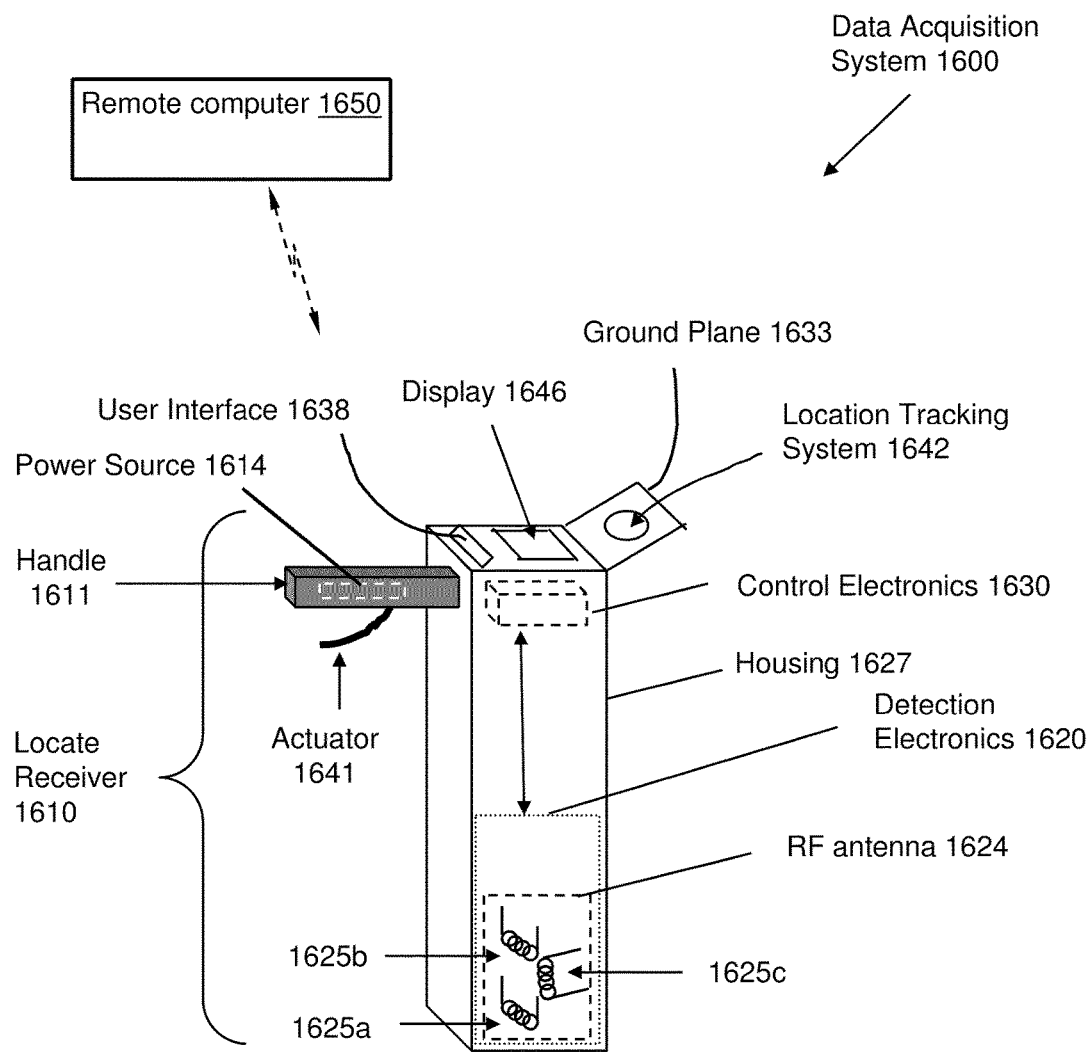

FIGS. 3A and 3B illustrate a functional block diagram and perspective view, respectively, of one example of a data acquisition system 1600 including a locate receiver 1610 and optionally a remote computer 1650, according to one embodiment of the present invention. As shown, the locate receiver 1610 comprises detection electronics 1620, control electronics 1630, and a power source 1614 configured to power the detection electronics 1620 and the control electronics 1630. The detection electronics 1620 comprise an RF antenna 1624, a detection circuit 1626, and a processing circuit 1628. The control electronics 1630 comprise a processor 1632 coupled to a local memory 1634, a communication interface 1636, a user interface 1638, a timing system 1640, a location tracking system 1642, and an actuation system 1621.

Some of the components illustrated in FIG. 3A are similarly named to some components in FIG. 2 relating to a marking device. According to some embodiments, one or more of the components appearing in FIG. 3A may be the same as, or substantially similar to, components in FIG. 2. For example, in some embodiments one or more of the following components appearing in FIGS. 2 and 3A may be the same as, or substantially similar to, each other (and therefore may function in the same or a substantially similar manner): power source 114 and power source 1614; remote computer 150 and remote computer 1650; communication interface 124 and communication interface 1636; user interface 126 and user interface 1638; timing system 128 and timing system 1640; location tracking system 130 and location tracking system 1642; processor 118 and processor 1632; local memory 122 and local memory 1634; actuation system 120 and actuation system 1621. With respect to actuation system 1621, it should be appreciated that there is no marker dispensed by the locate receiver 1610 shown in FIG. 3A, but the actuation system 1621 may nonetheless initiate or control logging of data in a manner similar to that discussed above in connection with the marking device 110, including taking of a depth measurement or performance of some other function of the locate receiver 1610.

Additionally, in the embodiments of FIGS. 3A and 3B, the ticket processing software 113 may be resident (in whole or in part) in the local memory 1634, and/or may be resident (in whole or in part) on one or more other computing devices (e.g., remote computer, technician personal computer or other computing device, central server, etc.). When executed by one or more processors (e.g., the processor 1632), ticket processing software 113 generally may be responsible for overseeing various functions relating in whole or in part to ticket information, as discussed in further detail below (e.g., in connection with FIGS. 6 and 7).

With respect to other elements that may be stored in the local memory 1634 of the locate receiver, in addition to the ticket processing software 113 FIG. 3A shows that electronic tickets 165 and a technician activity log 137, as discussed above in connection with the marking device 110, also may be stored in the local memory. Also, the local memory 1634 may store a locate data algorithm 1637 which, when executed by the processor 1632, performs the various functionality described below in connection with the locate receiver, as well as an electronic locate record 1635 including various data germane to a locate operation.

In some embodiments, a user may commence a locate operation with the locate receiver by inputting various information to the locate receiver and/or selecting various operating options, via the user interface. Additionally or alternatively, the locate receiver may receive ticket information (in any of a variety of formats/manners, as discussed further below) or some type of locate operation process guide to facilitate execution of the locate operation. As a non-limiting example, the user may select from various menu options (using the user interface and display as a menu-driven GUI), and or manually enter via the user interface, the type of target object/facility to be located, the address of the locate operation, the ground type (e.g., grass, pavement, etc.), whether or not a separate transmitter is being used, the mode of the locate receiver (e.g., Peak v. Null), whether the locate receiver is being operated in landmark mode or not (described further below), or any other information of interest to a locate operation.

The locate receiver may be used in a variety of manners by the technician for a locate operation, in which the technician generally positions (e.g., sweeps) the locate receiver over an area in which they expect to detect an underground facility (target object). More specifically, the technician positions the locate receiver such that the RF antenna 1624 (which may include more than one antenna, as described further below) may receive/detect a magnetic field emitted by the target object.

In some embodiments, the locate receiver 1610 is capable of operating in a null mode (e.g., capable of detecting a null signal when positioned over an object (e.g., facility) emitting a magnetic field), such that RF antenna 1624 may comprise a null detection antenna. Alternatively, the locate receiver 1610 is capable of operating in a peak detection mode (e.g., capable of detecting a peak signal when over an object (e.g., facility) emitting a magnetic field), and the RF antenna 1624 comprises two peak detection antennae, which may be positioned substantially parallel to each other but at different positions within the locate receiver (e.g., at different heights). In some embodiments, the locate receiver 1610 is capable of operating in both peak detection and null detection modes, and the RF antenna 1624 may comprise three antennae, e.g., one null detection antenna and two peak detection antennae. However, RF antenna 1624 may comprise any other number, type, and orientation of antennae, as the locate receivers described herein are not limited in these respects.

The RF antenna 1624 may be coupled to the detection circuit 1626 such that the signal(s) received/detected by the RF antenna 1624 may be provided to the detection circuit 1626 as an output signal of the RF antenna. The output signal of the RF antenna may be any frequency detectable by the antenna, and in some embodiments may be between approximately 512 Hz and 1 MHz, although these non-limiting frequencies are provided primarily for purposes of illustration. As mentioned, the output signal of the RF antenna 1624, which in some embodiments is an analog signal, may be provided to detection circuit 1626, which may perform various functions. For example, the detection circuit 1626 may perform various "front-end" operations on the output signal of RF antenna 1624, such as filtering, buffering, frequency shifting or modulation, and/or pre-amplifying the output signal. Furthermore, the detection circuit 1626 may perform additional functions, such as amplifying and/or digitizing the output signal provided by RF antenna 1624. It should be appreciated, however, that the types of functions described as being performed by detection circuit 1626 are non-limiting examples, and that other functions may be additionally or alternatively be performed.

Figure 14:
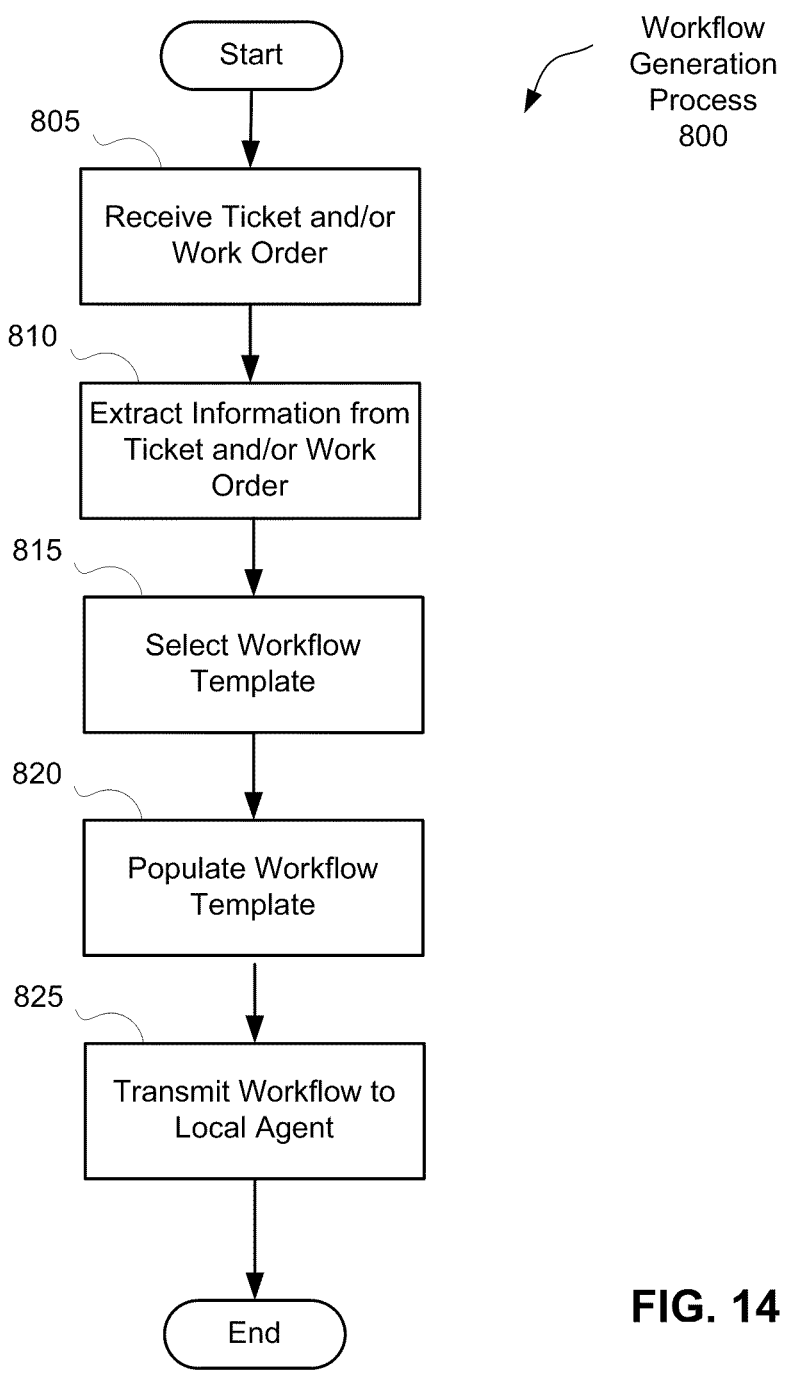
FIG. 14 shows an illustrative example of a process that may be performed to generate a workflow, according to some embodiments of the present invention.

After detection circuit 1626 has operated on the signal from RF antenna 1624 (e.g., by filtering, buffering, amplifying, and/or digitizing, among other possible operations), it may provide a signal to processing circuit 1628. The processing circuit 1628 may process the signal(s) provided by detection circuit 1626 in any suitable manner to determine any information of interest. For example, according to one embodiment, the processing circuit 1628 may process the signal(s) from detection circuit 1626 to determine a magnetic field strength of a magnetic field detected by RF antenna 1624. The processing circuit 1628 may process the signal(s) from detection circuit 1626 to determine an amplitude and/or direction of the electrical current creating the magnetic field(s) detected by RF antenna 1624. Processing circuit 1628 may perform operations to calculate, for example, the depth and location of the target facility based on the electromagnetic fields detected by RF antenna 1624. Processing circuit 1628 may be an analog circuit or a digital microprocessor, or any other suitable processing component for performing one or more of the operations described above, or any other operations of interest with respect to signals detected by RF antenna 1624. Also, it should be appreciated that processing circuit 1628 and processor 1632 may be a single processor in some embodiments, as the illustration of them as distinct in FIG. 14 is only one non-limiting example.

Processor 1632 of control electronics 1630 may be any suitable processor for controlling and/or coordinating operation of the detection electronics 1620 and/or control electronics 1630. For example, the processor 1632 may be any general-purpose processor, controller, or microcontroller device. In some embodiments, processor 1632 controls logging of data (e.g., locate information) from the processing circuit 1628, timing system 1640, and/or location tracking system 1642 to the local memory 1634 (e.g., pursuant to execution of the locate data algorithm 1637). The manner in which such data may be logged to the local memory 1634 (e.g., the electronic locate record 1635) may depend on the type of data being logged, as the operation of locate receiver 1610 is not limited in this respect.

For example, data from timing system 1640 and/or location tracking system 1642 may be automatically logged continuously or periodically to the local memory 1634, may be logged in response to one or more types of events (e.g., may be logged automatically when a particular event occurs), and/or may be logged at any suitable times. In particular, in one implementation, logging may occur at periodic intervals during performance of a locate operation, such as every second, every five seconds, every minute, or at any other suitable time interval. According to another embodiment, timing information and/or geographic information from timing system 1640 and location tracking system 1642, respectively, may be logged in response to particular types of events, such as detecting an underground facility or detecting the absence of an underground facility. Such events may be identified by signals output by processing circuit 1628 to processor 1632. As a non-limiting example, timing information and/or geographic information may be logged when a characteristic (e.g., magnetic field strength) of a signal detected by RF antenna 1624 is greater than a particular threshold value, which may be indicated by a signal output from processing circuit 1628 to processor 1632, and which occurrence may be indicative of the presence of an underground facility. Similarly, in some embodiments time timing information and/or geographic information may be logged when a signal detected by RF antenna 1624 has a magnitude above a first threshold and the gain of the locate receiver 1610 is above a second threshold. It should be appreciated that various combinations of detected signals detected by locate receiver 1610 may be used to trigger logging of information (e.g., timing information and/or geographic information) to local memory. It should also be appreciated that any information available from the location tracking system 1642 (e.g., any information available in various NMEA data messages, such as coordinated universal time, date, latitude, north/south indicator, longitude, east/west indicator, number and identification of satellites used in the position solution, number and identification of GPS satellites in view and their elevation, azimuth and SNR values, dilution of precision values) may be included in geographic information constituting all or a portion of logged locate information.

In some embodiments, alternatively or in addition to "automatic" logging of locate information based on some condition or event, a user of the locate receiver 1610 may "manually" trigger logging of timing information, geographic information, and/or any other data associated with a locate operation or locate receiver (locate information), for example by manipulating a control (e.g., button, knob, joystick) of the user interface 1638, or by actuating an actuator 1641 (e.g., a trigger-pull mechanism similar to the actuator 142 of the marking device 110 shown in FIG. 3) integrated or otherwise associated with the locate receiver (as shown in FIG. 3B), which may be part of the actuation system 1621 and which may cause a signal to be sent to the processor 1632 to initiate logging of locate information. For example, according to some embodiments a user may initiate the locate receiver 1610 taking a depth measurement by depressing a pushbutton of the user interface 1638, or pulling/squeezing the actuator 1641, which may also trigger the logging of timing information and/or geographic information from timing system 1640 and location tracking system 1642. The depth measurement data, time data, and/or location data may then be logged in an electronic record in local memory 1634.

It should be appreciated that while the foregoing discussion focuses on logging locate information to local memory 1634, the locate information may also, or alternatively, be transmitted to remote computer 1650 via communication interface 1636. As with logging locate information to local memory 1634, the transmission of locate information to remote computer 1650 may be performed continuously, periodically in response to one or more types of events, in response to user input or actuation of an actuator, or in any other suitable manner.

FIG. 3B illustrates a non-limiting perspective view of the locate receiver 1610, providing one example of a physical configuration of the components according to one embodiment. It should be appreciated, however, that other configurations are possible and that the various aspects described herein as relating to locate receivers are not limited to any particular configuration of components.

As shown, the locate receiver 1610 may comprise a housing 1627, to which at least some of the components of the locate receiver 1610 are mechanically coupled (e.g., affixed, housed within, etc.). As shown, the RF antenna 1624 of detection electronics 1620 may be mechanically coupled to the housing (e.g., supported inside the housing), and in this non-limiting example includes three antennae, 1625a-1625c. Antennae 1625a and 1625b may be configured to operate as peak detection antenna, while antenna 1625c may be configured to operate as a null detection antenna. In some embodiments, the antennae 1625a and 1625b may be oriented substantially parallel to each other, and in some embodiments are oriented at approximately 90 degrees relative to antenna 1625c. Again, it should be appreciated that the number, type, and orientation of the antennae of locate receiver 1610 are not limited to that shown in FIGS. 3A and 3B. In addition, the control electronics 1630 may be disposed within the housing 1627, and may be coupled to the detection electronics 1620 by one or more wired or wireless connections.

As illustrated in FIG. 3B, some of the components of the locate receiver 1610 may be positioned externally on the housing 1627. For example, the location tracking system 1642 (e.g., in the form of a GPS receiver) may be mounted on an electrical ground plane 1633 mechanically coupled to the housing 1627. The user interface 1638 may be located externally on the housing 1627, and, as mentioned previously, may include one or more buttons, switches, knobs, a touch screen, or other user selection items. A display 1646 may also be included on an outer surface of the housing 1627, to display information to a user.

In the non-limiting example of FIG. 3B, the housing 1627 includes a handle 1611, by which a user may hold the locate receiver 1610. In some embodiments, the power source 1614 may be located within the handle, although other configurations are also possible.

As with the marking devices described above, some aspects of the invention provide a locate device (e.g., locate receiver) that may be configured (e.g., via particular instructions executing on the processor 1632) to operate in multiple different modes to collect various information relating not only to a locate operation (locate information), but additionally or alternatively various information relating to the work site/dig areas in which the locate operation is performed. For example, in one implementation, the locate receiver may be configured to operate in a first "locate mode" which essentially follows various aspects of the operation of the locate receiver 1610 described herein, and also may be configured to operate in a second "landmark identification mode," like that described previously in connection with a marking device. When switched into the landmark mode, the locate receiver may stop detecting a magnetic field, e.g., the RF antenna of the locate receiver may be temporarily disabled in some embodiments. In other embodiments, the locate receiver may continue to operate and the landmark mode may represent additional functionality added to the locate receiver functionality.

According to those aspects of the invention providing a locate device (e.g., locate receiver) configurable to operate in both a locate mode and a landmark mode, the landmark mode may be substantially the same as the landmark mode previously described herein. For example, the landmark mode of a locate receiver may be used to collect the same types of landmark information described previously with respect to marking devices having a landmark mode, such as any of the types of information illustrated and described with respect to Tables 8-11, or any other suitable information.

The locate receiver may have any suitable components/circuitry allowing for operation in both a landmark mode and a locate receiver mode. For example, the locate receiver may include a bypass device similar to that described with respect to a marking device including landmark functionality, in which the bypass device may bypass the operation of the locate receiver functioning to detect a target object. Alternatively, a user may select the landmark mode of the locate receiver from a user interface, analogous to that previously described in the context of a marking device having landmark functionality.

Thus, it should be appreciated that the landmark functionality previously described with respect to a marking device may be suitably applied in the context of a locate receiver, according to some embodiments.

C. Combined Locate and Marking Device

In yet other embodiments, any of the concepts discussed herein in connection with the receipt and/or processing of ticket information, generation of various process guides (e.g., checklists, workflows), and execution of same (as discussed in greater detail below) similarly may be implemented in connection with a combined locate and marking device. The combined locate and marking device may function as both a locate receiver for locating objects (e.g., underground facilities) and a marking device, as discussed herein in the preceding sections, and may be configured to collect, store, transmit to an external device and/or analyze/process any of the data types described previously herein (locate information, marking information, and/or landmark information), any combination of such data types, or any other information of relevance to the operation of the combined locate and marking device.

Figure 3C:
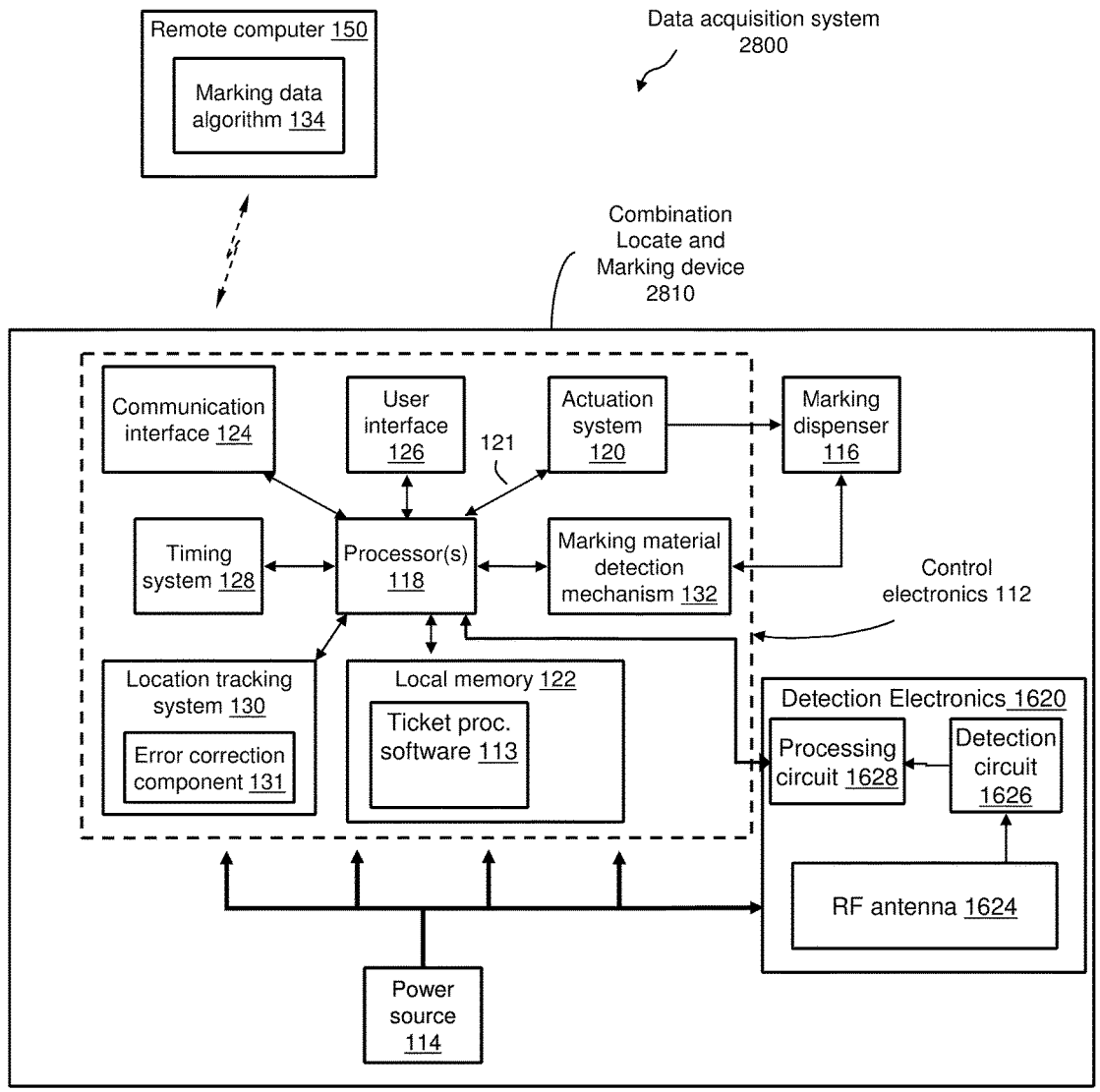
FIGS. 3C and 3D illustrate a functional block diagram and perspective view, respectively, of another example of one or more computers and a combined locate and marking device for processing tickets to facilitate locate and/or marking operations, according to one embodiment of the present invention.
Figure 3D:
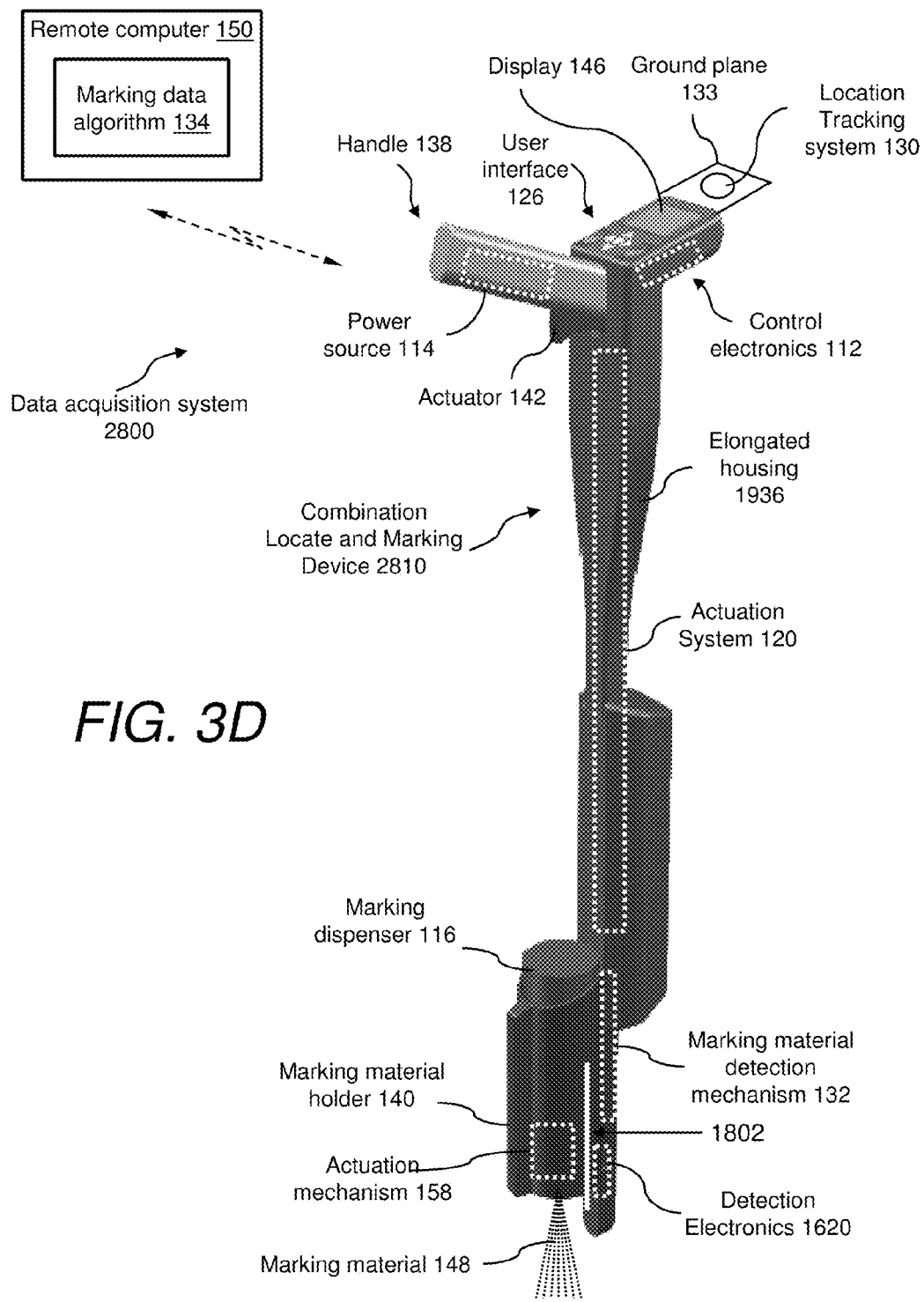

FIGS. 3C and 3D illustrate a functional block diagram and a perspective view, respectively, of a data acquisition system including a combination locate and marking device, according to one non-limiting embodiment. As shown in FIG. 3C, the data acquisition system 2800 comprises combination locate and marking device 2810 and (optionally) remote computer 150. It should be appreciated that many of the components illustrated in FIG. 3C have been previously shown and/or described with respect to FIGS. 2 and 3A, and that a detailed description of such components is not repeated here, as they may operate in the same, or a substantially similar, manner to that previously described. For purposes of illustration, the control electronics for this non-limiting embodiment of a combination locate and marking device are control electronics 112, previously described with respect to a marking device. However, the functionality of the control electronics 1630 as discussed in connection with FIG. 3A may be realized by the control electronics 112 in this non-limiting embodiment; similarly, the processor 118 in the embodiment of FIG. 3C may perform the functionality previously described with respect to both the processor 118 of FIG. 2 and the processor 1632 of FIG. 3A.

As with the locate receiver and the marking device, in the embodiments of FIGS. 3C and 3D, the ticket processing software 113 may be resident (in whole or in part) in the local memory 122, and/or may be resident (in whole or in part) on one or more other computing devices (e.g., remote computer, technician personal computer or other computing device, central server, etc.). When executed by one or more processors (e.g., the processor 118), ticket processing software 113 generally may be responsible for overseeing various functions relating in whole or in part to ticket information, as discussed in further detail below (e.g., in connection with FIGS. 6 and 7).

The operation of the components of combination locate and marking device 2810 may be coordinated in various manners. As has been described previously herein, the detection electronics may operate to detect the presence or absence of a target object, such as an underground facility. The marking-related components (e.g., actuation system 120, marking dispenser 116, etc.) may be used in connection with dispensing a marking material, for example to mark the location of an underground facility once detected. In practice, the two activities (detecting a target object and marking a location of the target object) may not coincide temporally. Rather, a locate technician may scan an area one or more times to detect the presence of the target object, or may have to scan over a large area to determine the extent of the target object, utilizing the locate receiver functionality of the combination locate and marking device. In some embodiments, the locate technician may operate the combination locate and marking device to dispense a marking material after the target object is detected, or in some instances intermittently while detecting the target object (e.g., while following the length of an underground facility). Thus, various schemes may be employed to coordinate the object detection functionality and the marking functionality.

According to some embodiments, the object detection functionality and the marking functionality may operate at separate times. For example, in one such embodiment, the combination locate and marking device may separately operate in a detection mode and a marking mode, and a user (e.g., locate technician) may select which mode to use, for example by selecting the mode from the user interface. In such an embodiment, the user may operate the combination locate and marking device as a locate receiver until the target object is detected, and then may switch modes to a marking mode, in which the user may operate the combination locate and marking device to dispense marking material. In another such embodiment, the combination locate and marking device may operate substantially continuously as a locate receiver until the user actuates the actuation system 120, at which time the locate receiver functionality may automatically be suspended and the combination locate and marking device may shift to a marking mode for dispensing marking material. Other manners of coordinating the functionality of a combination locate and marking device are also possible, as those manners explicitly listed herein are provided primarily for purposes of illustration.

In addition, as described above, a combination locate and marking device is further configurable to operate in a landmark mode. In some such embodiments, the landmark mode may be a distinct mode which may selected by the user, much like the above-described selection of the object detection functionality and the marking functionality. However, other manners in which the combination device may be placed into a landmark mode of operation are also possible.

III. Exemplary Tickets

As discussed above, a locate request ticket generated by a one-call center may include information provided by an excavator in an excavation notice that initiated the ticket, as well as supplemental information provided by the one-call center. Presently, there is no standardized format or standardized information content for locate request tickets and, as such, tickets generated by different one-call centers in different jurisdictions/geographic regions may include a variety of different content and have a variety of different formats. For purposes of illustrating some of the more typical salient elements of a locate request ticket, FIG. 4 shows an example of a ticket 205. As shown in FIG. 4, the ticket 205 contains various pieces of information stored in a number of fields, including:

(1) ticket number 302,
(2) location information 304A (e.g., address of work site, nearby cross streets, and dig area descriptions such as "site marked in white" and "starting at pole number 24860 at the entrance of Trevose Corporate Center and proceeding in the grass around the side of the bldg, then cross the parking lot to the bldg"),
(3) coordinate information 304B (e.g., lat/long coordinates of work site),
(4) excavation information 306, including reason (e.g., installing conduit), scope (e.g., 392 feet), depth (e.g., 18-30 inches), method (e.g., by drill and trencher) and property type (e.g., private property),
(5) timing information 308, including scheduled excavation time (e.g., Jan. 6, 2009 at 7:00 a.m.) and duration (e.g., 3 days) and due date by which a requested locate and/or marking operation is to be completed (e.g., Jan. 5, 2009),
(6) excavator information 310, including name, address, contact information such as phone number, fax number and email address, and the party who contracted the excavator (e.g., as indicated in the "Work Being Done For" field),
(7) one-call center information 312, including the time at which the ticket was created and the customer service representative who created the ticket, and
(8) member codes 314, indicating the different types of facilities that need to be located.

In some instances, the ticket 205 may contain additional textual information in a "Remarks" field 316 (although no remarks are provided in the example shown in FIG. 4). This textual information may include a description of the dig area (which may alternatively be included in the location information 304A as discussed above) and/or instructions with respect to performing the requested locate and/or marking operation.

It should be appreciated that the above list of information elements is merely illustrative, as other combinations of information elements may also be suitable. For example, when preparing a ticket, a one-call center may draw a "locate polygon" or a "work site polygon" (e.g., as a "buffer zone" around a designated work site) on a map corresponding to the work site. This locate/work site polygon may be overlaid onto one or more polygon maps or facilities maps to determine which types of facilities are implicated. For example, a facility type (or owner) may be indicated on the initial ticket in the member code section 314 if and only if at least one facility of that type (or owner) touches or intersects with the polygon overlaid on a polygon map or facilities map. In some instances, the one-call center may provide coordinates for the vertices of the polygon in the ticket, along with other information describing the location and boundaries of the work site and/or dig area.

With reference again for the moment to FIG. 2, tickets communicated electronically may be stored in memory of one or more remote computers or one or more pieces of locating equipment as electronic tickets 165. The data format of electronic tickets 165 may be, for example, Extensible Markup Language (XML) files that can be imported to any application for display (e.g., web-based application, custom application, dashboards, standard reports, etc). Alternatively, electronic tickets 165 may be of any format that is suitable for use by any application, such as, but not limited to, textual format (e.g., field length delimited, comma delimited, any separated value format), XML or any self-describing format, binary format (e.g., object level formatting, binary data object, such as a relational database, hierarchical database), and so on.

Textual descriptions of dig areas included in locate request tickets may, in some instances, be very imprecise as to exact physical locations at which digging is planned. Therefore, when a locate request is submitted by an excavator, it may be beneficial for the excavator to supplement the locate request with a visit to the site of the dig area for the purpose of indicating the particular location and/or extent of the proposed excavation. For example, marks (e.g., white paint) on the ground at the location at which digging is planned may be used to physically indicate a dig area in order to communicate to a locate technician the extent of the boundaries where digging is planned. These marks may be chalk marks or paint that is applied to the surface of the ground, and are generally known as "white lines."

Figure 5A:
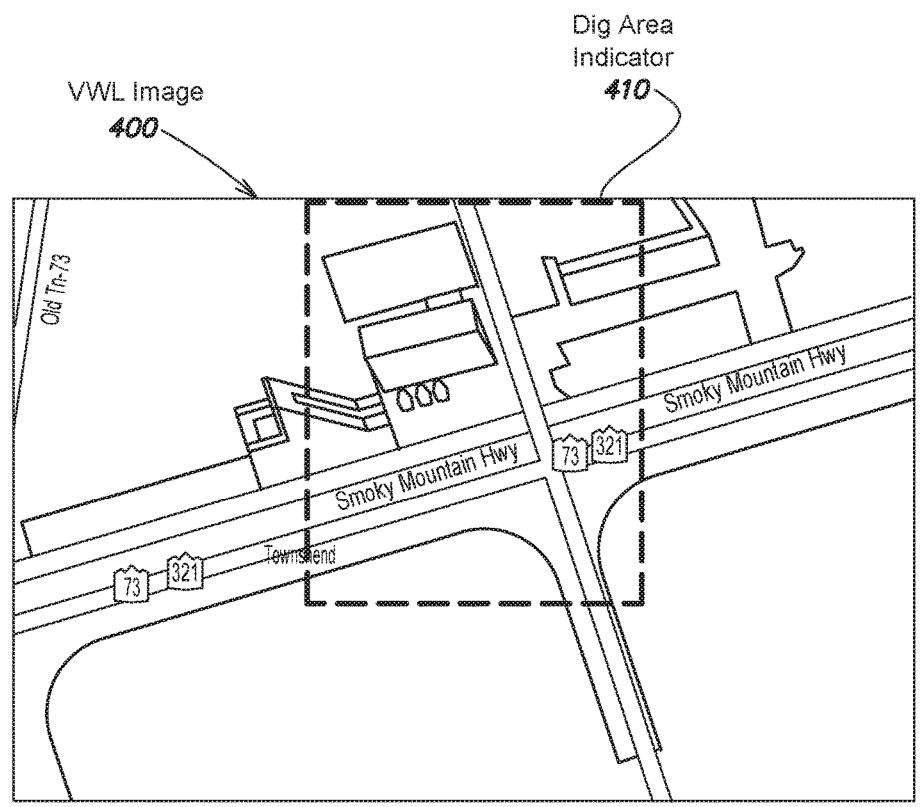
FIG. 5A shows an example of a virtual white lines (VWL) image that may be associated with the ticket of FIG. 4 and also processed according to various embodiments of the present invention.

In accordance with some embodiments, an excavator may attach to an excavation notice or locate request a so-called virtual white lines (VWL) image, which may contain a digital image of the work site (e.g., an aerial image or some other suitable digital data representing the geographic location of the work site) along with electronic annotations delimiting the dig area. Such a VWL image may then be included as part of, or as an electronic attachment to, a ticket generated by a one-call center (i.e., the VWL image constitutes part of the information contained in a ticket). An example of a VWL image 400 is shown in FIG. 5A, where a dig area is indicated on an aerial image of a work site by a set of dashed lines 410 forming a polygon (e.g., a rectangle). The lines 410 are more generally referred to as "dig area indicators," which may be any electronically generated markings indicating a point, line, path and/or area of the planned excavation.

The VWL image 400 may be created by the excavator using a suitable VWL application. For example, an excavator may use an electronic drawing tool provided by the VWL application to electronically draw markings on a digital image of the work site, instead of, or in addition to, physically visiting the work site and marking white lines on the ground. The electronic markings may include any suitable combinations of shapes, shades, points, symbols, coordinates, data sets, and/or other indicators to indicate on the digital image a dig area in which excavation is to occur.

In some embodiments, the digital image on which dig area indicators are drawn may be geotagged (i.e., associated with geospatial metadata). The VWL application may be programmed to use the geospatial metadata associated with the digital image to convert location information regarding the dig area indicators and/or landmarks shown in the digital image into geographic coordinates such as Global Positioning System (GPS) coordinates. These geographic coordinates may be stored in a separate data set that may be attached to a locate request ticket instead of, or in addition to, the VWL image, and/or may be included as metadata accompanying a VWL image file which is attached to a ticket, for example. Accordingly, it should be appreciated that the VWL image and/or any information associated therewith (e.g., the geographic coordinates themselves for one or more dig area indicators, with or without accompanying image information), may constitute part of the ticket information.

A data set associated with a VWL image may include any suitable combination of information, as the present disclosure is not limited in that respect. For example, as shown in FIG. 5C, an illustrative VWL data set 430 may include any of the following pieces of information:

Timestamp information 432 identifying the day and/or time that the excavator created the VWL image.
An excavator identifier 434 uniquely identifying the excavator.
A property address 444 for a work site.
VWL coordinates 436 defining a set of geographical points along a perimeter of a delimited dig area.
Environmental landmark identifier 438 identifying a type of environmental landmarks (e.g., "curb"), a location 440 of the identified landmark (e.g., as indicated by GPS coordinates), and/or a distance 442 between the identified landmarks and one or more boundaries of the dig area.
Any other data that may be useful in further describing the dig area, such as excavator notes in the form of audio/voice data, transcribed voice-recognition data, or simply textual data typed in by an excavator.
Ticket number 446, which may or may not be available at the time the VWL image is generated.

The VWL application may be implemented, for example, as described in U.S. patent application Ser. No. 12/366,853 filed Feb. 6, 2009, entitled "Virtual white lines for delimiting planned excavation sites;" U.S. patent application Ser. No. 12/475,905 filed Jun. 1, 2009, entitled "Virtual white lines for delimiting planned excavation sites of staged excavation projects;" U.S. patent application Ser. No. 12/422,364 filed Apr. 13, 2009, entitled "Virtual white lines (VWL) application for indicating a planned excavation or locate path." Each of these patent applications is hereby incorporated by reference herein in its entirety.

Figure 5B:
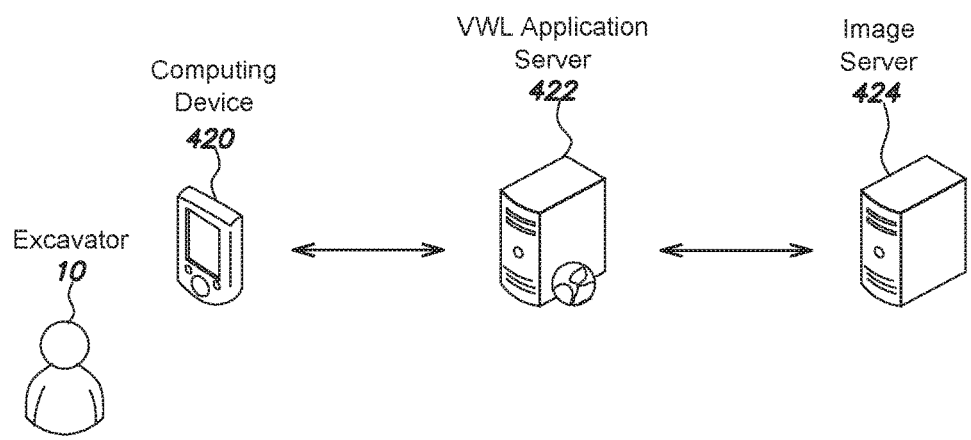
FIG. 5B illustrates a system for creating the VWL image shown in FIG. 5A.
Figure 5C:
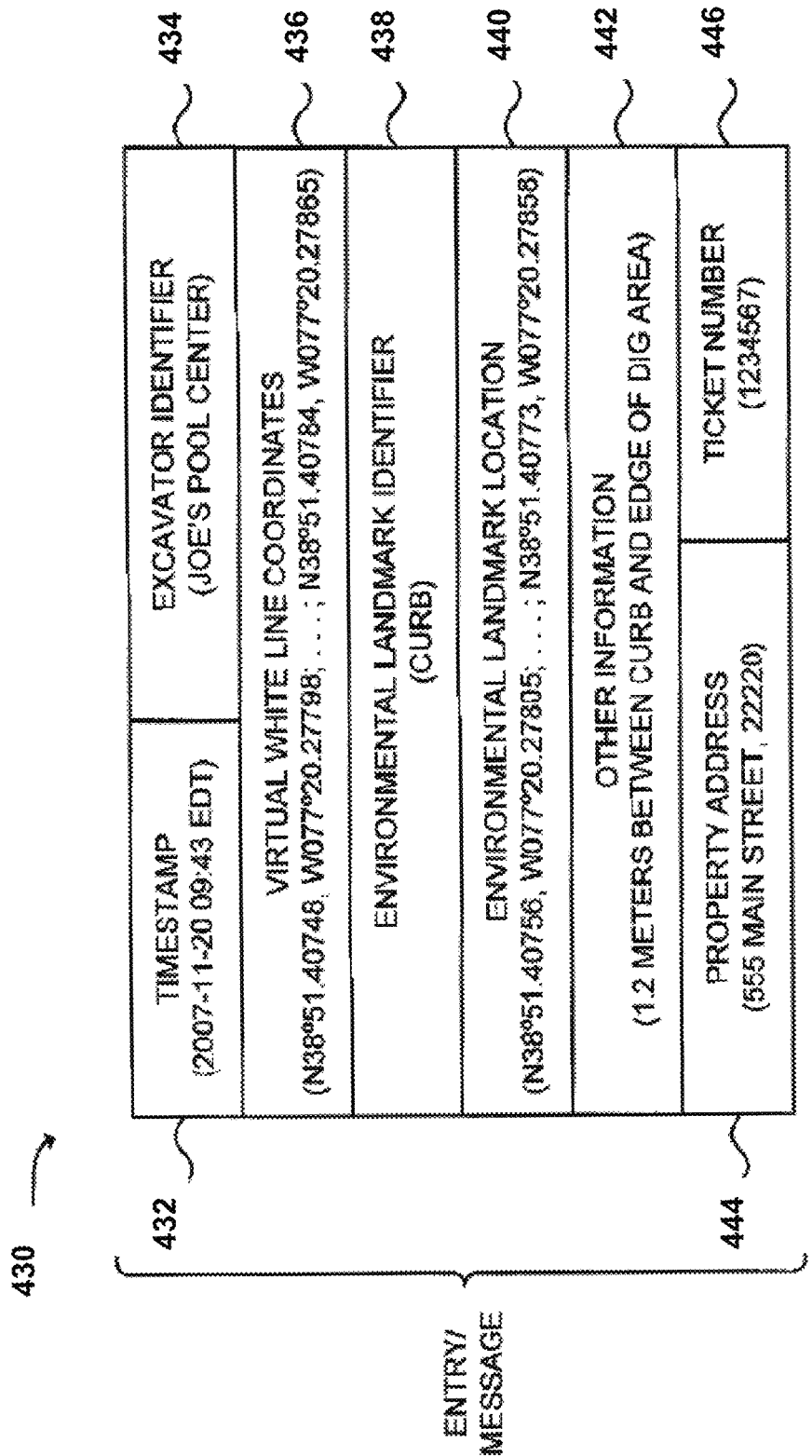
FIG. 5C illustrates an exemplary VWL data set that may be associated with the VWL image shown in FIG. 5A.

FIG. 5B shows an example in which a VWL application is implemented as a web application and is accessible via a VWL application server 422 or some suitable web portal. In this manner, an excavator (e.g., the excavator 10 shown in FIG. 1) may be able to create a VWL image by accessing the VWL application via a web browser running on a mobile computing device 420.

As discussed above, the VWL application may create a VWL image by electronically annotating an input image with one or more dig area indicators. An input image may be any image represented by source data that is electronically processed (e.g., the source data is in a computer-readable format) to display the image on a display device. The VWL application may retrieve the source data from any suitable source, such as an image server 424.

Input images stored on the image server 424 may include any of a variety of paper/tangible image sources that are scanned (e.g., via an electronic scanner) or otherwise converted so as to create source data (e.g., in various formats such as XML, PDF, JPG, BMP, etc.) that can be processed to display an image. An input image may also originate as source data or an electronic file without necessarily having a corresponding paper/tangible copy of the image (e.g., an image of a "real-world" scene acquired by a digital still frame or video camera or other image acquisition device, in which the source data, at least in part, represents pixel information from the image acquisition device). In some embodiments, input images may be created, provided, and/or processed by a geographic information system (GIS) that captures, stores, analyzes, manages and presents data referring to (or linked to) location, such that the source data representing the input image includes pixel information from an image acquisition device (corresponding to an acquired "real world" scene or representation thereof) and/or spatial/geographic information ("geo-encoded information"). As noted above, in some exemplary implementations, an input image may be a digital aerial image of all or a portion of a work site, and may also include some of the geographic area surrounding the work site, in which one or more dig area indicators are place on the image so as to provide a VWL image.

IV. Ticket Processing

As discussed above, according to various inventive embodiments disclose herein, one or more aspects of ticket information (examples of which aspects include, but are not limited to, the use, content, formatting, organization, processing, analysis, appearance and/or presentation mode of available ticket information) may be enhanced and/or improved in some manner so as to facilitate and/or verify efficient, effective and satisfactory performance of the locate and/or marking operation. In some exemplary implementations, with reference again to FIGS. 2, 3A and 3C, the ticket processing software 113, which may be resident (in whole or in part) on one or more pieces of locating equipment, and/or may be resident (in whole or in part) on one or more other computing devices (e.g., remote computer, technician personal computer or other computing device, central server, etc.) may, when executed by a processor, be generally responsible for overseeing various functions relating in whole or in part to ticket information.

Figure 6:
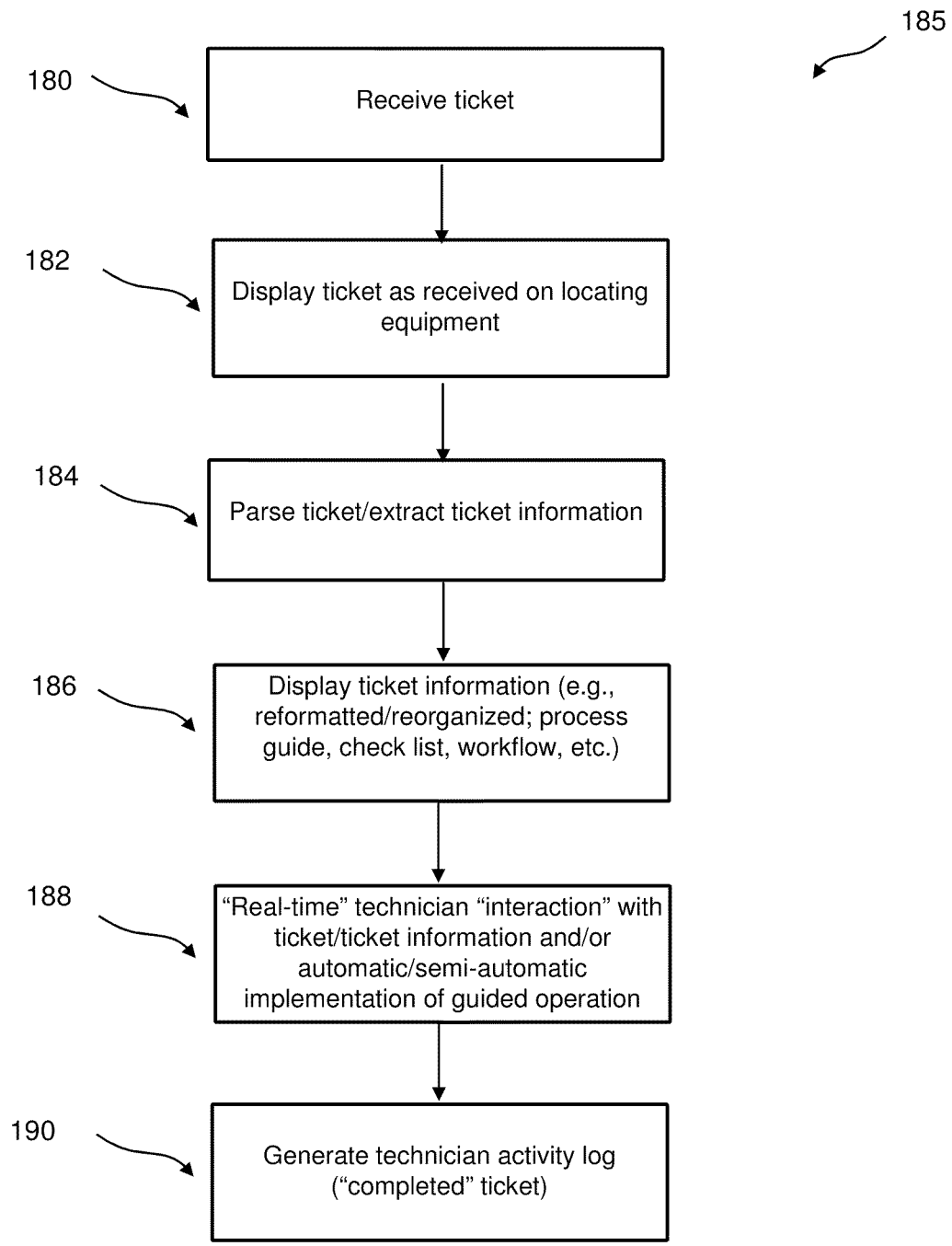
FIG. 6 illustrates a flow chart providing an outline of the high-level functionality of a ticket processing method according to some embodiments of the present invention.

FIG. 6 illustrates a flow chart that provides a general outline of the high-level functionality of the ticket processing software 113 that, when executed by a processor, performs a ticket processing method 185 according to one embodiment of the present invention. It should be appreciated that ticket processing methods according to other embodiments of the present invention, pursuant to the execution of various implementations of the ticket processing software 113, may not necessarily perform all of the steps indicated in FIG. 6, and/or may perform steps in a different order than that shown in FIG. 6.

In block 180 of FIG. 6, a ticket is received (e.g., as generated by a one-call center). With reference again to FIGS. 2, 3, and 3A-3D, the ticket may be received from, for example, a ticket management system (not shown) residing on the remote computer 150 and then loaded into the locating equipment (e.g., using the example of the marking device 110, the ticket may be transmitted via a wired or wireless connection from the remote computer 150 to the marking device 110 via the communication interfaces 124 and 125 and stored as the electronic ticket 165 in the local memory 122). In one example, the electronic ticket 165 may be loaded into the local memory of the locating equipment via an on-site docking station (e.g., located in the technician's vehicle) that is coupled to the locating equipment's communication interface. Although not shown in the various figures, the docking station may in turn have received the ticket from one or more remote computers executing a ticket management system. In yet another example, a ticket may be received "directly" on one or more pieces of locating equipment (e.g., from the one-call center that generated the ticket).

In block 182 of FIG. 6, the ticket as received may be displayed on one or more pieces of locating equipment (e.g., a ticket may be displayed on the display 146 of the marking device 110 shown in FIGS. 2 and 3). As noted above, some types of tickets may include, as part of the ticket itself or as one or more file attachments to the ticket, a virtual white lines (VWL) image which, as discussed above, may contain a digital image of the work site (e.g., an aerial image or some other suitable digital data representing the geographic location of the work site) along with electronic annotations delimiting the dig area. The VWL image file may include metadata relating to various aspects of the VWL image. One or both of the VWL image and metadata relating to the image (e.g., geographic coordinates of the dig area indicator(s)) may be included in or attached to the ticket.

Accordingly, in block 182, it should be appreciated that the text-based ticket itself, as well as a VWL image and/or metadata associated with the VWL image, if present as an attachment to or a portion of the ticket, may be displayed on one or more pieces of locating equipment. In exemplary implementations, a user interface associated with the locating equipment on which text information in the ticket and/or a VWL image/metadata are displayed may be configured to allow the technician to toggle the display between the text information and the VWL image/metadata. Alternatively, the user interface and/or the display of a given piece of locating equipment may be configured to permit split screen or multi-window viewing, such that the technician may be able to view simultaneously all or respective portions of a text-based ticket information and a VWL image and/or VWL metadata when present.

In block 184, the received ticket may be processed (e.g., parsed) to extract various ticket information. For example, in one embodiment, the ticket processing software 113 (executing on one or more processors) may analyze the received ticket and determine whether or not there is sufficient information in the ticket such that the locate and/or marking operation may be performed by the technician in a guided fashion. To this end, the ticket processing software 113 may be configured to recognize and process certain key words found in the ticket. In general, in exemplary implementations the ticket processing software 113 may be configured to parse a received ticket to extract relevant information and to assess one or more aspects of the requested locate and/or marking operation, such as location, scope, complexity, duration, risk, value, skill requirements and the like.

In block 186 of FIG. 6, ticket information may be displayed to a technician in some manner that is different than the ticket as received (e.g., received ticket processing/parsing may provide some type of enhanced and/or improved ticket information to the technician as compared to the original ticket as received). For example, ticket information may be displayed as a "work order" that may be primarily text-based in nature and in which the original ticket is re-formatted and/or the information extracted from the original ticket is selected and/or organized in a manner that highlights and/or prioritizes certain elements of information so as to facilitate performance of a locate and/or marking operation. Alternatively, ticket information may be displayed in block 186 in the form of a process guide, technician checklist or workflow, examples of which are discussed in greater detail below.

In block 188 of FIG. 6, the technician may be permitted or may be required to have some type of interaction in "real time" with displayed ticket information (e.g., verify performance elements of a work order; mark off or check off elements of a checklist; follow and acknowledge a sequence of steps of a workflow, etc.). For example, the technician may view the ticket information on the display 146 of the marking device 110 and, in the process of performing the locate and/or marking operation, the technician may update the ticket information in real time. In one example, as each type of facility to be marked according to the ticket information is actually marked by the technician, the technician may update the status (e.g., marked, cleared, no access, etc.) via the user interface 126. Additionally, the technician may enter useful information as text via the user interface 126, may capture digital images that relate to the locate and/or marking operation (e.g., by use of a digital camera included on the marking device 110), and/or may generate a digital audio recording that relates to performance of the locate and/or marking operation (e.g., by use of a digital audio recorder included on the marking device 110). In addition, or alternatively, in block 188 some type of guided operation, such as execution of a process guide, checklist or workflow, may be implemented in an automated or semi-automated manner (e.g., in which elements of a checklist, or steps of a workflow, are completed/acknowledged by automatically comparing information relating to performance of the locate and/or marking operation to the ticket information). Also, as part of a guided process, the technician may be provided with various types of alerts (e.g., visual cues or queries on a display, audible alerts, tactile alerts) relating to different steps of a process and/or aspects of the locate and/or marking operation being conducted.

In block 190, a technician activity log may be generated to capture information relating to implementation and/or execution of the work order, checklist, workflow, and the like, and such a technician activity log may be stored electronically (e.g., in memory of a computing device or locating equipment). Upon completion of a locate and/or marking operation, the technician activity log may be used to verify that the locate and/or marking operation requested by the ticket was completed; accordingly, such a log also may be considered or referred to as a "completed ticket." However, it should be appreciated that the technician activity log may also be generated and updated during a locate and/or marking operation as a process guide is being executed, and analyzed prior to the completion of the locate and/or marking operation. For example, the technician activity log may be analyzed as each work item or task is completed by the technician to detect any deficiencies, so that the technician may be alerted before leaving the work site. As another example, in the event that one or more unanticipated circumstances are observed during the locate and/or marking operation, the technician activity log may be used to dynamically assess the new situation and provide updated guidance to the technician. Accordingly, it should be appreciated that any updates to a technician activity log pursuant to execution of a process guide, either during or upon completion of the locate and/or marking operation, may be stored, analyzed and or transmitted; in particular the transmission of a technician activity log (e.g., an updated process guide) to a remote computer may occur from time to time during the locate and/or marking operation, for example, when each process guide item is checked off and/or when the technician indicates he is unable to complete a certain process guide item. Alternatively, the technician activity log may be transmitted upon completion the locate and/or marking operation (e.g., a completed process guide or "completed ticket") for recordkeeping and final quality review. Additionally, in some embodiments, as discussed further below in connection with FIG. 7, a technician activity log/updated process guide may be provided to one or more business applications (e.g., a technician scheduling and dispatch application, an employee evaluation application, a quality assessment application, an excavator notification application, a risk assessment application, a ticket approval application, a billing application, etc.) to provide valuable information to one or more parties associated with the locate and/or marking operation.

With reference again to FIG. 2, 3 or 3A-3D, a given technician activity log originally generated on one or more pieces of locating equipment (e.g., the technician activity log 137 generated by the marking device 110 and stored in local memory 122) may be communicated between one or more remote computers (e.g., the remote computer 150) and the locating equipment (e.g., the marking device 110). Such transmission may take place at any appropriate time, for example, at various stages during the locate and/or marking operation and/or upon completion of the locate and/or marking operation. Furthermore, the one or more remote computers may store the received technician activity log in a suitable storage for recordkeeping. Additionally, the one or more remote computers may analyze the received technician activity log to assess various aspects of the quality of the locate and/or marking operation.

The high-level functionality of the ticket processing software 113, as outlined in the method 185 of FIG. 6, may be employed in some embodiments of the present invention to facilitate extraction of ticket information from tickets, which ticket information may be used thereafter as a basis for providing a technician with more concise guidance with respect to performing a locate and/or marking operation, and or verifying in some manner actual performance of the operation. For example, as discussed above in connection with the block 186, ticket information (whether provided by ticket processing software 113 or other systems/methods) may be used to generate any of a variety of process guides, examples of which include (but are not limited to) work orders, checklists and/or workflows, to facilitate locate and/or marking operations. Examples of work orders, checklists, and workflows are discussed in turn further below. Furthermore, as discussed in greater detail below, each of a work order, a checklist, and a workflow itself may be used in whole or part as part of, and/or to generate, other iterations of process guides (e.g., a work order, originally generated based at least in part on ticket information, may in turn be used to generate a checklist and/or a workflow; a checklist, originally generated from a work order, may be included as part of a workflow).

Figure 7:
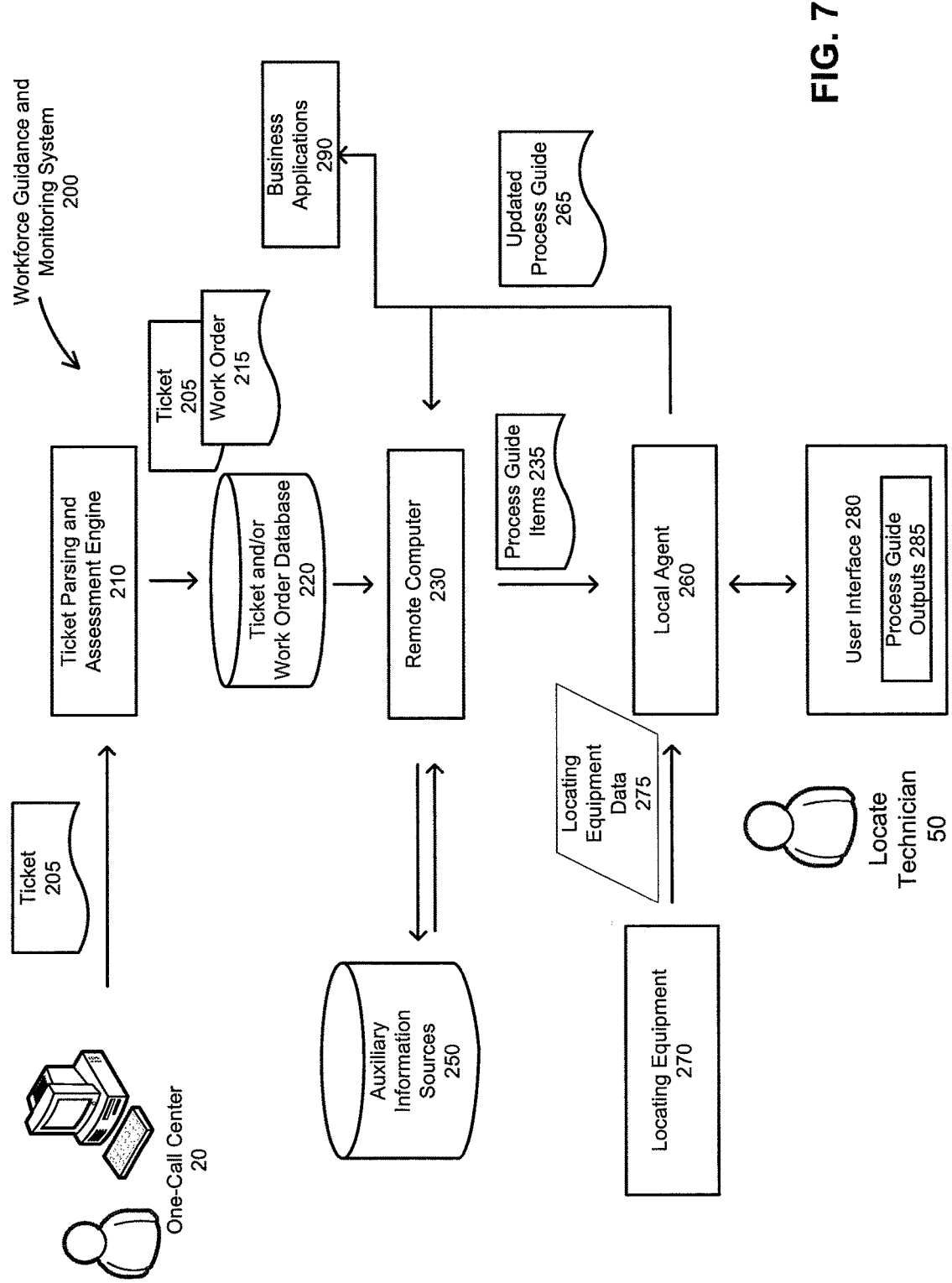
FIG. 7 shows an illustrative example of a workforce guidance and monitoring system for implementing the ticket processing method of FIG. 6 so as to facilitate and/or verifying locate and/or marking operations according to some embodiments of the present invention.

FIG. 7 shows an illustrative example of a workforce guidance and monitoring system 200 for facilitating and/or verifying locate and/or marking operations, according to one embodiment of the present invention. In some aspects, the workforce guidance and monitoring system 200 may implement some or all of the functionalities provided by the ticket processing software 113 described above with reference to FIGS. 2-6, such as parsing a ticket to extract ticket information, assessing the ticket information, providing guidance to a technician, monitoring technician activities and/or providing real time updates. As such, various aspects of the workforce guidance and monitoring system 200 described below may be viewed as more detailed and/or alternative implementations for the ticket processing software 113 of FIGS. 2-6.

In some exemplary implementations discussed below for purposes of illustrating salient concepts, the system 200 may be operated by a locate service provider (e.g., the locate service provider 30 shown in FIG. 1) that dispatches locate technicians to perform locate and/or marking operations in the field. However, it should be appreciate that the system 200 is not limited in this respect, as the system 200 may be implemented and/or employed by other entities (e.g., facility owners, regulatory authorities, other agencies) who in some manner are related to dispatching mobile technicians to perform one or more tasks (e.g., as part of a field service operation).

The workforce guidance and monitoring system 200 may include multiple components adapted to communicate with each other, for example, via one or more networks (not shown). Stated differently, one or more aspects of the system 200 may be executed on one or more processors, and multiple processors executing some portion of the system 200 may be disposed in geographically diverse locations. Accordingly, different components of the system 200 may reside on any suitable combination of computing devices in any suitable configuration, as the present disclosure is not limited in this respect. The computing devices may be equipped with any wired and/or wireless communication interfaces (as discussed above in connection with FIGS. 2 and 3) by which information may be exchanged between the various system components.

In the example shown in FIG. 7, the workforce guidance and monitoring system 200 may receive a locate request ticket 205 from a one-call center 20 (as discussed above in connection with FIG. 1). The locate service provider may process and analyze the received ticket 205 and any associated images, in preparation of dispatching one or more locate technicians to perform one or more locate and/or marking operations corresponding to the ticket 205. For example, the locate service provider may use a ticket parsing and assessment engine 210 to parse the ticket 205 to extract relevant information and to assess one or more aspects of the requested locate and/or marking operation, such as location, scope, complexity, duration, risk, value, skill requirements and the like. These assessment outcomes may be used to improve various aspects of the business operations of the locate service provider, such as activity scheduling, resource allocation, quality control and/or regulatory compliance. Exemplary ticket assessment methods and applications are discussed in U.S. provisional application Ser. No. 61/220, 491, filed on Jun. 25, 2009, and entitled "METHODS AND APPARATUS FOR ASSESSING FIELD SERVICE OPERATION TICKETS," which application is hereby incorporated herein by reference.

In some embodiments, the result of parsing and assessing the ticket 205 may be summarized in one or more corresponding work orders 215, which may be stored in a ticket and/or work order database 220 in association with the ticket 205. Further details regarding exemplary work orders are discussed below in connection with FIG. 8.

As shown in FIG. 7, in connection with other types of process guides that may be used to facilitate and/or verify a locate and/or marking operation (e.g., checklists, workflows), the workforce guidance and monitoring system 200 includes one or more remote computers 230 configured to implement a process guide generator that processes the tickets and/or work orders stored in the database 220 to produce one or more process guide items 235. The process guide generator may apply any suitable techniques in generating the process guide items, as the present disclosure is not limited in this respect. For example, as discussed in greater detail below in connection with FIG. 11, the process guide items may correspond to types of facilities to be located, which facility types may be extracted from a ticket and/or a work order. Alternatively, as discussed in greater detail below in connection with FIGS. 12A-C, the facilities types may be selected either manually or automatically based on one or more facilities maps and dig area indicators.

In addition to ticket information, the process guide generator may access one or more auxiliary information sources 250, including, but not limited to, facilities maps, historical tickets, standard operating procedures (SOP) information, industry best practice guides, and the like. Any combination of these information sources may be used in conjunction with ticket information for producing process guide items. For instance, in some embodiments, a facilities map may be retrieved based on location information contained in a ticket or work order, and may be compared against a dig area indicator extracted from an associated VWL image to determine the types of facilities to be located. As another example, SOP information and/or industry best practice guides may be used to determine a number of process guide items relating to locating and/or marking a particular facilities type (e.g., gas). These and other examples of auxiliary information sources and their uses in generating exemplary process guides according to various embodiments of the present invention are further described in connection with FIGS. 9 and 10.

Although in the illustrated embodiment the process guide generator resides at the remote computer 230, it should be appreciated that the present disclosure is not so limited. Rather, process guide items may be generated, in whole or in part, anywhere within a workforce guidance and monitoring system. For example, they may be generated on a central server based on ticket information accessible to the central server and transmitted to a computing device used by a locate technician. As another example, they may be generated on the computing device used by the locate technician (e.g., after a ticket has been dispatched to the locate technician). As yet another example, process guide items may be generated on a computing device integrated with a piece of locating equipment, such as a marking device, a locate transmitter, a locate receiver or a combined locate and marking device.

Once generated by the process guide generator, the process guide items 235 may be stored in a suitable database and/or transmitted to another computing device for further processing. For example, as shown in FIG. 7, the process guide items 235 may be transmitted to a local agent 260, which may reside, in whole or in part, on a computing device used by a technician or team of technicians performing locate and/or marking operations in the field. As a more specific example, the local agent 260 may include a set of processor-executable instructions and reside on a marking device used by the technician (e.g., on the marking device 110 shown in FIG. 2 and implemented by the processor 118). Also, although the local agent 260 and the remote computer 230 are shown separately in FIG. 7, the local agent 260 may, in some embodiments, reside in whole or in part on the remote computer 230.

The local agent 260 may be configured to process received process guide items and produce one or more corresponding process guide outputs to be presented to the locate technician to provide instructions and/or guidance during a locate and/or marking operation. For example, as shown in FIG. 11 and described in greater detail below, a process guide output may be a checklist, e.g., visual display of a list of work items to be reviewed and checked off by the technician during, or upon completion of, the locate and/or marking operation. Another example of a process guide, discussed below in connection with FIGS. 14-19, may be workflow, e.g., a step-by-step a set of instructions and/or prompts for guiding the technician. More generally, a process guide output may include any visual, audio and/or tactile cues for providing information to the technician in connection with one or more process guide items.

In some embodiments, the process guide output 285 may be presented via a user interface 280, which may allow the locate technician to acknowledge process guide items prior to performance and/or to provide updates and feedback relating to the workflow items. The user interface 280 may reside on a same computing device as the local agent 260, on a different computing device, or on any suitable combination of computing devices. It may include any suitable combination of hardware and software configured to allow a locate technician to interact with a process guide output. In one embodiment, the user interface 280 may include one or more output devices, such as a display screen (e.g., the display 146 of the marking device 110 shown in FIGS. 2 and 3). In a further embodiment, the user interface 280 may additionally include one or more input devices, such as a keyboard and/or touchpad (e.g., as part of the user interface 126 of marking device 110). In another embodiment, the user interface 285 may include a combined input and output device, such as a touch screen. In yet another embodiment, the user interface 280 may be speech-enabled, and may include text-to-speech components for audibly rendering a process guide output and/or voice recognition components for receiving voice inputs from the technician.

In the example shown in FIG. 7, the local agent 260 is further adapted to receive locating equipment data 275 from locating equipment 270, which may be any suitable combination of equipment used by a locate technician in the field for performing locate and/or marking operations. The locating equipment 270 may include various components configured to collect data during a locate and/or marking operation. For example, the locating equipment 270 may include a marking device having: a marking material detection mechanism, an actuator, a location tracking system, a temperature sensor, a humidity sensor, a light sensor, a compass, an inclinometer, an accelerometer, an image capture device and/or an audio recorder (e.g., as discussed above in connection with FIGS. 2 and 3 regarding an exemplary marking device). Other sensing and/or detection mechanisms may also be suitable, as the present disclosure is not limited in this respect.

In some embodiments, the data collected by the locating equipment 270 may be transmitted directly to the local agent 260 for further processing and analysis. Alternatively, the locating equipment 270 may perform some preliminary processing to part or all of the collected data prior to sending the data to the local agent 260. For instance, the locating equipment 270 may be configured to process and/or assemble collected data into one or more actuation data sets in a standard format for consumption by the local agent 260. As a more specific example, an actuation data from a marking device may include information such as a time stamp, geographic coordinates corresponding to one or more actuations, color of marking material dispensed and the like. Further details regarding examples of actuation data sets are discussed below in connection with Tables 1 and 2.

Although not shown in FIG. 7, the local agent 260 may include one or more data analysis components for processing the locating equipment data 275 received from the locating equipment 270. For instance, a data analysis component may be configured to extract relevant information from the locating equipment, process the extracted information, and automatically provide status updates with respect to one or more related process guide items. As a more specific example, a data analysis component may be configured to process marking device data to determine the types of facilities being marked (e.g., based on the color of marking material dispensed) and automatically provide acknowledgments for one or more marking tasks on a process guide. As another example, a data analysis component may compare locate receiver data and marking device data to determine whether the types of facilities marked match the types of facilities detected. As yet another example, a data analysis component may compare locating equipment data with any suitable data retrieved from the auxiliary information sources 250.

In some embodiments, the local agent 260 may also provide real-time feedback to the locate technician based on its data analyses. For example, if a data analysis component detects a discrepancy in any aspect of a locate and/or marking operation, an alert may be generated and delivered to the locate technician, so that he may implement any desirable corrective actions before leaving the work site. Other types of feedback may also be suitable, as the present disclosure is not limited in this respect.

As the local agent 260 interacts with a locate technician via the user interface 280 and/or receives locating equipment data from the locating equipment 270, it may update the process guide items 235 received from the process guide generator. For example, the updates may include simple acknowledgments indicating one or more process guide items having been completed. Alternatively, the updates may include more extensive reports regarding one or more process guide items, which may summarize actions taken by the locate technician and the corresponding results.

Based on these and/or other updates, an updated process guide 265 (e.g., including a technician activity log) may be generated and transmitted to one or more remote computers for further analysis and/or review. For example, in the embodiment shown in FIG. 7, the updated process guide 265 may be transmitted back to the remote computer 230 that generated the process guide items 235. This may advantageously allow the remote computer 230 to use the information contained in the updated process guide 265 to modify one or more of the process guide items 235 and/or generate additional process guide items. For example, the remote computer 230 may automatically analyze the technician activity log included in the updated process guide 265 to determine whether a certain process guide item has been satisfactorily addressed and may generate one or more follow-up process guide items accordingly. As another example, in the event that the technician encountered certain unanticipated circumstances and was unable to complete a certain process guide item, the remote computer 230 may prompt a supervisor to review the updated process guide 265 and provide further guidance to the technician. For example, the supervisory personnel may modify one or more process guide items in view of the updated information.

As discussed above, the transmission of an updated process guide 265 from the local agent 260 to a remote computer may occur from time to time during the locate and/or marking operation, for example, when each process guide item is checked off and/or when the technician indicates he is unable to complete a certain process guide item. Alternatively, the updated process guide 265 may be transmitted upon completion the locate and/or marking operation for recordkeeping and final quality review.

Additionally, as shown in FIG. 7, in some embodiments an updated process guide 265 may be transmitted to one or more business applications 290. For example, an updated process guide may be transmitted to a scheduling and dispatch application either during the course of a locate and/or marking operation or shortly after its completion. This may enable the scheduling and dispatch application to make any desirable scheduling adjustments in real time, for example, to improve the efficiency and/or effectiveness of a fleet of technicians as a whole. In another example, an acknowledgement of the actual work performed for a ticket (e.g., based at least in part on a technician activity log/ updated process guide/completed ticket) may be generated and provided to, for example, the customer and/or a billing application of the locate company. Similarly, an invoice or receipt for the locate operation could be provided. Such an invoice or receipt may be automatically generated based on the actual work performed (e.g., as indicated by the status items of a technician activity log/updated process guide/ completed ticket).

In some further embodiments, in other examples of business applications 290, an updated process guide may be transmitted to one or more review and assessment applications after the corresponding locate and/or marking operation has been completed. Examples of such review and assessment applications include, but are not limited to, an employee evaluation application, a locate and/or marking operations quality assessment application, a data analysis application, an excavator notification application, a risk assessment application and a ticket approval application. Such an application may analyze the received updated process guide and make informed decisions, for example, with respect to resource allocation, inventory and/or employee training. It may further update information stored in the auxiliary information sources 250 according to the received process guide, for example, by detecting and reconciling any discrepancies and/or by updating relevant statistics. These and other similar practices may be designed to improve overall operating efficiency and profitability of a locate service provider.

As discussed above, various components of the workforce guidance and monitoring system 200 of FIG. 7 may be adapted to communicate with each other via one or more networks and may reside on any suitable combination of computing devices in any suitable configuration. For example, in some embodiments, certain components of the workflow system 200, such as the ticket parsing and assessment engine 210, the remote computer 230 and/or any number of the other business applications, may reside on a central server or cluster of servers. Each of the ticket and/or work order database 220 and the auxiliary information sources 250 may be accessible to any of these applications in any suitable manner, for example, via a network connection.

In some further embodiments, the local agent 260 may reside on a computing device used by a technician or team of technicians performing locate and/or marking operations in the field, which may be any suitable device capable of processing and executing program instructions, including, but not limited to, a laptop computer, a tablet device, a personal digital assistant (PDA) a cellular radiotelephone, and/or other portable/mobile device. As discussed above, the computing device may be equipped with a suitable combination of input and output devices for presenting a user interface to a locate technician. As a more specific example, the local agent 260 may reside on a computing device installed on a vehicle driven by a locate technician. As another example, the local agent 260 may reside on a mobile computing device adapted to be carried by a locate technician. An yet another example, the local agent 260 may be incorporated into a piece of locating equipment, such as a marking device, a locate transmitter, a locate receiver or a combined locate and marking device. Each of the computing devices discussed above may be equipped with one or more suitable communication interfaces to enable exchange of information between the various workflow system components that run on the devices. Any suitable communication technologies may be used (e.g., wired and/or wireless), as the present disclosure is not limited in this respect.

Furthermore, a workforce guidance and monitoring system according to the present disclosure is not limited to the combination of components explicitly shown in FIG. 7 and/or discussed herein. Other combination of components may also be suitable. For example, a guidance and monitoring system may additionally include one or more auxiliary applications, such as a VWL application for generating and/or manipulating VWL images and a geographic information system (GIS) for performing location-related analyses. These auxiliary applications may be accessible through one or more servers (e.g., web servers).

V. Work Orders

FIG. 8 shows an example of an work order 215, according to one embodiment of the invention, that may be created as a result of executing ticket processing software 113 of FIGS. 2 and 3 to process (e.g., parse and assess) a received locate request ticket (including any associated VWL images), as illustrated by the method of FIG. 6 for example. In particular, as discussed in connection with the system 200 of FIG. 7, the work order 215 may be generated by the ticket parsing and assessment engine 210 and/or stored in the ticket and/or work order database 220. Furthermore, in exemplary implementations, the work order 215 may be displayed on one or more pieces of locating equipment to facilitate performance of a locate and/or marking operation.

The work order 215 may include a plurality of information elements extracted from the exemplary ticket 205 shown in FIG. 4, such as ticket number 502, address of work site 504, excavation information 506, due date information 508, excavator information 510 and the like. In some embodiments, some of these information elements may be presented in the work order 215 in a different format compared to the ticket 205. The work order 215 may also include additional information elements, such as a work order number 512 different from the ticket number 502 (e.g., multiple different work orders may be created based on the same ticket), a scheduled work begin date/time 514A (e.g., as determined by a scheduling and dispatch application) and an expected duration 514B (e.g., as determined by the ticket parsing and assessment engine 210 shown in FIG. 7).

The work order 215 may also include work order task information 516 listing the facilities types to be located within this work order. This information may be obtained based on member code information contained in a corresponding ticket (e.g. the member codes 314 shown in FIG. 4). For example, for each member code listed in the ticket, it may be determined whether the locate service provider has a contract to locate facilities for the corresponding member. If there is a contract, it may be determined which facilities types may be covered by the contract and whether the work site is likely to contain facilities of those types operated by that particular member (e.g., based on a work site address and facilities maps provided by the member). As a more specific example, the member "PECO WRTR" may be listed on the ticket 205 (see FIG. 4), and the locate service provider may be under contract to locate both gas and electrical lines for that member. As a result, the utilities types "Gas" and "Electric" may be listed in the work order task information 516 of the work order 215 (see FIG. 8). By contrast, the locate service provider may not be under contract to locate any facilities for the member "BUCKS CNTY W&SA," therefore the work order 215 may not list any facilities types associated with that member, even though its member code is listed on the ticket 205.

Although not shown in FIG. 8, a work order may have attached thereto one or more VWL images (e.g., the VWL image 400 shown in FIG. 5A) and/or any corresponding VWL data sets (e.g., the VWL data set 430 shown in FIG. 5C). Alternatively, a work order may include any constituent data elements of a VWL data set. For example, a work order may include VWL coordinates identifying the location of one or more dig site indicators, with or without an underlying image.

It should be appreciated that while the method of FIG. 6 and the system of FIG. 7 may be employed to generate a work order based at least in part on ticket information, methods and systems according to various embodiments of the present invention also may use a previously generated work order as an input to generate another form of process guide to facilitate and/or verify a locate and/or marking information. Exemplary process guides such as checklists and workflows, which may be based on original tickets, work orders, or ticket information derived from any of a variety of sources, are discussed further below in connection with FIGS. 11-19.

VI. Auxiliary Information Sources for Process Guide Generation

Figure 9:
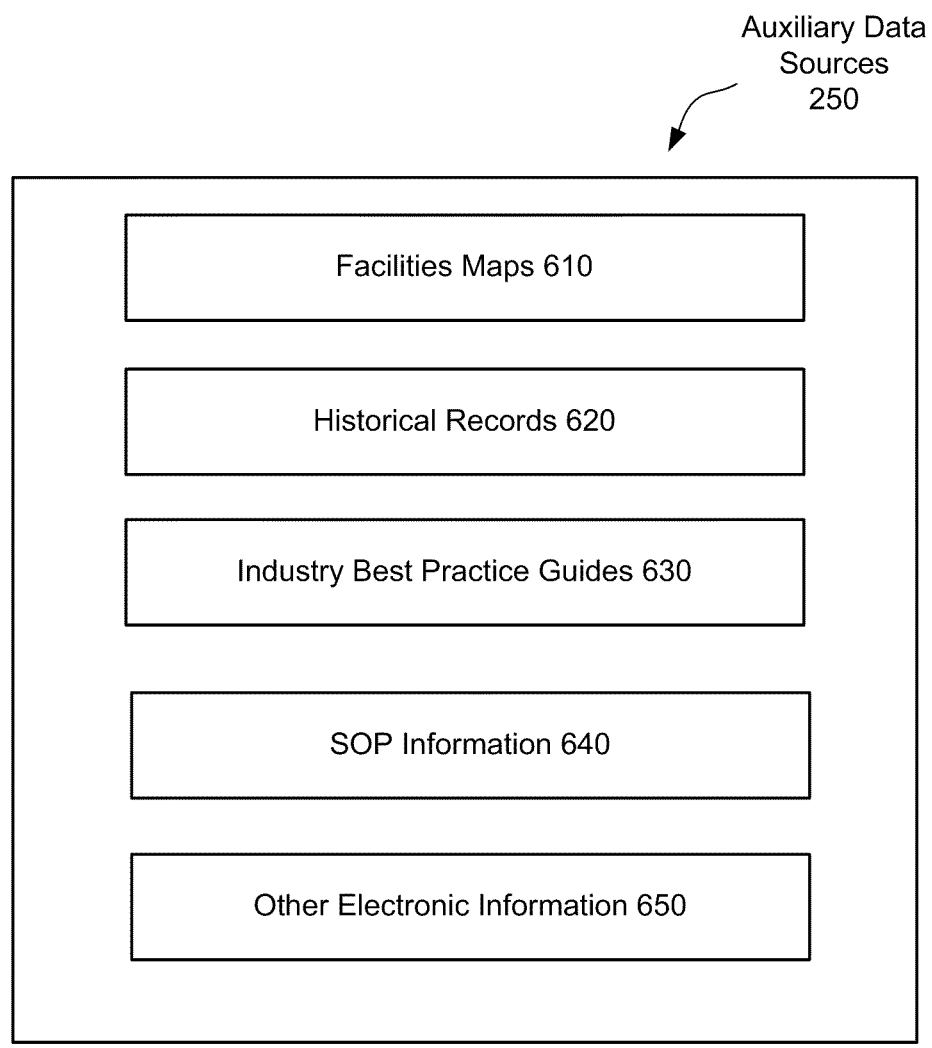
FIG. 9 shows illustrative examples of auxiliary information sources that may be accessed and/or updated by various components of the method of FIG. 6 or the system of FIG. 7, according to some embodiments of the present invention.

As discussed above in connection with the system 200 shown in FIG. 7, in addition to ticket information, the process guide generator may access one or more auxiliary information sources 250, including, but not limited to, facilities maps, historical tickets, standard operating procedures (SOP) information, industry best practice guides, and the like. Any combination of these information sources may be used in conjunction with ticket information for producing process guide items. FIG. 9 shows illustrative examples of auxiliary information sources 250 that may be accessed and/or updated by various components of a workforce guidance and monitoring system (e.g., the remote computer 230 and the local agent 260 shown in FIG. 7, and other business applications).

In some embodiments, the auxiliary information sources 250 may include one or more facilities maps 610 illustrating installed aboveground and/or underground facilities, such as gas, power, telephone, cable, fiber optics, water, sewer, drainage and the like. Additionally, the facilities maps may indicate the presence of certain environmental landmarks such as streets, buildings, public facilities and the like. In some further embodiments, a facilities map may additionally include metadata, such as geo-location information for one or more features shown on the map.

Figure 10:
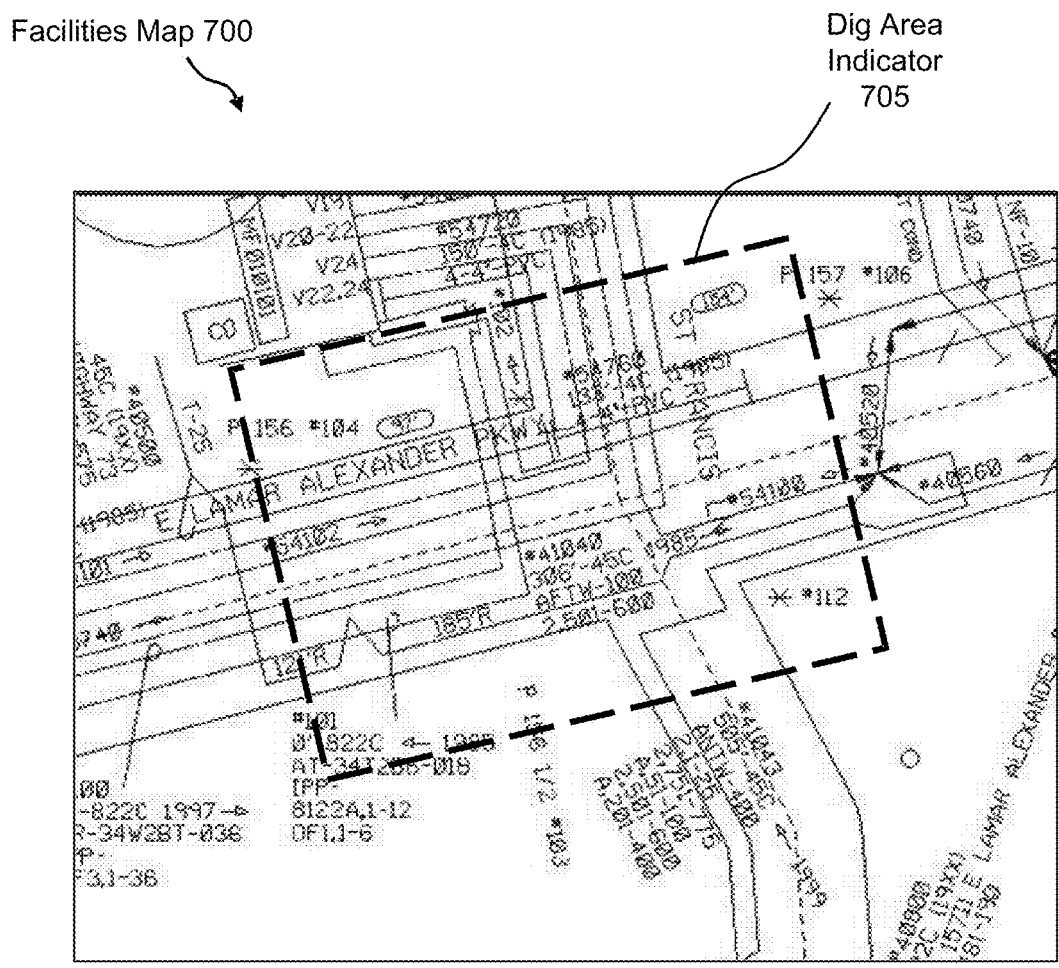
FIG. 10 illustrates an example of a facilities map that has a virtual white lines overlay, which may be useful in the method of FIG. 6 or the system of FIG. 7, according to some embodiments of the present invention.

Facilities maps may be obtained from any suitable source, as the present disclosure is not limited in this respect. In some embodiments, they may be provided by respective facility owners. For example, a gas company may generate and maintain facilities maps of gas lines, a power company may generate and maintain facilities maps of power lines, and so on. Furthermore, facilities maps may be prepared directly in electronic form, or first on paper and then converted into electronic form. FIG. 10 shows an example of a facilities map 700 according to some embodiments of the present disclosure. Using geographic information associated with the facilities map 700 and VWL coordinate information, a dig area indicator 705 may be overlaid onto the facilities map 700 to indicate a planned dig area.

Returning to FIG. 9, the auxiliary information sources 250 may, in some embodiments, include a collection of historical records 620, which may include any information associated with locate and/or marking operations that have been completed in the past and may be updated over time. For example, in some embodiments, a historical record may include any combination of the following: a past ticket received from a one-call center and any associated VWL images, one or more work orders generated based on the past ticket, locating equipment data collected during one or more locate and/or marking operations performed in connection with the past ticket, and completed work orders submitted by one or more locate technicians who performed the locate and/or marking operations, which may include photographs and/or electronic manifests. Other types of information may also be suitable, as the present disclosure is not limited in this respect.

In some further embodiments, the auxiliary information sources 250 may include industry best practice guides 630 and/or standard operating procedures (SOP) information 640, both of which may be used for providing guidance to a technician with respect to a locate and/or marking operation. For example, as discussed above in connection with FIG. 7, industry best practice guides and/or SOP information may be used in generating process guide items to be completed or otherwise attended to by the technician.

The industry best practice guides 630 may reflect current industry-accepted recommended practices and/or procedures with respect to underground facility locate and/or marking operations. An example of a best practices guide for the locate and marking industry which may inform the generation of process guide items according to various concepts discussed herein, is the Best Practices Version 6.0 document, published in February 2009 by the Common Ground Alliance (CGA) of Alexandria, Va. (www.commongroundalliance.com), which document is hereby incorporated herein by reference (this document is a compilation of current recommended practices designed to prevent damages to underground facilities).

The SOP information 640 may be similar to the industry best practice guides 630 in that both may provide some level of guidance as to how a locate and/or marking operation should be performed under certain circumstances. However, in addition to recommendations that may be applicable industry wide, the SOP information 640 may incorporate information that are more specific to the recommended practices for a particular locate service provider. Thus, generally speaking, the SOP information 640 may include more detailed recommendations compared to the industry best practice guides 630. Also, the SOP information 640 may set forth different recommendations and/or standards compared to the industry best practice guides 630, for example, according to the locate service provider's own risk tolerance.

For example, depending on where the locate service provider operates, the SOP information 640 may take into account any applicable state, local and/or regional regulations with respect to underground facility locate and/or marking operations. If the locate service provider operates in multiple jurisdictions, different sets of SOP information may be maintained and observed by employees in the respective jurisdictions. As another example, the SOP information 640 may take into account the locate service provider's internal policy information. As yet another example, the SOP information 640 may take into account relevant terms from the locate service provider's external contracts, such as contracts with facilities owners and/or damage insurance companies.

Returning to FIG. 9, the auxiliary information sources 250 may include any other suitable types of electronic information 650 that may be useful in facilitating and/or verifying a locate and/or marking operation, in additional to, or instead of, the examples of information sources described above. For example, the image server 424 shown in FIG. 5B may be included as an auxiliary information source and the input images stored therein may be made available to any component in a workforce guidance and monitoring system.

VII. Locating Equipment Data for Process Guide Generation

As discussed above in the system of FIG. 7, the local agent 260 may receive locating equipment data 275 from locating equipment 270 to provide information relevant to the execution of a process guide provided by the process guide generator.

As noted above, a locate technician may use locating equipment, such as a locate instrument set (including a locate receiver device), a marking device, or a combined locate and marking device, so as to perform a locate and/or marking operation. Locating equipment data 275 may be any information that is collected and/or generated (e.g., one or more electronic records) by any type of locating equipment equipped with components that are capable of collecting electronic information and/or creating electronic records about locate and/or marking operations that are performed in the field. In some examples, locating equipment data is constituted by "marking information" (e.g., the marking device 110 described above in connection with FIGS. 2 and 3) that is associated generally with the marking functionality of a locate and/or marking operation, and/or "locate information" that is associated generally with the locating/detection functionality of a locate and/or marking operation. Locating equipment data also may include "landmark information" that may be acquired by suitably configured locating equipment (e.g., a marking device, a locate device, or a combined locate and marking device capable of operating in a "landmark mode"), which information may be acquired either independently or as part of (e.g., during or proximate in time to) a locate and/or marking operation.

Table 1 shows one example of a sample of marking device data of locating equipment data 275 that may be captured as the result of, for example, an actuation of a marking device. In some exemplary implementations, an electronic record of a marking operation may include multiple data entries as shown in the example of Table 1 for respective actuations of a marking device to dispense a marking material (e.g., in some cases there may be one set of data as shown in Table 1 for each actuation). In this manner, each time a marker is placed (so as to indicate a presence or absence of a given facility), data is collected relating to the geographic location of the placed marker (e.g., geo-location data). Additionally, data relating to a characteristic of the placed marker (e.g., color and/or brand) is included in the data entries of the electronic record, as well as other data germane to the marking operation.

TABLE 1

| Example marking device data of locating equipment data 275 | |
|---|---|
| Service provider ID | 0482 |
| Locate technician ID | 4815 |
| Marking Device ID | 7362 |
| Timestamp data | 12-Jul-2008; 09:35:15.2 |
| Geo-location data | N35°43.57518, W078°49.78314 |
| Marking material data | Color=Red, Brand=ABC |
| Temperature data | 73 degrees F |
| Humidity data | 30% |
| Light data | 4.3 volts |
| Compass data | 213 degrees |
| Inclinometer data | −40 |
| Accelerometer data | 0.275g |
| Battery strength data | 73% |

Table 2 below shows another example of marking device data that may be captured as the result of, for example, one or more actuations of a marking device. Specifically, Table 2 illustrates multiple "actuation data sets" of an electronic record of a marking operation as generated by a marking device, in which each actuation data set includes information associated with multiple actuation event entries logged during a corresponding actuation and dispensing of a locate mark. Table 2 shows three actuation data sets of an electronic record, corresponding to three actuations of the marking device (e.g., act-1, act-2, and act-3). As may be appreciated from the information shown in Table 2, multiple pieces of geo-location data are logged for each actuation of a marking device (in addition to various other information).

TABLE 2

| | Example actuation data set for act-1 | |
|---|---|---|
| act-1 | Service provider ID | 0482 |
| | User ID | 4815 |
| | Device ID | 7362 |
| | T1 timestamp data | 12-Jul-2008; 09:35:15.2 |
| | T2 timestamp data | 12-Jul-2008; 09:35:16.1 |
| | Duration (Δt) | 00:00:00.9 |
| | T1 geo-location data | 2650.9348,N,08003.5057,W |
| | $1^{st}$ interval location data | 2650.9353,N,08003.5055,W |
| | $2^{nd}$ interval location data | 2650.9356,N,08003.5055,W |
| | . | . |
| | . | . |
| | . | . |
| | Nth interval location data | 2650.9246,N,08003.5240,W |
| | T2 geo-location data | 2650.9255,N,08003.5236,W |
| | Product data | Color=Red, Brand=ABC, Type/Batch = 224B-1 |
| | Locate request data | Requestor: XYZ Construction Company, Requested service address: 222 Main St, Orlando, FL |
| | Example actuation data set for act-2 | |
| act-2 | Service provider ID | 0482 |
| | User ID | 4815 |
| | Device ID | 7362 |
| | T1 timestamp data | 12-Jul-2008; 09:35:17.5 |
| | T2 timestamp data | 12-Jul-2008; 09:35:18.7 |
| | Duration (Δt) | 00:00:01.2 |
| | T1 geo-location data | 2650.9256,N,08003.5234,W |
| | 1st interval location data | 2650.9256,N,08003.5226,W |
| | $2^{nd}$ interval location data | 2650.9256,N,08003.5217,W |
| | . | . |
| | . | . |
| | . | . |

TABLE 2-continued

| | |
|---|---|
| Nth interval location data | 2650.9260,N,08003.5199,W |
| T2 geo-location data | 2650.9266,N,08003.5196,W |
| Product data | Color=Red, Brand=ABC, Type/Batch = 224B-1 |
| Locate request data | Requestor: XYZ Construction Company, Requested service address: 222 Main St, Orlando, FL |

Example actuation data set for act-3

| | | |
|---|---|---|
| act-3 | Service provider ID | 0482 |
| | User ID | 4815 |
| | Device ID | 7362 |
| | T1 timestamp data | 12-Jul-2008; 09:35:18.7 |
| | T2 timestamp data | 12-Jul-2008; 09:35:19.8 |
| | duration (Δt) | 00:00:01.1 |
| | T1 geo-location data | 2650.9273,N,08003.5193,W |
| | 1st interval location data | 2650.9281,N,08003.5190,W |
| | $2^{nd}$ interval location data | 2650.9288,N,08003.5188,W |
| | . | . |
| | . | . |
| | . | . |
| | Nth interval location data | 2650.9321,N,08003.5177,W |
| | T2 geo-location data | 2650.9325,N,08003.5176,W |
| | Product data | Color=Red, Brand=ABC, Type/Batch = 224B-1 |
| | Locate request data | Requestor: XYZ Construction Company, Requested service address: 222 Main St, Orlando, FL |

With regard to the marking material color information that may be included in the marking device data as exemplified in Tables 1 and 2, Table 3 shows an example of a mapping between marking material color and the type of facility to be marked.

TABLE 3

Correlation of color to facility type

| Marking material color | Facility Type |
|---|---|
| White | Proposed excavation |
| Pink | Temporary survey markings |
| Red | Electric power lines, cables or conduits, and lighting cables |
| Yellow | Gas, oil, steam, petroleum, or other hazardous liquid or gaseous materials |
| Orange | Communications, cable TV, alarm or signal lines, cables, or conduits |
| Blue | Water, irrigation, and slurry lines |
| Purple | Reclaimed water, irrigation and slurry lines |
| Green | Sewers, storm sewer facilities, or other drain lines |
| Black | Mark-out for errant lines |

In some embodiments, locate receiver data may be electronic information (e.g., one or more electronic records) of data that is provided by electronic locate receiver devices and/or systems. Examples of a locate receiver device that may provide locate receiver data are described in U.S. Non-provisional application Ser. No. 12/569,192, filed on Sep. 29, 2009, entitled "Methods, Apparatus, and Systems for Generating Electronic Records of Locate and Marking Operations, and Combined Locate and Marking Apparatus for Same;" U.S. Provisional Patent Application Ser. No. 61/151,578, entitled "Locating equipment that has enhanced features for increased automation in underground facility locate applications;" and U.S. Provisional Patent Application Ser. No. 61/102,122, filed on Oct. 2, 2008, entitled "Combination Locate and Marking Device With a Data Acquisition System Installed Therein, and Associated Methods," which applications are both hereby incorporated herein by reference in their entirety.

Table 4 below shows an example of a sample of locate receiver data that may be captured, for example, at one or more times during operation/use of an appropriately configured locate receiver. Different models of locate receivers and transmitters are available from a variety of manufacturers and have different features; accordingly, it should be appreciated that the information content and type provided in Table 4 is exemplary of possible information relating to locate receivers on which a quality assessment of a locate and/or marking operation may be based, and that other types and values for information are possible. With respect to information potentially provided by a given locate receiver as shown in Table 4 below, the "gain" is typically a measure of the degree of sensitivity of a locate receiver antenna that is picking up a signal emanating from along an underground facility (alternatively, "gain" may be viewed as a degree of amplification being applied to a received signal). Gain may be expressed in terms of any scale (e.g., 0-100), as a numeric value or percentage. "Signal strength" refers to the strength of a received signal at a given gain value; signal strength similarly may be expressed in terms of any scale, as a numeric value or percentage. Generally speaking, higher signal strengths at lower gains typically indicate more reliable information from a locate receiver, but this may not necessarily be the case for all locate and/or marking operations.

In some illustrative implementations, an electronic record of a locate and/or marking operation as obtained from a locate receiver may include multiple data entries as shown in the example of Table 4. Each such entry may not only include information about various operating parameters of the locate receiver (e.g., signal strength, gain), but may additionally include location information (geo-location data) associated with detected facilities, as well as various environmental data. The logging of a given entry by a locate receiver may automatically result from one or more conditions (e.g., signal strength exceeding a particular threshold). Additionally, or alternatively, data entries may be manually logged by a technician using the locate receiver (e.g., via a push button, touch screen, trigger actuation, or other interaction facilitated by a user interface of the locate receiver). In this manner, multiple pieces of data may be collected for an electronic record of a locate and/or marking operation, including multiple pieces of geo-location data for a given underground facility detected via the locate receiver.

TABLE 4

Example locate receiver data of locating equipment data 275

| | |
|---|---|
| Service provider ID | 0482 |
| Locate technician ID | 4815 |
| Locate Device ID | 7345 |
| Timestamp data | 12-Jul-2008; 09:35:15.2 |
| Geo-location data | N35°43.57518, W078°49.78314 (deg. and dec. min.) |
| Locate mode | Mode=PASSIVE |
| Gain | 35 (on a scale of 1-100) |
| Sig. strength | 85% (on a scale of 0-100%) |
| Signal frequency | 60 Hz |
| Facility depth | 3.4 feet |
| Temperature data | 73 degrees F |
| Humidity data | 30% |
| Light data | 4.3 volts |
| Compass data | 213 degrees |
| Inclinometer data | −40 |
| Accelerometer data | 0.275g |
| Battery strength data | 85% |

In some other embodiments, both marking device data and locate receiver data may be electronic information (e.g., one or more electronic records) of data that is provided by a combined locate and marking device. An example of such a combined locate and marking device is described in U.S. Non-provisional application Ser. No. 12/569,192, filed on Sep. 29, 2009, entitled "Methods, Apparatus, and Systems for Generating Electronic Records of Locate and Marking Operations, and Combined Locate and Marking Apparatus for Same," and U.S. Provisional Patent Application Ser. No. 61/102,122, filed on Oct. 2, 2008, entitled "Combination Locate and Marking Device With a Data Acquisition System Installed Therein, and Associated Methods," which applications are both hereby incorporated herein by reference in their entirety.

Table 5 below illustrates a non-limiting example of four actuation data sets that may be collected in an electronic record generated by a combined locate and marking device, in which each data set corresponds, for example, to a separate actuation event to dispense marking material. It should be appreciated, however, that these are merely examples, and that various alternative electronic records may be generated according to the aspects of the invention, for example reflecting different types of information associated with operations of a combination locate and marking device.

Each of the four records of Table 5 includes general information not limited to either the locate receiver functionality or the marking functionality of a combination device. Examples of the general information include, but are not limited to, an identification of a locate service provider (Service provided ID), an identification of a locate technician (User ID), an identification of a locate and/or marking device (Device ID), and information about a requestor of the locate and/or marking operation and the requested address (Locate request data). In addition, an entry describing the mode of data collection (e.g., Manual) for the device may also collected, which may indicate that information is logged into one or more records upon actuations of the combined locate and marking device. Information about an actuation itself, such as time of actuation (Timestamp data), actuation duration, and geographical location (geo-location data) at the start, during, and/or at and end of the actuation, may also be included. The data sets also include information relating to the locate receiver functionality of the combination locate and marking device, including a receiver detection mode (e.g., PEAK in Table 5), the strength of a detected signal, and the frequency of the detected signal. Information relating to a depth measurement (e.g., Facility depth) may also be included, as well as information about the marking material to be dispensed by the combination locate and marking device. Again, it should be appreciated that Table 5 is an illustration of one electronic record including multiple data sets that may be generated in association with the operations of a combination locate and marking device, and that other forms of electronic records are also possible.

TABLE 5

Electronic Record for Combination Locate and Marking Device

| | | |
|---|---|---|
| Record # 1001 | Service provider ID | 0482 |
| | User ID | 4815 |
| | Device ID | 7362 |
| | Device mode | Mode=MANUAL |
| | Timestamp data | 12-Jul-2008; 09:35:15 |
| | Actuation duration | 0.5 sec |
| | Start actuation location data | 2650.9348,N,08003.5057,W |
| | End actuation location data | 2650.9353,N,08003.5055,W |
| | Locate mode | Mode=PEAK |
| | Signal strength (% of maximum) | 85% |
| | Signal frequency | 1 kHz |
| | Facility depth | 3.4 meters |
| | Marking material data | Color=RED, Brand=ABC |
| | Locate request data | Requestor=XYZ Construction Company, Requested service address=222 Main St, Orlando, FL |
| Record # 1002 | Service provider ID | 0482 |
| | User ID | 4815 |
| | Device ID | 7362 |
| | Device mode | Mode=MANUAL |
| | Timestamp data | 12-Jul-2008; 09:35:18 |
| | Actuation duration | 0.4 sec |
| | Start actuation location data | 2650.9256,N,08003.5234,W |
| | End actuation location data | 2650.9256,N,08003.5226,W |
| | Locate mode | Mode=PEAK |
| | Signal strength (% of maximum) | 85% |
| | Signal frequency | 1 kHz |
| | Facility depth | 3.4 meters |
| | Marking material data | Color=RED, Brand=ABC |
| | Locate request data | Requestor=XYZ Construction Company, Requested service address=222 Main St, Orlando, FL |

TABLE 5-continued

Electronic Record for Combination Locate and Marking Device

| | | |
|---|---|---|
| Record # 1003 | Service provider ID | 0482 |
| | User ID | 4815 |
| | Device ID | 7362 |
| | Device mode | Mode=MANUAL |
| | Timestamp data | 12-Jul-2008; 09:35:21 |
| | Trigger pull duration | 0.5 sec |
| | Start actuation location data | 2650.9273,N,08003.5193,W |
| | End actuation location data | 2650.9281,N,08003.5190,W |
| | Locate mode | Mode=PEAK |
| | Signal strength (% of maximum) | 85% |
| | Signal frequency | 1 kHz |
| | Facility depth | 3.4 meters |
| | Marking material data | Color=RED, Brand=ABC |
| | Locate request data | Requestor=XYZ Construction Company, Requested service address=222 Main St, Orlando, FL |
| Record # 1004 | Service provider ID | 0482 |
| | User ID | 4815 |
| | Device ID | 7362 |
| | Device mode | Mode=MANUAL |
| | Timestamp data | 12-Jul-2008; 09:35:25 |
| | Actuation (actuation) duration | 0.5 sec |
| | Start actuation location data | 2650.9321,N,08003.5177,W |
| | End actuation location data | 2650.9325,N,08003.5176,W |
| | Locate mode | Mode=PEAK |
| | Signal strength (% of maximum) | 85% |
| | Signal frequency | 1 kHz |
| | Facility depth | 3.4 meters |
| | Marking material data | Color=RED, Brand=ABC |
| | Locate request data | Requestor=XYZ Construction Company, Requested service address=222 Main St, Orlando, FL |

While the collection and logging of locate information and marking information to generate an electronic record is discussed in some aspects, for purposes of illustration, in terms of actuation data sets (sets of data that are associated and logged with corresponding actuations of a locate device, marking device, or combined locate and marking device), it should be appreciated that electronic records as discussed herein are not limited in this respect. More generally, an electronic record of a locate and/or marking operation may be generated in any of a variety of manners, may have a variety of file formats and/or data structures, and may include any of a variety of locate information and/or marking information (some of which may be germane to one or more actuations of a device, some of which may be common to multiple actuations or the overall locate and/or marking operation in general, and some of which may not be related to specific actuations). For example, in some illustrative implementations, electronic records may be a "flat files" including a succession of time-stamped "event entries" of various locate information and/or marking information (logged automatically as a result of one or more particular conditions, e.g., exceeded thresholds for various signals, or manually as a result of user actuation of a device), or a differently formatted file (e.g., an ASCII file, an XML file) having a data structure that segregates or separates in some manner the locate information and/or marking information into multiple different fields.

It should also be appreciated that one or both of the marking device data and the locate receiver data, received from any of the marking devices, locate devices, or combined locate and marking devices referenced above, may include landmark information (in addition to, or instead of, locate information and marking information). Landmark information may include any information relating to one or more environmental landmarks of interest (e.g., in and around the work site/dig area and/or generally in the vicinity of the locate and/or marking operation). Examples of landmark information include, but are not limited to, geo-location data of an environmental landmark, a type of environmental landmark, and a time stamp for any acquired information relating to an environmental landmark. In some instances, landmark information may be acquired from locating equipment particularly configured to operate in a landmark mode so as to acquire such information, as well as one or more other modes (e.g., "locate mode" or "marking mode") to accomplish functions relating to detection and/or marking of underground facilities.

Tables 6 and 7 below show examples of landmark information that may be included in an electronic record forming part of either the marking device data or the locate receiver data. Table 6 shows the format and content of an electronic record entry for a utility pole, which includes one geo-location data point, and Table 7 shows the format and content of an electronic record entry for a pedestal, which includes four geo-location data points (i.e., one for each corner of the pedestal). As noted above, it should be appreciated that the formats and contents shown below in Tables 6 and 7 are provided primarily for purposes of illustration, and that a variety of formats and content may be employed for an electronic record entry for landmark information.

TABLE 6

Example record of landmark information acquired for a utility pole

| | | |
|---|---|---|
| Record # 1 | Service provider ID | 0482 |
| | User ID | 4815 |
| | Device ID | 7362 |
| | Type of EL | Type=utility pole |
| | timestamp data | 12-Jul-2008; 09:35:17.5 |
| | geo-location data | 2650.9256,N,08003.5234,W |
| | Locate request data | Requestor: XYZ Construction Company, Requested service address: 222 Main St, Orlando, FL |

TABLE 7

Example record of landmark information acquired for a pedestal

| Record #2 | Service provider ID | 0482 |
|---|---|---|
| | User ID | 4815 |
| | Device ID | 7362 |
| | Type of EL | Type= pedestal |
| | timestamp data | 12-Jul-2008; 09:35:17.5 |
| | geo-location data | 2650.9256,N,08003.5234,W |
| | Type of EL | Type= pedestal |
| | timestamp data | 12-Jul-2008; 09:35:21.2 |
| | geo-location data | 2650.9256,N,08003.5226,W |
| | Type of EL | Type= pedestal |
| | timestamp data | 12-Jul-2008; 09:35:26.7 |
| | geo-location data | 2650.9288,N,08003.5188,W |
| | Type of EL | Type= pedestal |
| | Timestamp data | 12-Jul-2008; 09:35:33.5 |
| | geo-location data | 2650.9321,N,08003.5177,W |
| | Locate request data | Requestor: XYZ Construction Company, Requested service address: 222 Main St, Orlando, FL |

VIII. Exemplary Process Guides

Checklists

As discussed above, the information provided (e.g., by the method of FIG. 6 or the system of FIG. 7) as a process guide to a dispatched technician may include a list of one or more work items, or tasks, to be completed or otherwise attended to by the technician in connection with a locate and/or marking operation. Such a list may be generated based at least in part on ticket information, as well as other information (e.g., from auxiliary information sources 250) and may be displayed locally to the technician as a guide to performing and/or verifying various aspects of the operation. For example, the list may include one or more types of facilities to be located and/or marked pursuant to the ticket information.

In some embodiments, as each item in the list is addressed by the technician during the locate and/or marking operation, the status of the item may be updated and recorded in some appropriate manner. For example, manual input may be received from the technician (e.g., via a user interface of the locating equipment) indicating that the item has been completed, or an automatic or semi-automatic determination is made as to the status of the item (e.g., by analyzing various information collected by the locating equipment with respect to ticket information and/or other information germane to the locate and/or marking operation). As a more specific example, the list of items may be presented to the technician as a checklist that enables the technician to "check off" each item when it is completed.

In some further embodiments, the updated status of one or more work items and any associated notes or remarks entered by the technician may be transmitted in real time to a remote computer for further analysis and/or review, which may be manual (e.g. by supervisory personnel), semi-automated or fully automated. Additional information and/or guidance may be returned to the technician upon such analysis and/or review, for example, in the event that the technician encountered certain unanticipated circumstances and needed further guidance as to how best to proceed.

It should be appreciated that, although the work items in the checklist may be presented to the technician in a particular ordering, the technician may or may not be required to complete the items in the same ordering. For example, upon completing a previous work item, the technician may exercise discretion and select a next work item to be performed based on a variety of factors, such as time of day (which may affect lighting condition), availability of tools and equipment, weather and/or traffic forecast, and the like. Where appropriate, the technician may even begin a next work item before completing a current work item, for example, while waiting for additional information and/or instructions regarding the current work item.

FIG. 11 shows an example of a checklist 1100 that may be presented to a locate technician during a locate and/or marking operation in accordance with some embodiments. For instance, the checklist 1100 may be a checklist output 285 presented via the user interface 280, as shown in FIG. 7.

In the illustrated embodiment, the checklist 1100 may include a list of facilities types, such as "electric power," "gas," "communications," and "water." For each type of facilities, there may one or more input mechanisms configured to allow a locate technician to manually provide status updates. For instance, there may be three status checkboxes for each facilities type, respectively labeled, "Marked," "Cleared" and "Not marked or cleared." A locate technician may check off one of these boxes according to an outcome of locating and/or marking the corresponding type of facilities.

If the locate technician selects the option, "Not marked or cleared," he may be prompted to enter additional remarks clarifying why the facilities type is neither cleared nor marked (e.g., lack of access due to locked gate). The locate technician may do so by typing a text string, recording an audio message, or via any other suitable input mechanism. The information entered by the locate technician, including his choice for each facilities type and any additional remarks information, may be included in an updated checklist (e.g. the updated checklist 265 shown in FIG. 7), to be stored and/or transmitted to another application for further processing.

As discussed above in connection with FIG. 7, the checklist items used by a local agent to present a checklist may be obtained in a number of different manners. For example, it may be generated automatically by a checklist generator by extracting facilities types from a ticket (e.g., from the list of member codes 314 in the ticket 205 shown in FIG. 4) and/or a work order (e.g., from the work order task information field 516 in the work order 215 shown in FIG. 8). Alternatively, it may be generated manually or semi-automatically by a user, such as a locate technician, supervisory personnel, ticket dispatch personnel or any suitable user.

Figure 12A:
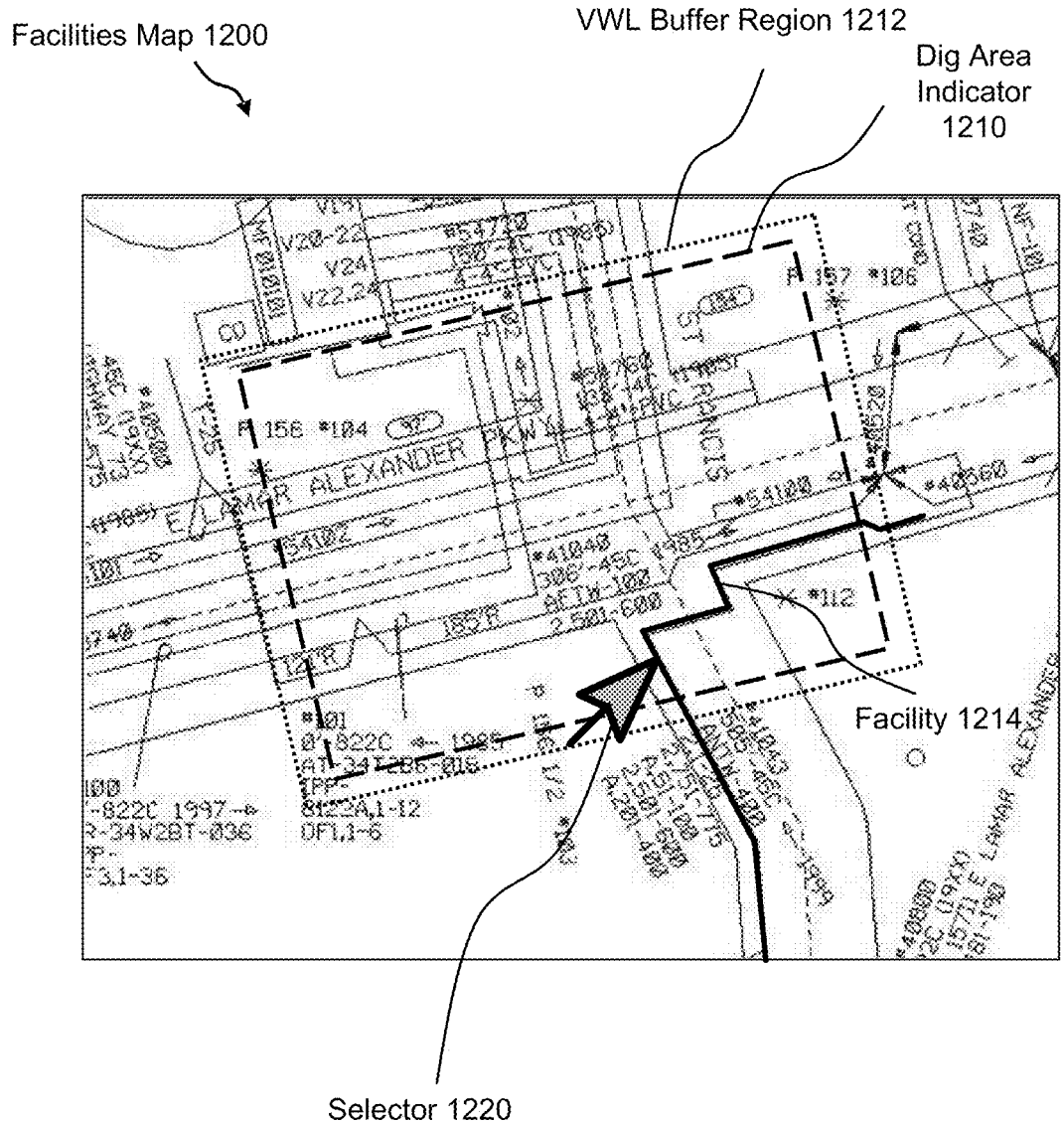
FIGS. 12A-C illustrate various examples in which a facilities map may be used to facilitate generation of a checklist, according to some embodiments of the present invention.
Figure 12B:
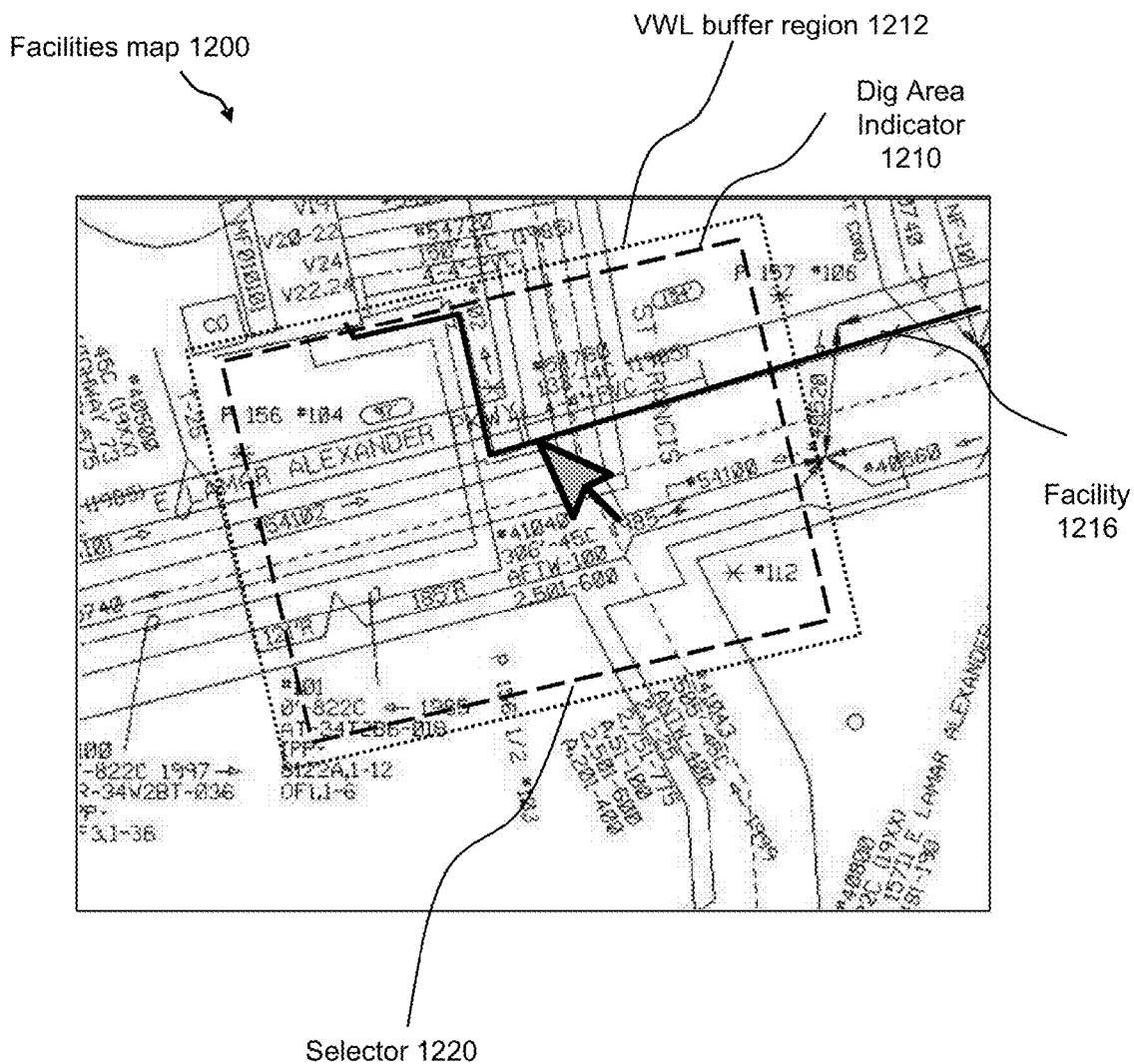
Figure 12C:
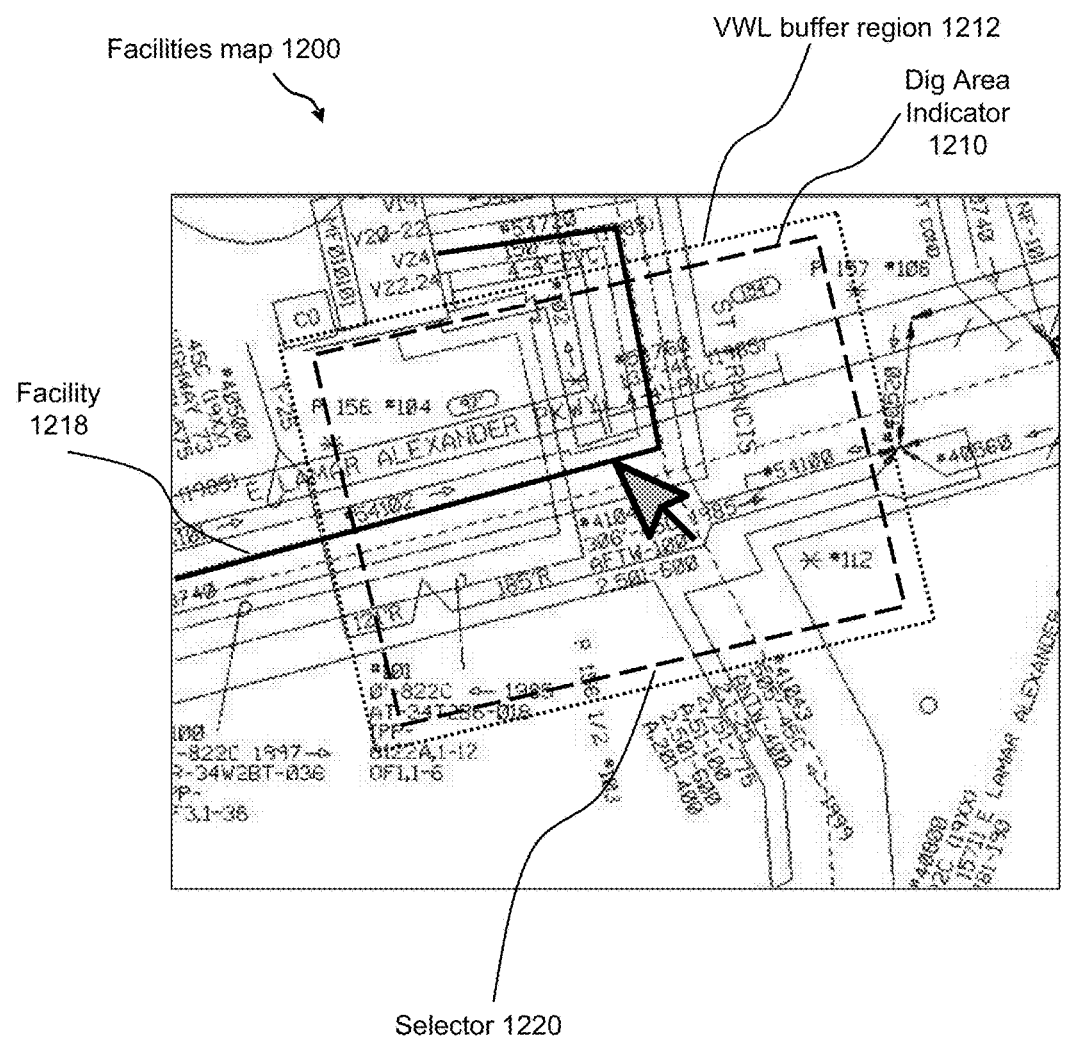

FIGS. 12A-C illustrate examples in which a number of checklist items to be performed during a locate and/or marking operation may be manually or semi-automatically generated. More specifically, in these examples, a user (e.g., operator of the system 200) manually selects a number of facilities types to be located and/or cleared by viewing a facilities map 1200 having a dig area indicator overlay 1210 and one or more selectable layers (e.g., facilities 1214, 1216 and 1218) corresponding respectively to different facilities types.

Generally, facilities maps may be drawings that show aboveground and/or underground facilities that are installed at a certain geographical area. When provided in an electronic form, a facilities map may be accompanied by metadata indicating the types of facilities installed (e.g., power, gas, water, sewer, telephone, cable TV, etc) and their geo-locations, and/or metadata indicating the presence of certain environmental landmarks and their geo-locations.

A user may view the facilities map 1200 on a suitable display device using a display software capable of processing the image format in which the facilities map 200 is stored. A dig area indicator 1210 may be overlaid upon the facilities map 1200, for example, based on geo-location information from the facilities map 1200 and from a VWL image from which the dig area indicator 1210 is extracted. Alternatively, the dig area indicator 1210 may be created by a user directly based on the facilities map 1200, for example, using a drawing tool provided by a VWL application.

The display software may allow the locate technician to view various types of facilities included in the facilities map 1200 in a layered fashion. For example, FIG. 12A shows a first type of facilities 1214 that is displayed to the user as a first layer of the facilities map 1200. Likewise, FIG. 12B shows a second type of facilities 1216 that is displayed to the user as a second layer of the facilities map 200, and FIG. 12C shows a third type of facilities 218 that is displayed to the user as a third layer of the facilities map 200.

In some embodiments, to specify one or more checklist items to be performed, a user may view the facilities map 1200 and manually enter one or more items based on visual observation of the types of facilities shown within the dig area indicator 1210 or with a certain VWL buffer region 1212. For example, the user may observe electric power lines, communications lines and water lines within the dig area generator 1210 and may manually select those facilities types to be located. Additionally, the corresponding ticket may indicate that gas lines need to be cleared. Accordingly, the user may manually enter "gas" as a facilities type to be cleared. These manual entries may be accomplished in any suitable manner, such as by typing in a text string using a conventional keyboard or a touch screen keyboard, or via speech using speech recognition software.

In another example, the user may use a selector 1220, which may be a cursor that may be controlled using a mouse or a touchpad, to select one or more checklist items. For example, the first type of facilities 1214 shown in FIG. 12A may be electric power lines, and "electric power" may be automatically entered as a checklist item when the user selects the facility line 1214 using the selector 1220. Similarly, the second type of facilities 1216 shown in FIG. 12B may be communications lines, and "communications" may be automatically entered as a checklist item when the user selects the facility line 1216 using the selector 1220. Finally, the third type of facilities 1218 shown in FIG. 12C may be water lines, and "water" may be automatically entered as a checklist item when the user selects the facility line 1218 using the selector 1220.

As discussed above, the facilities map 1200 may include or otherwise be associated with metadata encoded with, for example, geographic and facilities information. The selection of a facilities type at a particular location on the map can be correlated with the metadata underlying the map that corresponds to the selected location. In one example, the facilities map 1200 may be in a vector image format, such that a certain line on the facilities map 1200 is represented by a starting point geo-location, an ending point geo-location, and metadata about the line, including, but not limited to, type of line, depth of line, width of line, distance of line from a reference point (i.e., tie-down), overhead, underground, line specifications, and the like. Each vector image may be assembled in layers, where one layer corresponds, for example, to one type of facilities.

Figure 13:
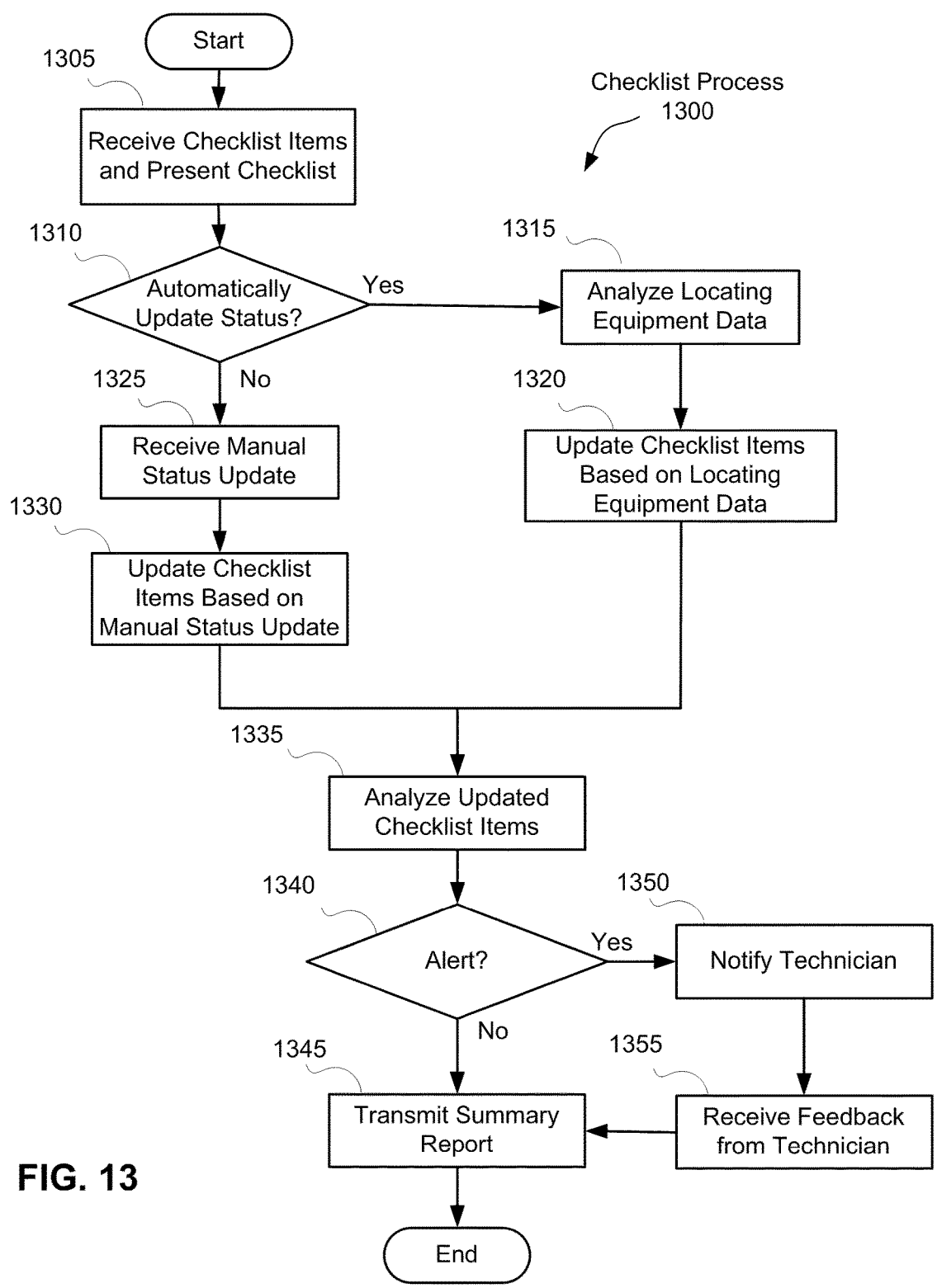
FIG. 13 shows an illustrative checklist process to present a checklist to a locate technician and to update the checklist either based on manual input from the locate technician or based on locating equipment data received from one or more pieces of locating equipment used by the locate technician, according to some embodiments of the present invention.

Once generated, checklist items to be performed during a locate and/or marking operation may be transmitted to a local agent residing on a computing device used by a locate technician. FIG. 13 shows an illustrative checklist process 1300 that may be performed by a local agent to present a checklist to a locate technician and to update the checklist based on manual input from the locate technician and/or locating equipment data received from one or more pieces of locating equipment used by the locate technician.

At act 1305, the local agent may receive one or more checklist items to be performed, for example, from a checklist generator residing on a central server. Alternatively, the checklist items may be generated locally by the locate technician, for example, as described above in connection with FIGS. 12A-C. The local agent may then present a checklist (e.g., as shown in FIG. 11) according to the received checklist items, as a guide to the locate technician's actions.

At act 1310, the local agent may determine whether status updates to one or more checklist items are to be performed manually or automatically, for example, according to some previously entered preference information, or by prompting the locate technician to select a desired option. If it is determined that status updates are to be performed automatically, the process 1300 may proceed to act 1315 to analyze locating equipment data received from one or more pieces of locating equipment, such as a locate receiver, a locate transmitter, a marking device and/or a combined locate and marking device.

In some embodiments, the local agent may use a data analysis algorithm to process any received locating equipment data. In some embodiments, the data analysis algorithm may be implemented on the same computing device as the local agent, or on a different device, and may be capable of determining the types of facilities being marked based on locating equipment data received from a marking device. As a more specific example, the data analysis algorithm may be programmed to determine facilities type information based on marking material color information from the locating equipment data (e.g., using a lookup table such as Table 1 that maps marking material colors to facilities types). The data analysis algorithm may be further programmed to determine location information for the identified facilities types based on geo-location information from the locating equipment data (e.g., GPS coordinates associated with one or more trigger pulls of the marking device). In another example, the data analysis algorithm may be further programmed to determine whether a type of facilities have been cleared based on locating equipment data received from a locate receiver. For example, the data analysis algorithm may determined that a certain type of facilities is cleared if the locate receiver data indicates an attempt to locate that type of facilities at one or more geo-locations, but the expected signal is either absent or below a corresponding threshold.

Returning to FIG. 13, the local agent may, at act 1320, perform status updates in real time with respect to one or more checklist items based on the facilities types and/or location information output by the data analysis algorithm. For example, the local agent may determine that electrical power lines, communications lines and water lines have been marked, and that gas lines have been cleared. Accordingly, with reference to the checklist 1100 shown in FIG. 11, the local agent may automatically set the "marked" check box for the electrical power lines, the "cleared" check box for the gas lines, the "marked" check box for the communications lines, and the "marked" check box for the water lines. Although not shown, any status check boxes that may remain unresolved by the analysis of act 1315 may be manually set or otherwise clarified by the locate technician.

If, on the other hand, it is determined at act 1310 that manual status update is desired, the process 1300 may proceed to act 1325 to receive manual input from the locate technician and then to act 1330 to update the checklist items accordingly. For example, as the locate technician completes a checklist item (which need not be the first unfinished item in the checklist presented), he may in real time use the user interface to check an appropriate box corresponding to that item. As a more specific example, and with reference to the checklist 1100 of FIG. 11, the locate technician may manually select the "marked" check box associated with the electrical power lines upon successfully detecting their presence and marking them. Upon detecting the absence of gas lines, the locate technician may manually select the "cleared" check box associated with gas. Upon successfully detecting the presence of and marking the communications lines, the locate technician may manually select the "marked" check box associated with communications. Upon successfully detecting the presence of and marking the water lines, the locate technician may manually select the "marked" check box associated with water.

In addition to updating the status of checklist items, the local agent may update any other desired document. For example, the local agent may update a summary report or technician activity log to indicate whether a particular underground facility has been marked, cleared, or neither marked nor cleared. The report may also be updated to include a date and/or time an action was commenced and/or completed, if applicable.

At act 1335, the local agent may analyze the updated checklist items to determine whether there are any discrepancies between expected and actual outcomes of the locate and/or marking operation. As a rudimentary example, the local agent may check whether all of the checklist items received at act 1305 have been addressed by the technician. If at least one checklist item has not been addressed (e.g., none of the options, "marked," "cleared," or "not marked or cleared," has been selected), the local agent may determine at act 1340 that an alert is to be generated regarding the omitted checklist item.

As an other example, an original checklist item received at act 1305 may indicate that water lines are expected to be found within the dig area. However, the locate technician may have indicated the absence of water lines within the dig area. This may suggest that the facilities map used to generate the checklist item (e.g., the facilities map 1200 shown in FIGS. 12A-C) maybe outdated and/or inaccurate. Accordingly, the local agent may determine at act 1340 that an alert is to be generated. The process 1300 may then proceed to act 1350 to notify the locate technician of the detected discrepancy and receive feedback from the locate technician at act 1335. This feedback may be attached to the summary report for review by supervisory personnel, facilities owners and/or any interested parties.

The process 1300 may then proceed to act 1345 to save the updated checklist items and/or summary report at an appropriate storage location and/or transmit them to another application for further processing. A time stamp and/or a location stamp may be added to the summary report, which may used as verification that the locate and/or marking operation was successfully completed. If, on the other hand, it is determined at act 1340 that no alerts are to be generated, the process 1300 may proceed directly to act 1345.

Although not shown in FIG. 13, one or more updated checklist items may be transmitted by the local agent prior to completion of the locate and/or marking operation. For example, as discussed above, the technician may find unanticipated difficulties in completing a checklist item. Accordingly, an updated checklist item may be transmitted to a supervisor or help desk personnel, indicating that the technician requires guidance and summarizing any issues encountered. The supervisor or help desk personnel may review this information in real time and provide feedback to the technician before the technician leaves the work site. For example, the feedback may include one or more modified and/or new checklist items to be performed by the technician in view of the updated information.

In another example, an updated checklist item may be transmitted for real time review even if the technician does not require guidance. Instead, the updated checklist item may be reviewed for any potential quality issues. For instance, the updated checklist item may include various sensor readings received from the locating equipment at the time the checklist item was performed by the locate technician (see FIGS. 2 and 3 and Tables 1-7). If, for example, the checklist item involves applying locate marks on the ground using paint and a relative humidity reading exceeds a certain threshold (e.g., 95%), the locate technician may be instructed to re-apply all locate marks.

IX. Exemplary Process Guides

Workflows

As discussed above, a dispatched technician may receive guidance information via a number of checklist items to be performed during a locate and/or marking operation. In a typical embodiment, the technician may perform these checklist items in any suitable ordering, as long as each item is adequately responded to (e.g., checked off) upon completion of the locate and/or marking operation. Thus, the technician may be given a relatively high level of discretion as to how and when each checklist item is performed during the locate and/or marking operation.

In alternative embodiments, a process guide (e.g., generated by the method of FIG. 6 or the system of FIG. 7) may be presented to a technician via a different mechanism, namely, a workflow, which may provide a more structured (e.g., step-by-step) guide to performing a locate and/or marking operation. Such a mechanism may be suitable for training less experienced technicians, or for increasing the level of procedural compliance among all technicians.

In some illustrative embodiments, a workflow generator (e.g., as part of the ticket processing software 113 shown in FIGS. 2 and 3) may be configured, when executed by a processor, to generate a workflow for a locate and/or marking operation. For example, a workforce guidance and monitoring system may be implemented in which the ticket processing software 113 includes a workflow generator for manually and/or automatically generating a workflow with respect to a locate and/or marking operation. For example, the workflow generator may interrogate ticket information and/or any other supporting information, such as maps, in order to automatically generate a workflow with respect to the locate and/or marking operation. Further, once generated, the workflow may be manually and/or automatically modified as needed.

In some embodiments, the workflow generator may be a software algorithm or application programmed to generate workflows based on one or more workflow templates. For example, a workflow template may have the structure of a step-by-step guide to performing a locate and/or marking operation. Generic information such as instructions applicable to many locate and/or marking operations may be preloaded into the workflow template, while placeholders may be left in appropriate places for ticket-specific information. The workflow generator may be programmed to interrogate ticket information and fill in the placeholders. An illustrative example of a workflow template is described in greater detail below in connection with FIG. 14.

Any workflow that may be created by the workflow generator may then be converted to any useful output format for providing guidance to technicians during locate and/or marking operations in the field. For instance, a workflow output may be presented to a technician based on a workflow to provide guidance relating to work scope and/or operating procedures. As a more specific example, a workflow may include an ordered list of tasks to be performed by the locate technician with respect to executing a locate request ticket. A corresponding workflow output may include, for example, a series of popup windows displayed on a computing device that is being used by the locate technicians, each popup window pertaining to a different task in the workflow. Other forms of workflow outputs may also be possible, such as any suitable types of visual, audible and/or tactile cues to provide instructions, reminders and/or other information to the technician at various stages of the locate and/or marking operation.

In some further embodiments, a checklist such as the one shown in FIG. 11 may also be included as part of a workflow output. For example, a checklist may be presented while a technician is performing a task in the workflow, identifying one or more checklist items to be performed pursuant to completing the particular workflow task. Similarly, a secondary workflow may be nested within a primary workflow, for example, to identify a list of subtasks to be performed pursuant to completing a task in the primary workflow. In this manner, multiple workflows and/or checklists may be nested in any suitable configuration (e.g., to any suitable depth).

A workflow output may be processed and/or presented via any computing device that may be operating in combination with and/or incorporated into any locating equipment. In one embodiment, the workflow output may be displayed on a portable computer and/or on the display of the locating equipment itself that is being used by the locate technician. The workflow output that is displayed to the locate technician may be used to guide the locate technician with respect to the work scope and/or workflow of the locate and/or marking operation. For example, the locate technician may use the workflow output to guide and/or to verify his step-by-step actions. As each task of the workflow is completed during locate and/or marking operations, its status may be updated either manually and/or automatically. Upon completion of the locate and/or marking operation, the completed workflow may be processed and used by any interested party for any purpose.

As with checklists in some of the illustrative embodiments discussed above, a workflow may be presented by a local agent (e.g., the local agent 260 shown in FIG. 7) via a user interface (e.g., the user interface 280 shown in FIG. 7). The local agent may reside on any suitable computing device used by a technician, and may be configured to automatically prompt the technician with respect to tasks performed during a locate and/or marking operation. In some embodiments, the local agent may be further configured to process locating equipment data received from one or more pieces of locating equipment, such as a marking device, a locate transmitter, a locate receiver and/or a combined locate and marking device, and automatically update one or more workflow tasks based on the locating equipment data. As a more specific example, the local agent may determine a type of facilities marked based on marking material color information from the locating equipment data, and update the status of a corresponding workflow task. Alternatively, the local agent may present the workflow in such a way to enable the locate technician to manually provide statute updates with respect to various workflow tasks. For example, in an embodiment in which each workflow task is presented via a popup window, the popup window may include one or more input mechanisms such as buttons and/or text boxes for receiving responses and updates from the technician.

In some further embodiments, the local agent may be configured to automatically verify that each required task has been performed prior to allowing the technician to proceed to the next task or to close the locate and/or marking operation. Additionally, the local agent may be configured to generate a summary report or technician activity log that records the status of each workflow task, any technician remarks and/or notes relating to the workflow task, environmental and/or operational sensor readings collected during performance of the workflow task, and/or any other information of interest. As discussed above in connection with FIG. 7, such a summary report or technician activity log may be transmitted to a remote computer for automatic and/or manual review at any suit stage during the locate and/or marking operation, so as to enable real time response to any deficiencies and/or unanticipated difficulties.

In some further embodiments, the user interface for presenting workflow outputs may further include one or more override mechanisms that allow a technician to skip, redirect, and/or otherwise modify one or more workflow tasks. As an example, the technician may encounter unexpected difficulties in performing a certain task (e.g., due to lack of proper equipment and/or poor working conditions such as high temperature, high humidity and/or insufficient daylight) and may decide to postpone that task and instead proceed with subsequent tasks, or to postpone the entire locate and/or marking operation. As another example, the technician may decide to modify the workflow because the corresponding ticket is an emergency locate request ticket that must be completed within a short time period (e.g., two or three hours). In such cases, the locate technician may be prompted to enter notes explaining the reason for skipping, redirecting, and/or modifying the workflow. These notes may be included in the workflow updates so that they may be reviewed by supervisory personnel.

The workflow system and methods of the present disclosure may provide systematic ways of guiding locate technicians with respect to the work scope and/or workflow of locate and/or marking operations, thereby improving quality and/or operating efficiency with respect to locate and/or marking operations.

Further, the workflow system and methods of the present disclosure may provide a mechanism by which the locate technician may acknowledge, add, and/or delete tasks to be performed during locate and/or marking operations prior to performing the locate and/or marking operations.

Further still, the workflow system and methods of the present disclosure may provide ways of manually and/or automatically prompting the locate technician with respect to tasks that are performed during locate and/or marking operations.

In addition, the workflow system and methods of the present disclosure may provide ways of manually and/or automatically verifying the completion of locate and/or marking operations.

A. Workflow Generation

FIG. 14 shows an illustrative example of a process 800 that may be performed to generate a workflow in accordance with some embodiments of the present disclosure. The process 800 may be executed, for example, by a workforce guidance and monitoring system having the same general architecture as the system 200 shown in FIG. 7. In such an embodiment, the process 800 may be executed by a workflow generator running on the remote computer 230 shown in FIG. 7 to process a work order (e.g., the work order 215) and generate a corresponding workflow (e.g., the workflow 235). Likewise, referring again to the general ticket processing method 185 outlined in FIG. 6, the process 800 shown in FIG. 14 provides a more specific example of the block 184 ("parse ticket/extract ticket information") and the block 186 ("display ticket information") in FIG. 6.

The process 800 may begin at act 805, where the workflow generator receives a ticket and/or work order based on which a workflow is to be generated. As discussed above, a work order may be a document generated based on a locate request ticket and may contain various pieces of information pertaining to the requested locate and/or marking operation, such as location, time and/or scope. The work order may be generated by execution of the ticket parsing and assessment engine 210 shown in FIG. 7 and may be transmitted to the workflow generator at any suitable time, for example, prior to being dispatched to a locate technician in the field. Alternatively, a newly generated work order may be stored in a suitable database (e.g., the ticket and/or work order database 220 shown in FIG. 7) and may be retrieved by the workflow generator at an appropriate time. For example, the workflow generator may retrieve the work order in response to a message indicating that a new work order has arrived, or it may check the database for new work orders based on a predetermined schedule.

In some embodiments, a workflow may be generated based on multiple tickets and/or work orders. For example, an excavator may initiate a series of related tickets in connection with a construction project involving multiple adjacent properties. These related tickets may contain similar information in one or more aspects, such as the types of facilities to be located, reasons for excavation, expected excavation date (and hence ticket deadline), and the like. Accordingly, it may be advantageous to process these tickets as a group and streamline the corresponding locate and/or marking operations, for instance, by generating a single, unified workflow that encompasses activities pertaining to the multiple related tickets.

As a more specific example, a unified workflow may consolidate locate and/or marking activities for multiple tickets and/or work orders according to facilities type. For instance, if both gas and cable facilities are to be located and marked for multiple adjacent properties, a unified workflow may direct a technician to first locate and mark gas facilities for all of the properties (e.g., beginning from one end of the row of properties and proceeding to the other end), and then locate and mark cable facilities for all of the properties. In this manner, efficiency may be improved by reducing overhead for the locate and/or marking operations (e.g., reducing traveling time and/or the number of times a technician needs to connect, disconnect and/or calibrate different locating equipment).

In some further embodiments, the workflow generator (or some other ticket processing application in the workforce guidance and monitoring system 200) may be further programmed to automatically recognize that certain tickets may be suitable for grouping and consolidated processing, with or without an excavator's indication that the tickets are related (e.g., belonging to the same construction project). For instance, the workflow generator may be programmed to recognize certain features of the tickets as indicative of their related nature. More specifically, in some illustrative embodiments, the workflow generator may elect to group together tickets whose work site addresses are adjacent and whose expected excavation dates are within some threshold time period (e.g., 24, 48 or 72 hours). Alternatively, or additionally, the workflow generator may elect to group the tickets only if they share at least one type of facilities to be located.

In addition to tickets and/or work orders, the workflow generator may receive other available information associated with the ticket and/or work order, such as any VWL images that may be attached to the ticket. Any suitable combination of these input sources may be processed at act 810 to extract information relevant to generating a workflow, such as worksite location, planned excavation date, types of facilities to be located and the like.

For example, in some embodiments, the input ticket and/or work order may be have a standardized format, which may be any suitable set of rules or conventions for representing and organizing data, designed to facilitate efficient handling of data by various software components. For instance, the standardized format may be an Extensible Markup Language (XML) format. The workflow generator may be programmed to recognize such a format and to process the ticket and/or work order accordingly. For example, the workflow generator may be programmed to recognize various fields in the input document (e.g., a ticket number field, an address field, a due date field, etc.) and to extract information from those fields. Alternatively, or additionally, the workflow generator may be programmed to recognize certain characters and/or groups of characters (e.g., keywords) while parsing the input document and extract information associated with the recognized occurrences. The keywords may be any words or phrases of interest with respect to locate and/or marking operations and may be chosen in any suitable manner. Furthermore, this parsing-based approach may be beneficial in situations where the input document may not be in a known standard format.

In some further embodiments, the workflow generator may be programmed to extract information from VWL images and associated metadata. For instance, the workflow generator may extract coordinate information regarding a dig area indicated on a VWL image. Other techniques for extracting information from tickets, work orders and/or VWL images may also be suitable, as the present disclosure is not limited in this respect. Also, regardless of its precise source and nature, any information extracted at act 810 falls under the designation of "ticket information" as described above.

In some alternative embodiments, the workflow generator may outsource any parsing and extraction operations to a data parser programmed to analyze strings of characters (e.g., textual and/or numeric characters) using a number of different techniques, including, but not limited to, expression-based rules and table lookups. The workflow generator may receive extracted data directly from the data parser, or indirectly through a database that may be compiled based on user input and/or data parser output.

Returning to FIG. 14, an appropriate workflow template may be selected from one or more available templates at act 815. As discussed above, different workflow templates may be created for different categories of locate and/or marking operations, so that generic information applicable to each category may be preloaded into a corresponding workflow template. For example, different workflow templates may be created for different jurisdictions (e.g., cities, states and/or regions) in compliance with different regulatory requirements. As a further example, different workflow templates may be created for different work site settings, such as rural vs. urban settings.

Other factors that may also be considered in creating workflow templates include, but are not limited to, SOP information, current industry-accepted recommended practices (e.g., the Best Practices Version 5.0 document developed by the Common Ground Alliance (CGA) of Alexandria, Va.), external contracts with facilities owners and/or insurance companies and/or locate service provider internal policies. Any combination of these and other factors may be taken into account in creating workflow templates, as the present disclosure is not limited in this respect.

In some embodiments, the workflow generator may use some of the ticket information extracted at act 810 in selecting an appropriate template from a set of available templates. For example, the workflow generator may select a template based on worksite location, number of facilities to be located and/or types of facilities to be located. As a more specific example, the workflow generator may use address and/or coordinate information to determine whether a work site falls within a rural area or an urban area, so that an appropriate workflow template may be selected accordingly. An example of a workflow template that may be available to the workflow generator is as follows. In this example, the workflow template is a step-by-step guide to performing a locate and/or marking operation, with various placeholders indicated by square brackets. These placeholders are reserved for ticket-specific information that are filled in when such information becomes available. By contrast, more generic information, such as instructions applicable to many locate and/or marking operations, may be preloaded into the workflow template. For instance, the workflow template example below contains generic instructions such as gathering locating equipment and verifying it is in working order.

1. Open ticket number [TICKET NUMBER].
2. Verify arrival at [GEOGRAPHIC LOCATION INFORMATION]
    If correct address, proceed with next steps.
    If not correct address, redirect to correct address.
3. Verify that current date is on or before [DATE INFORMATION].
    If within valid timeframe, proceed with next steps.
    If not within valid timeframe, contact home office.
4. Locate [LOCATE AND/OR MARKING OPERATIONS INSTRUCTIONS INFORMATION]
5. Verify whether [LOCATE AND/OR MARKING OPERATIONS INSTRUCTIONS INFORMATION] is accessible.
    If accessible, proceed with next steps.
    If not accessible, flag the condition and proceed with next steps.
6. Locate dig area white lines (physical white lines and/or VWL image) and review white lines for understanding.
    If white lines present and understood, proceed with next steps.
    If white lines are not present and/or understood, call [CALLER INFORMATION]
7. Review [FIRST FACILITIES TYPE FROM TASKS INFORMATION] facilities maps for [GEOGRAPHIC LOCATION INFORMATION]
    If [FIRST FACILITIES TYPE FROM TASKS INFORMATION] facilities maps present and reviewed, proceed with next steps.
    If [FIRST FACILITIES TYPE FROM TASKS INFORMATION] facilities maps not present and reviewed, flag the condition and proceed with next steps.
8. Gather locating equipment and verify in working order.
    If locating equipment in working order, proceed with next steps.
    If locating equipment not in working order, repair and/or acquire different locating equipment, proceed with next steps.
9. Gather flags and [COLOR INFORMATION OF FIRST FACILITIES TYPE] marking material and verify enough quantity to complete job.
    If enough [COLOR INFORMATION OF FIRST FACILITIES TYPE] marking material available, proceed with next steps.
    If not enough [COLOR INFORMATION OF FIRST FACILITIES TYPE] marking material available, acquire additional quantity and proceed with next steps.
10. Perform locate and/or marking operations on [FIRST FACILITIES TYPE FROM TASKS INFORMATION] facilities within dig area and apply [COLOR INFORMATION OF FIRST FACILITIES TYPE] marking material and/or flags appropriately.
    If [FIRST FACILITIES TYPE FROM TASKS INFORMATION] facilities located successfully, proceed with next steps.
    If unable to successfully locate [FIRST FACILITIES TYPE FROM TASKS INFORMATION], notify one-call center, excavator, facility owner, and/or home office and then proceed with next steps.
11. Measure offsets and mark these values on job site appropriately.
    If offsets are measured and applied, proceed with next steps.
    If offsets are not measured and/or applied, measure and apply offsets.
12. Repeat workflow steps 7 through 11 for [SECOND FACILITIES TYPE FROM TASKS INFORMATION] (but using [COLOR INFORMATION OF SECOND FACILITIES TYPE] marking material).
13. Repeat workflow steps 7 through 11 for [THIRD FACILITIES TYPE FROM TASKS INFORMATION] (but using [COLOR INFORMATION OF THIRD FACILITIES TYPE] marking material).
14. Repeat workflow steps 7 through 11 for [FOURTH FACILITIES TYPE FROM TASKS INFORMATION] (but using [COLOR INFORMATION OF FOURTH FACILITIES TYPE] marking material).
15. Repeat workflow steps 7 through 11 for [FIFTH FACILITIES TYPE FROM TASKS INFORMATION] (but using [COLOR INFORMATION OF FIFTH FACILITIES TYPE] marking material).
16. Collect all locating equipment from job site.
17. Enter any information required to complete the job into the ticket management system.
18. Acquire and/or attach proof of work information according to contractual agreements, such as paper manifest, electronic manifest, and/or photos.
19. Upload ticket to ticket management system.

At act 820, the workflow generator may apply ticket information extracted during act 810 to the selected workflow template, for instance, by populating reserved fields in the workflow template according to the extracted information. At this stage, the workflow generator may extract further information from input sources such as the ticket, work order and/or VWL images. For example, the workflow generator may parse one or more of these sources based on the types of information needed to populate the workflow template, and extract any desired information that has not already been extracted at act 810.

As a more specific example, and with reference to the ticket 205 shown in FIG. 4, the VWL image shown in FIG. 5A, the work order 215 shown in FIG. 7 and the above workflow template example, the workflow generator may perform one or more of the following:

Parse the ticket based on the key words "serial number" or parse the work order based on the key words "ticket number," and extract the numeric data that follows. In the case of a VWL image, meta data or a descriptor file associated with the image or textual information within the image may be similarly parsed. For standard forms, only one keyword or string may be necessary to identify desired data. However, multiple keywords or strings may alternatively be used to identify the desired data.

Extract time information (e.g., due date information) from the ticket, work order and/or VWL images, for example, by identifying and extracting a due date string.

Extract geographic location information (e.g., address information) from the ticket, work order and/or VWL images, for example, by identifying and extracting an address data string. Alternatively, GPS coordinates may be extracted and a nearest address may be found using a reverse geocoding process.

Extract locate and/or marking operation instruction information from the ticket, work order and/or VWL images, for example, by identifying and extracting an instruction string. For instance, the workflow generator may search the locate instructions field in the work order (e.g., as shown in FIG. 8) for the key word "pole" and extract the associated data string (e.g., "pole number 24860"). Alternatively, the workflow generator may simply extract the number "24860" that follows the key word "pole," and append the extracted data to a predetermined string (e.g., "utility pole #"). As the term "pole" may not appear in every ticket or work order, the workflow generator may search for a plurality of keywords associated locate and/or marking operation instructions and may extract desired data associated with those keywords using expression-based rules and/or table lookups.

Extract task information (e.g., types of facilities to be located) from the ticket, work order and/or VWL images, for example, by identifying and extracting one or more facility names from a work order task field (e.g., as shown in FIG. 8). If multiple facilities are listed, a total number of facilities may be computed and stored for later use.

Extract caller information (e.g., caller name and phone number) from the ticket, work order and/or VWL images, for example, by identifying and extracting a caller name and a corresponding contact number from a caller information field (e.g., as shown in FIG. 8).

Extract relevant SOP and/or industry-wide best practice information from a suitable source (e.g., the auxiliary information sources 250 shown in FIG. 7).

Any of these pieces of extracted information may be applied to the workflow template, for example, by replacing the text in square brackets indicating a reserved field with corresponding text extracted from the input sources. In some situations, some additional processing may be needed to derive one or more pieces of desired information. For instance, the workflow template example described above may require marking material color information, which may not be directly available from the input sources. However, it may be derived based on facility type information extracted from the input sources, using a look-up table that maps facility types to marking material colors (e.g., see Table 3 above).

For example, according to Table 3, the marking material color corresponding to facility type "gas" is "yellow." Therefore, "yellow" may be entered into the reserved fields marked "[COLOR INFORMATION OF FIRST FACILITIES TYPE]," if "gas" is entered into the reserved fields marked "[FIRST FACILITIES TYPE FROM TASKS INFORMATION]."

The workflow thus generated by the workflow generator based on the ticket 205 shown in FIG. 4, the VWL image shown in FIG. 5A, the work order 215 shown in FIG. 8 and the above workflow template example may be as follows. This workflow is hereinafter referred to as the 20083771309 workflow.

1. Open ticket number 20083771309.
2. Verify arrival at 4600 E Street Rd, Feasterville Trevose, Pa.
   If correct address, proceed with next steps.
   If not correct address, redirect to correct address.
3. Verify that current date is on or before Jan. 5, 2009.
   If within valid timeframe, proceed with next steps.
   If not within valid timeframe, contact home office.
4. Locate utility pole #24860.
5. Verify whether utility pole #24860 is accessible.
   If accessible, proceed with next steps.
   If not accessible, flag the condition and proceed with next steps.
6. Locate dig area white lines (physical white lines and/or VWL image 400) and review white lines for understanding.
   If white lines present and understood, proceed with next steps.
   If white lines are not present and/or understood, call Joe Locator (123) 456-.
7. Review gas facilities maps (e.g., from input images 130) for 4600 E Street Rd, Feasterville Trevose, Pa.
   If gas facilities maps present and reviewed, proceed with next steps.
   If gas facilities maps not present and/or reviewed, flag the condition and proceed with next steps.
8. Gather locating equipment and verify in working order.
   If locating equipment in working order, proceed with next steps.
   If locating equipment not in working order, repair and/or acquire different locating equipment, proceed with next steps.
9. Gather flags and yellow marking material and verify enough quantity to complete job.
   If enough yellow marking material available, proceed with next steps.
   If not enough yellow marking material available, acquire additional quantity and proceed with next steps.
10. Perform locate and/or marking operations on gas facilities within dig area and apply yellow marking material and/or flags appropriately.
    If gas facilities located successfully, proceed with next steps.

If unable to successfully locate gas facilities, notify one-call center, excavator, facility owner, and/or home office and then proceed with next steps.
11. Measure offsets and mark these values on job site appropriately.
If offsets are measured and applied, proceed with next steps.
If offsets are not measured and/or applied, measure and apply offsets.
12. Repeat workflow steps 7 through 11 for electric power lines (but using red marking material).
13. Repeat workflow steps 7 through 11 for CATV lines (but using orange marking material).
14. Collect all locating equipment from job site.
15. Enter any information required to complete the job into the ticket management system.
16. Acquire and/or attach proof of work information according to contractual agreements, such as paper manifest, electronic manifest, and/or photos.
17. Upload ticket to ticket management system.
18. Receive and review next ticket.

Returning to FIG. 14, at act 825, the workflow generator may transmit the completed workflow (e.g., the 20083771309 workflow) to a local agent (e.g., the local agent 260 shown in FIG. 7) for further processing. Alternatively, the workflow generator may store the completed workflow in a database, so that the workflow may be accessed by any suitable entities in the workforce guidance and monitoring system, including other local agents and/or quality assessment applications.

It should be appreciated that the above example is provided merely for purposes of illustration. Other types of workflow templates and/or ticket information may also be used. For example, in addition to, or instead of the ticket information discussed above, the workflow generator may extract and apply other types of ticket information, such as work order number, excavation information, excavator information, site information and/or remarks information. Other types of methods for extracting and/or applying extracted ticket information to workflow templates may also be used.

B. Local Agent

Figure 15:
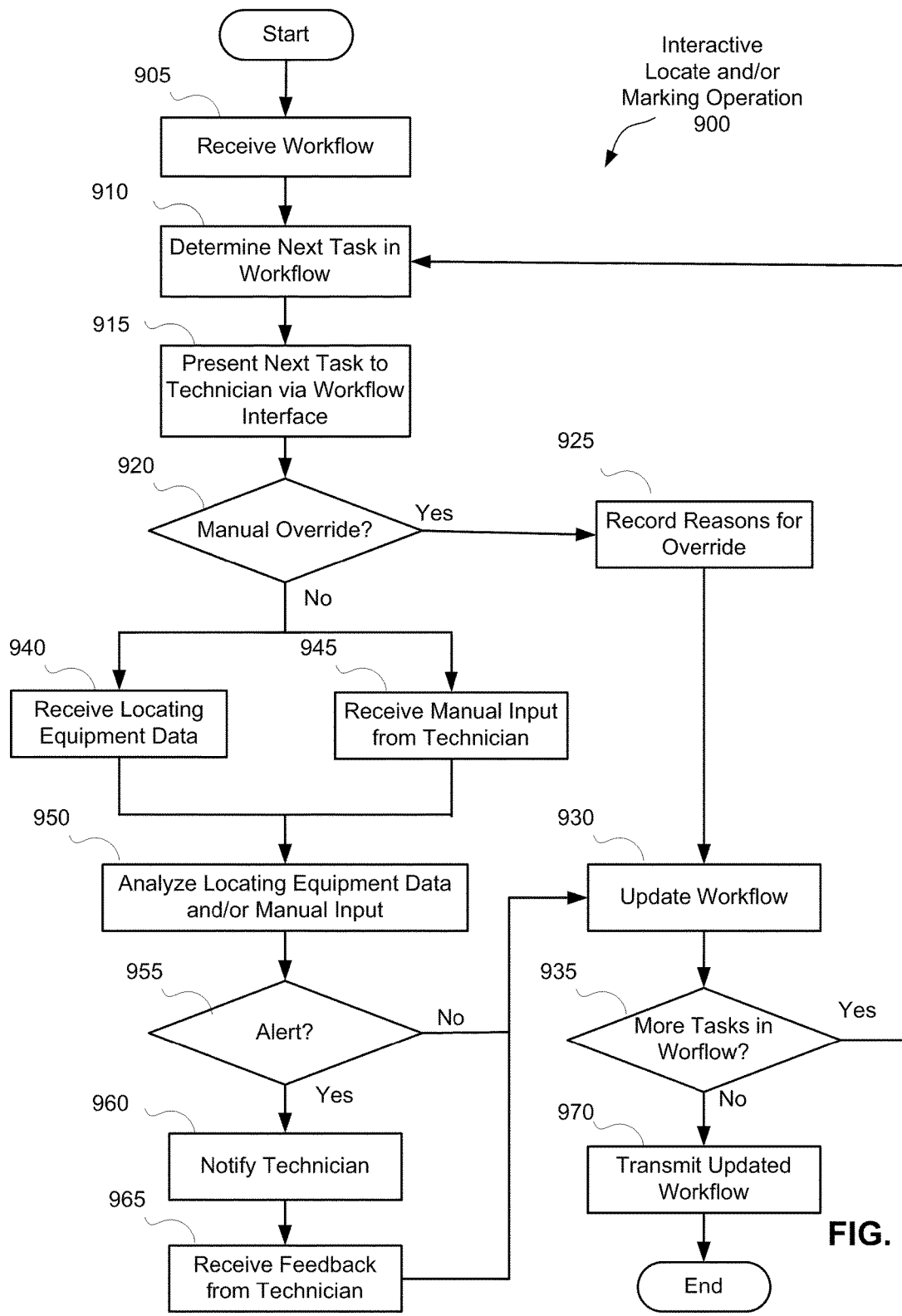
FIG. 15 shows an illustrative process that may be performed to allow real-time interactions with a locate technician pursuant to a workflow, according to some embodiments of the present invention.

FIG. 15 shows an illustrative process 900 that may be performed by a workforce guidance and monitoring system during a locate and/or marking operation to allow real-time interactions with a locate technician. For example, the process 900 may be performed by a local agent (e.g., the local agent 260 shown in FIG. 7). As discussed above, the local agent may reside on one or more suitable computing devices, such as a computing device installed in a work vehicle driven by the locate technician, a computing device adapted to be carried by the locate technician and/or a computing device integrated with a piece of locating equipment. Referring again to the general ticket processing method 185 outlined in FIG. 6, the process 900 shown in FIG. 15 provides a more specific example of the block 188 ("real-time technician interaction with ticket/ticket information and/or automatic/semi-automatic implementation of guided operation") and the block 190 ("generate technician activity log") in FIG. 6.

In some embodiments, the local agent may interact with a locate technician by providing guidance information during a locate and/or marking operation. For example, the guidance information may include workflow output generated based on a workflow associated with the locate and/or marking operation. The local agent may also receive manual input from the locate technician, for example, to indicate completion of a task and to enter log messages regarding the task. Additionally, or alternatively, the local agent may receive data from one or more pieces of locating equipment used by the locate technician. The local agent may then process and assemble the collected information into a technician activity log which, for purposes of the present workflow example, also is referred to herein as an "updated workflow."

In some further embodiments, the local agent may assess the quality of one or more tasks performed by the locate technician, for example, by looking for any discrepancies and/or non-conformities in the collected information. If any discrepancy or non-conformity is observed, the local agent may present a real-time alert to the locate technician, so that the locate technician may conduct further investigation and take any desired corrective action. In this manner, potential problems may be identified early, for example, before a locate technician leaves a worksite. As a result, the need for a repeat visit to the same worksite may be reduced, thereby improving overall operating efficiency of the locate service provider. Furthermore, early detection of potential issues may reduce risks of property damage, thereby improving profitability of the locate service provider.

In the example shown in FIG. 15, the process 900 begins at act 905, where the local agent receives a workflow associated with a locate and/or marking operation (e.g., the 20083771309 workflow described above in connection with FIG. 14). Although not shown, the local agent may also receive any combination of related ticket information, such as a ticket, work order and/or VWL images corresponding to the received workflow. In some embodiments, these pieces of information may be transmitted to the local agent from a center server upon the dispatch of the work order to a selected locate technician. Alternatively, the local agent may be notified of the dispatch and may retrieve the information from a suitable database (e.g., the ticket and/or work order database shown in FIG. 7). Additionally, the local agent may have access to any desired information available in the workforce guidance and monitoring system (e.g., any information from the auxiliary data sources 250 shown in FIG. 9).

In some embodiments, the received workflow may include a series of tasks to be performed by a locate technician during a locate and/or marking operation. For example, the 20083771309 workflow described above includes eighteen steps to be performed by the locate technician in a recommended order. The local agent may present these steps to the locate technician in order and, for at least some of the steps, the local agent may collect information during the locate and/or marking operation to verify that the steps have been completed satisfactorily.

Figure 16:
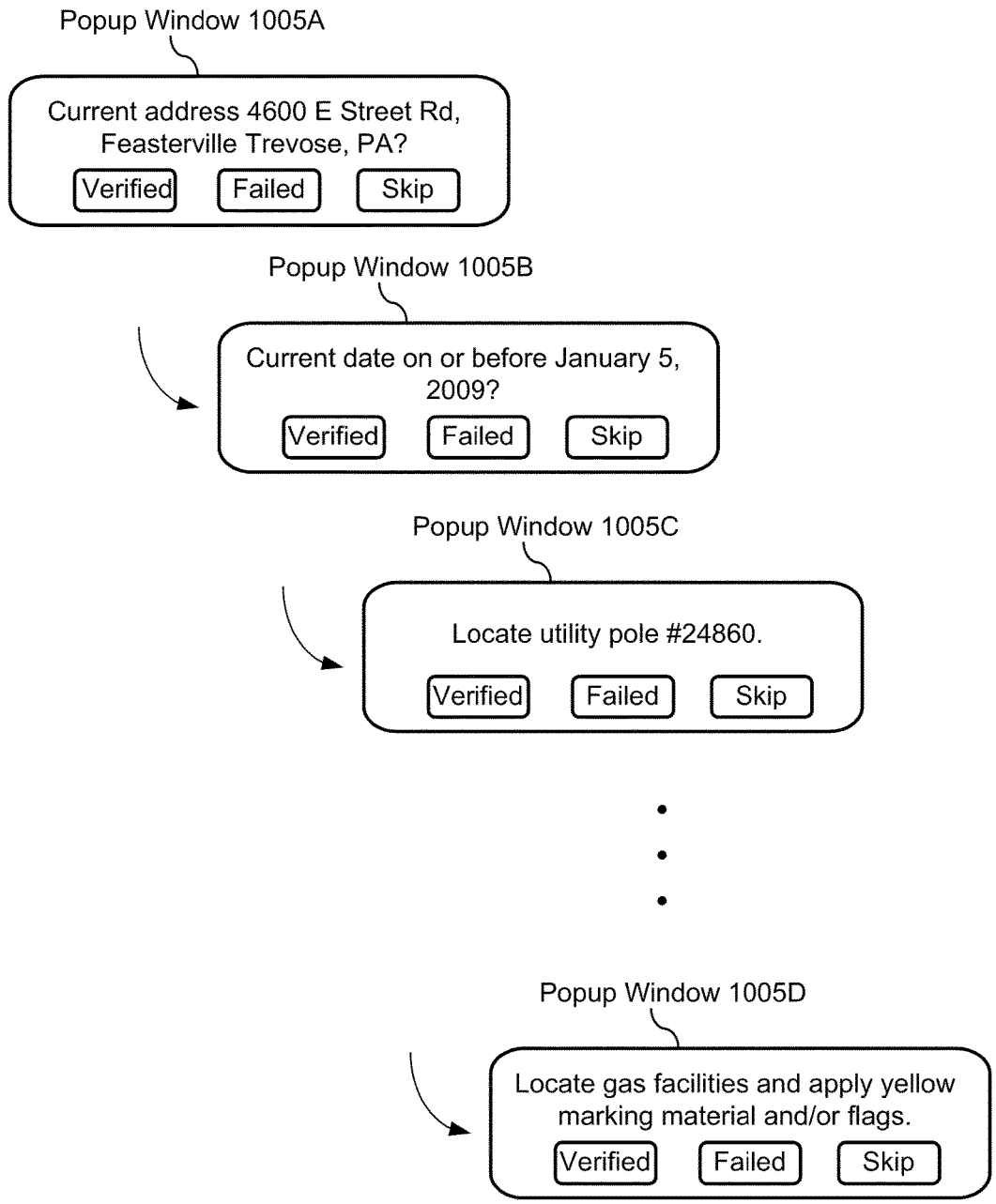
FIG. 16-19 illustrates a series of exemplary popup windows and checklists that may be presented as part of the process of FIG. 15, according to some embodiments of the present invention.

As a more specific example, the local agent may present a series of popup windows, such as the popup windows 1005A-D shown in FIG. 16, based on steps listed in the received workflow. The popup windows may be presented via a suitable user interface (e.g., the user interface 280 shown in FIG. 7), which may include one or more input mechanisms to enable the locate technician to interact with the local agent. For instance, in the example shown in FIG. 16, each of the popup windows may include one or more buttons for providing a status update with respect to a corresponding task. More specifically, there may be a "Verified" button for confirming that the corresponding task has been completed, a "Failed" button for indicating that the locate technician has attempted the task but is unable to complete it (e.g., the technician is unable to detect sufficient signal for a type of facilities that is expected to be present, and/or adverse conditions such as heavy rain prevent the technician from marking detected facilities), and a "Skip" button that allows the locate technician to manually override the workflow and skip to the next task. The locate technician may select an appropriate button using any suitable input mechanism provided by the workflow interface, such as a touch screen and/or a touchpad.

Returning to FIG. 15, the local agent may enter into a loop for processing the steps listed in the received workflow upon notification that the locate technician has begun work on the corresponding ticket (e.g., by opening the ticket in a ticket management software). At the beginning of each iteration in the loop (e.g., act 910), the local agent may identify and extract the next step from the workflow, for example, using a suitable parsing technique such as those discussed hereinabove. At act 915, the local agent may process the retrieved workflow step and generate a popup window accordingly. For example, the local agent may generate popup window 1005A based on step 2 in the 20083771309 workflow, popup window 1005B based on step 3, popup window 1005C based on step 4, popup window 1005D based on step 10, and so on.

At act 920, the local agent may determine whether a manual override has been received from the locate technician to skip the current workflow step. As discussed above, a locate technician may wish to skip or delay one or more steps in a workflow due to unforeseen difficulties, such as lack of equipment, inaccurate dig area description, inadequate instructions, limited access to dig area, and the like. If such a manual override instruction has been received, the process 900 proceeds to act 925 to prompt the locate technician for one or more reasons for skipping, redirecting, and/or modifying the current step. This information may be saved at act 930, for example, in an updated workflow in association with the current step. The process 900 may then continue to act 935 to process the next workflow step.

While no manual override instructions are received, the local agent may monitor the locate technician's activities, for example, by receiving locating equipment data at act 940 from one or more pieces of locating equipment used by the locate technician (e.g., the locating equipment 270 shown in FIG. 7) and/or receiving manual input from the locate technician at act 945.

In some embodiments, a marking device used by the locate technician may be configured to log information throughout a marking operation. For example, the marking device may include a triggering system configured to trigger, with each actuation of the marking device, the logging of any information of interest, such as, but not limited to, geo-location data from a location tracking system, timestamp data from a timing system, marking material information from a marking material detection mechanism regarding the marking material present in a marking dispenser (e.g., color, brand and amount), and so on.

While many disclosed embodiments relate to marking devices that physically apply marking material at a dig area, it should be appreciated that the inventive concepts discussed herein also apply to electronic markings of facilities (e.g., generated by logging a geo-location of detected facilities in response to an activation of an actuator instead of, or in addition to, physically applying marking material).

In some other embodiments, as the locate technician attends to each task in the workflow as presented in the workflow output (e.g., the popup windows 1005A-D shown in FIG. 13), the locate technician may update the status of that task by selecting "Verified" or "Failed." If the locate technician selects "Verified" with respect to a facility type to be located, he may be prompted to enter "Marked" or "Cleared" to clarify the record regarding that facility type. In some embodiments, the locate technician may be further prompted to capture and submit one or more digital images of any locate marks placed in the dig area, for example, using a digital camera that may be standalone or integrated with a piece of locating equipment (e.g., a marking device, a locate transmitter, a locate receiver and/or a combined locate and marking device).

If, on the other hand, the locate technician selects "Failed," he may be prompted to enter one or more explanations as to why he was unable to complete the task. For example, the locate technician may enter notes indicating that an attempt was made to locate a particular type of facilities but the locating equipment was unable to detect clear signal. The locate technician may further indicate defective tracer wires as a potential cause of the problem.

At act 950, the local agent may analyze any locating equipment data received at act 940 and/or any manual input received at act 945 to look for any discrepancies and/or non-conformities. Then, at act 955, the local agent may determine whether one or more alerts should be issued to the locate technician, supervisory personnel, ticket dispatch personnel and/or any other interested party. If so, the appropriate alerts are issued at act 960.

Although act 950 is shown in FIG. 15 as being subsequent to act 940 and act 945, it should be appreciated that the present disclosure is not so limited. The analysis of act 950 may begin as soon as some meaningful data is available, and may continue while other data is still being collected. In other words, data collection and analysis may happen concurrently, which may advantageously shorten the amount of time needed to respond to newly collected data. Furthermore, in analyzing the collected data, the local agent may access auxiliary information such as facilities maps from any suitable source (e.g., the auxiliary information sources 250 shown in FIG. 8). More specific examples of data analyses and the responses they trigger are discussed in greater detail below in connection with FIGS. 17-??.

If it is determined at act 955 that an alert is appropriate, the locate technician and/or other interested parties may be notified at act 960. In many situations, such as those described above, feedback from the locate technician may be received at act 965, for example, to confirm whether a detected discrepancy or non-conformity has been corrected. The process 900 may then continue to act 930 to record any suitable information regarding the current workflow task, including, but not limited to, locating equipment data, locate technician notes (e.g., in text form or as audio recordings), one or more digital images taken at the dig area, summary of detected irregularities, locate technician feedback regarding the detected irregularities and/or reasons for override (if any).

At act 935, it is determined whether the workflow contains any unprocessed task(s). If so, the process 900 may return to act 910 to enter a next iteration of the loop, for example, to process the next available task in the workflow. If there are no more tasks, the final updated workflow may be transmitted to a business application of interest, such as the business applications 290 described in connection with FIG. 7, and the process 900 may end. In some embodiments, this transmission may be received by a scheduling and dispatch application, which may automatically assign a next ticket to the locate technician upon receiving the final updated workflow. In some further embodiments, the transmission may be received by a quality assessment application, which may assign a quality score to the locate and/or marking operation and may recommend corrective actions and/or training for the locate technician if one or more problems are observed.

Additionally, or alternatively, the updated workflow may be stored in a suitable database and made available to one or more applications within the workforce guidance and monitoring system. Also, even though it is not shown in FIG. 15, an updated workflow may be transmitted before all of the tasks in the workflow have been processed. For example, as discussed above, a partially updated workflow may be transmitted to a scheduling and dispatch application to enable real-time schedule adjustments. This may be particularly advantageous in situations where a locate technician is significantly behind schedule because one or more tasks in the workflow are more time-consuming than expected.

C. Execution of Illustrative Workflow Tasks

As discussed above, FIG. 16 shows a series of popup windows 1005A-D that may be presented to a technician in accordance with the illustrative 20083771309 workflow described above. For example, the popup window 1005A may correspond to step 2 of the 20083771309 workflow, the popup window 1005B may correspond to step 3, the popup window 1005C may correspond to step 4, and the popup window 1005D may correspond to step 10. Various illustrative implementations (e.g., automatic, semi-automatic and/or manual implementations) of each of these steps are now described.

In accordance with some embodiments, the technician may open the 20083771309 ticket upon completing a previous locate and/or marking operation, thereby causing the 20083771309 workflow to be loaded into a local agent (e.g., the local agent 260 shown in FIG. 7), which may begin executing the workflow. Although not shown, the local agent may provide driving instructions to the technician for proceeding to the work site for the 20083771309 ticket.

Upon arrival, the technician may be provide an input to the local agent indicating that he has arrived. In response, the local agent may automatically verify whether the technician has arrived at the correct work site, for example, by comparing geo-location data received from a GPS device against location information contained in a corresponding ticket and/or work order. That is, the local agent may attempt to automatically complete step 2 of the 20083771309 workflow.

For example, the local agent may receive current GPS coordinates from a GPS device installed on any suitable equipment used by the technician, including, but not limited to, the technician's vehicle, an equipment docking station, a tablet computer, a mobile phone, a marking device (e.g., the marking device 110 shown in FIG. 2), a locate transmitter, a locate receiver, a combined locate and/or marking device and the like. In some embodiments, the local agent may apply one or more validation rules to the received GPS coordinates to determine whether they should be used as the technician's current location. For example, the local agent may examine recently received GPS coordinates to determine whether the technician and/or his vehicle are moving faster than a certain speed threshold. If the speed threshold is exceeded, the local agent may decide not to use the current GPS readings and/or present an error message to the technician.

Additionally, the local agent may retrieve work site location information such as a work site address, grid coordinates and/or GPS coordinates from a corresponding ticket and/or work order. If necessary, the retrieved work site location information may be converted into GPS coordinates using a suitable geo-coding algorithm.

The two sets of GPS coordinates (i.e., current coordinates and coordinates associated with the work site) may then be automatically compared to determine whether the technician is likely to have arrived at the correct work site. For example, a threshold distance (e.g., 100, 500, 1000 or 1500 feet) may be used to determine whether the two sets of coordinates represent locations that are sufficiently close to each other. If the locations are sufficiently close, the local agent may automatically update the status of step 2 the 20083771309 workflow to "Verified." Otherwise, the local agent may generate a visual and/or audible alert notify the technician that he may have arrived at the wrong location. For example, in one embodiment, the local agent may present the popup window 1005A (as shown in FIG. 16) to ask the locate technician to verify his current position. (Alternatively, in the embodiments discussed above in connection with FIG. 15, the local agent may present the popup window 1005A with having performed an automatic verification of the technician's current location.)

Figure 17:
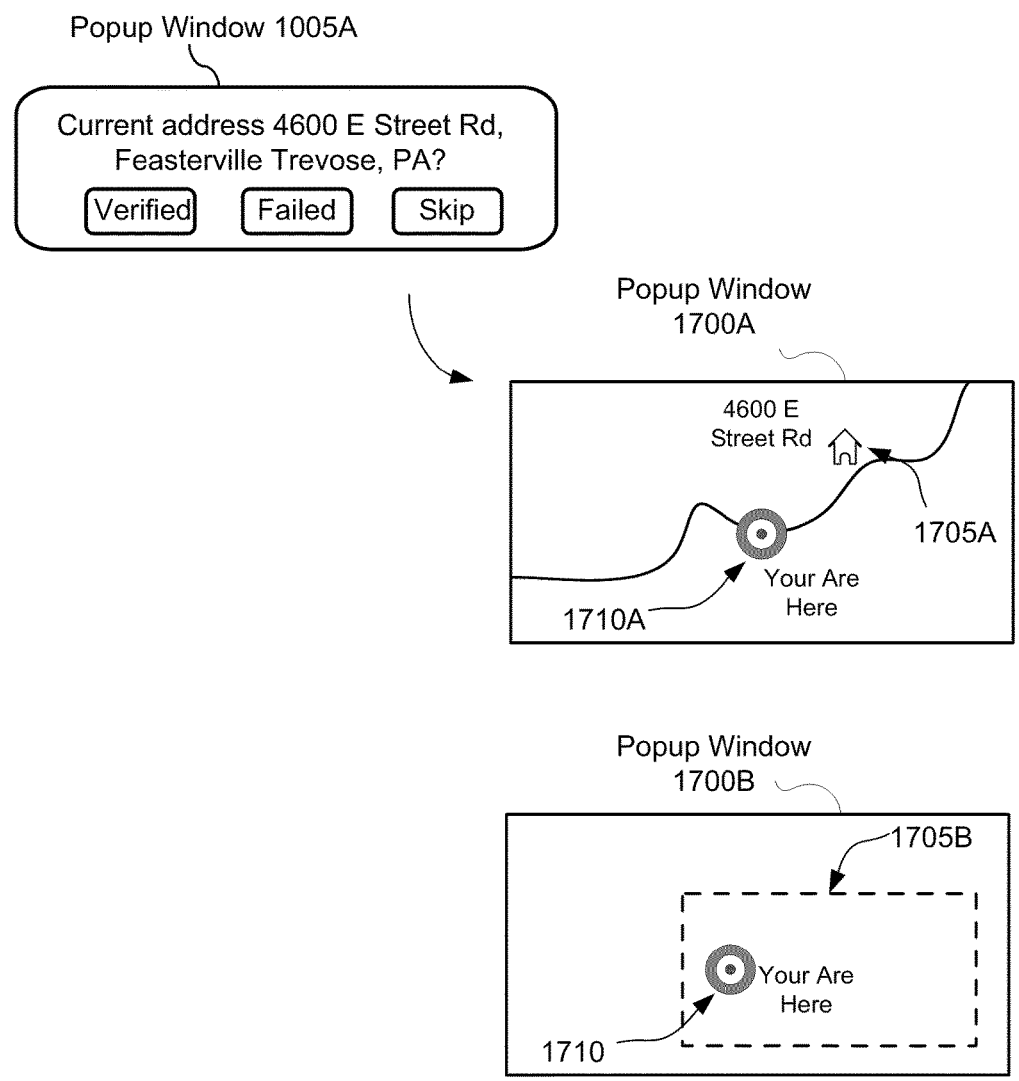

In some embodiments, the local agent may present additional information to assist the technician in verifying his current position. FIG. 17 shows two popup windows 1700A and 1700B that may help the technician identify his location relative to the work site. For example, the popup window 1700A shows a portion of a street map, on which the work site is identified via an indicator 1705A based on address information contained in the ticket information. A "Your Are Here" indicator 1710A may be also shown on the map based on current location information (e.g., current GPS coordinates provided a GPS device as discussed above). In addition to studying maps and/or physical surroundings, the technician may visually compare the locations of the indicators 1705A and 1710A to determine whether he has arrived at the correct work site.

Alternatively, the popup window 1700B may be presented, showing a dig area indicator 1705B based on GPS coordinate information contained in the ticket information (e.g., GPS coordinate information associated with a VWL image attached to the ticket). The dig area indicator 1705B may be overlaid onto an underlying image (e.g., as in the VWL image 400 shown in FIG. 7A), although it is not required. As in the popup window 1700A, a "Your Are Here" indicator 1710B may be also shown in the popup window 1700B and its position relative to the dig area indicator 1705B may change over time as the technician moves in the vicinity of the work site. In this manner, the technician may also visually compare the locations of the indicators 1705B and 1710B to determine whether he has arrived at the correct location.

If it is determined that the technician has arrived at the wrong location, the local agent may dynamically modify the current workflow to reflect additional tasks to be performed to correct the error. For example, the local agent may determine whether the location of the correct work site can be determined based on information extracted from the corresponding ticket and/or work order. If such a location can be ascertained (e.g., in the form of an address or GPS coordinates), the local agent may insert additional tasks into the workflow, such as determining the technician's current location, determining a route to the correct work site, and traveling to the correct work site. Additionally, information concerning these changes to the workflow may be transmitted to one or more remote computers for review, or to enable other business applications, such as a scheduling and dispatch engine, to make real time adjustments accordingly.

It should be appreciated that workflows may be dynamically modified in any suitable manner, not limited to inserting additional workflow tasks. For example, workflow tasks may also be deleted and/or moved based on newly available information. Checklists and sub-workflows may also be added, deleted, moved, and/or modified as the circumstances require or suggest.

Referring now to step 3 of the 20083771309 workflow (see also popup window 1005B shown in FIG. 16), the local agent may attempt to automatically verify whether the current date is before the ticket due date (e.g., Jan. 5, 2009). This information may be obtained from a corresponding work order (e.g., from the due date information field 508 of the work order 215 shown in FIG. 8). Alternatively, or additionally, the local agent may attempt to automatically verify whether the current date and/or time is before the scheduled work begin date and/or time (e.g., Jan. 4, 2009 at 9:00 AM), which may also be obtained from a corresponding work order (e.g., from the field 514A of the work order 215 shown in FIG. 8). The current date and/or time information may be obtained from any suitable timing system, such as a GPS device installed on piece of equipment used by the technician. If the current data and/or time is after the ticket due date and/or the scheduled work begin date and/or time, an alert may be generated to notify the technician. Additionally, an update relating to this workflow task (i.e., step 3 of the 20083771309 workflow) may be transmitted to one or more remote computers, where a supervisor may be alerted to the possible missed due date.

With reference to step 4 of the 20083771309 workflow (see also popup window 1005C shown in FIG. 16), the local agent may automatically or semi-automatically verify whether the technician has successfully identified utility pole number 24860, for example, by comparing reference location information and actual location information for the utility pole.

To obtain reference location information, the local agent may extract from a corresponding ticket and/or work order any relevant work site location information, such as address, grid coordinates and/or GPS coordinates. The local agent may also extract from the ticket and/or work order any information relating to the utility pole number 24860, such as an associated facilities type, an install date, and/or any relevant remarks information (e.g., the location information 304A shown in FIG. 6).

Using the extracted work site and/or utility pole information, the local agent may access one or more relevant utility plats from a suitable database (e.g., the auxiliary information sources 250 shown in FIG. 7). For example, the associated facilities type may be used to identify a suitable collection of utility plats, and the work site location may be used to identify one or more plats containing the work site. Furthermore, the install date of the utility pole number 24860 may be compared against revision dates of the utility plats to eliminate plats that may be too old to contain any useful information. Finally, the reference number "24860" may be used to automatically identify the desired utility pole on a retrieved utility plat and to obtain associated location information (e.g., GPS coordinates) from the utility plat metadata.

In an alternative embodiment, the local agent may present the retrieved utility plat to the technician (e.g., with an aerial layer enabled) and allow the technician to manually identify the desired pole, for instance, by clicking on the plat. The local agent may then obtain GPS coordinates representing the location of the pole from the associated utility plat metadata.

Having thus obtained reference location information (e.g., GPS coordinates) for the utility pole 24860, the local agent may prompt the technician to obtain actual location information for the pole, for example, using a GPS-enabled device with a landmark functionality. For example, the technician's marking device may be equipped with a landmark mode such that, when actuated, the marking device causes the current GPS coordinates to be stored in an electronic record. Such a marking device is described in non-provisional application Ser. No. 12/568,087, entitled "Methods and Apparatus for Generating an Electronic Record of Environmental Landmarks based on Marking Device Actuations," filed on Sep. 28, 2009, which is hereby incorporated herein in its entirety. The local agent may prompt the technician to physically proceed to the utility pole 24860 with the marking device and actuate the device while in landmark mode. The GPS coordinates, thus recorded, may be compared against the reference GPS coordinates to check for any inconsistencies. For example, an alert may be generated if the distance between the reference location and the actual location exceeds a certain threshold (e.g., 5, 10, 25 or 50 feet).

It should be appreciated that the landmark functionality discussed above may be available on other pieces of equipment instead of, or in addition to, a marking device. For example, it may be available on the technician's vehicle, cellular phone, tablet computer, locate receiver, locate transmitter and/or combined locate and marking device. Also, in addition to comparing reference and actual location information, the local agent may prompt the technician to capture a digital image of the utility pole showing its serial number, for example, using a digital camera integrated into a piece of locating equipment. The captured image may be automatically analyzed (e.g., using character recognition) to determine whether the serial number captured in the image correspond to the pole number extracted from the ticket and/or work order.

Figure 18:
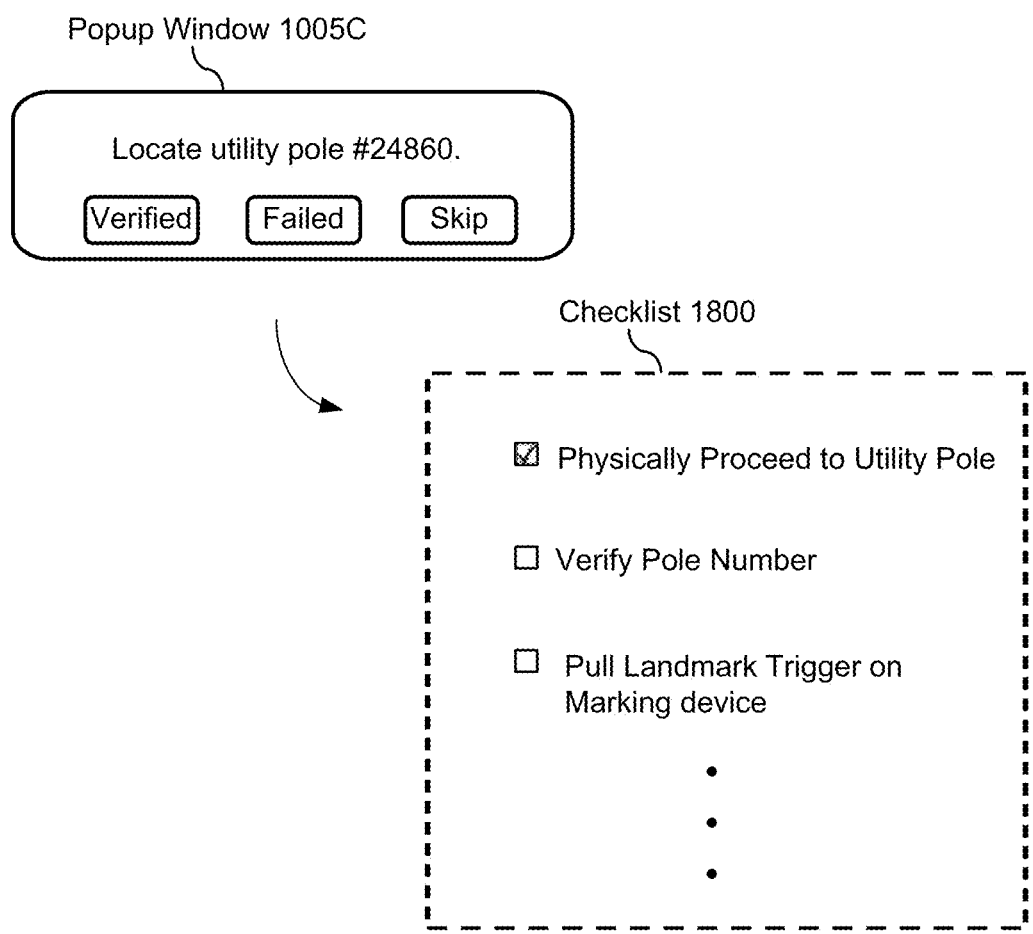

In some further embodiments, the local agent may present a checklist to the technician containing checklist items to be performed in order to verify the technician has successfully identified utility pole number 24860. For example, as shown in FIG. 18, a checklist 1800 may be shown concurrently with the popup window 1005C. The checklist 1800 may contain three items to be completed by the technician in any suitable ordering: physically proceed to the utility pole, verify pole number found on the pole, and pull landmark trigger on a marking device to record actual location of the pole. Such a checklist may help to ensure that sufficient information is gathered to enable the local agent to perform part or all of the location verification discussed above. For example, the local agent may be configured such that the technician may not proceed to a subsequent step in the workflow (e.g., step 5 of the 20083771309 workflow) unless he has completed (e.g., checked off) every item on the checklist 1800.

Referring now to step 10 of the 20083771309 workflow (see also popup window 1005C shown in FIG. 16), the local agent may automatically or semi-automatically verify whether the locate technician has successfully located gas facilities within the dig area and applied marking material and/or flags appropriately.

To determine whether the locate technician has adequately located gas facilities. In some embodiments, the local technician may, in some embodiments, determine an expected scope (e.g., length) of gas facilities present in the dig area. This may be accomplished by extracting dig area information (e.g., GPS coordinates associated with a dig area indicator) and using a facilities map to identify all gas facilities that fall within the dig area.

Then, the local agent may determine a detected scope (e.g., length) of gas facilities by analyzing locate receiver data (e.g., as shown in Tables 4 or 5 above). For example, the local agent may identify GPS points for which an appropriately high signal level is recorded for gas facilities and compute an extrapolated length based on the identified GPS points. If the difference between the expected scope and the detected scope exceeds a certain threshold (e.g., 5%, 10% or 20% of the expected scope), an alert may be generated to notify the technician. Additionally, the local agent may update the present workflow task (i.e., step 10 of the 20083771309 workflow) with discrepancy information and transmit the updated workflow to remote computer for supervisory review. When appropriate, a message describing the discrepancy may also be sent to a one-call center, excavator and/or facilities owner, so that they may verify and/or update their records accordingly.

To determine whether the technician applied marking material and/or flags appropriately, the local agent may analyze marking device data (e.g., as shown in Tables 1-3 or 5 above). For example, the local agent may monitor marking material color information received from a marking device used by the locate technician and compare the marking material color with a marking material color retrieved from a lookup table (e.g., Table 1 above) base on the pertinent facility type (e.g., gas). An alert may be rendered visually and/or audibly based on the comparison. For example, the locate technician may see on a screen of a user interface (e.g., the user interface 280 shown in FIG. 7) a message "clear to proceed" if the colors match. Additionally, or alternatively, the locate technician may hear the same message rendered by a speech synthesis component of the local agent. As yet another alternative, both the expected marking color and the detected marking color may be displayed on the screen so the technician may visually see a match or mismatch.

If the color information received from the marking device does not correlate correctly to the facility type currently being processed (e.g., gas), visual and/or audible alerts may be rendered, such as "warning: please check paint color." In some embodiments, this information may be transmitted in real time to a supervisor at a remote workforce management center that oversees a large number of technicians. Additionally, the local agent may, either automatically or upon instruction by a remote supervisor, prevent the technician from further marking, for example, by locking one or more trigger mechanisms on the technician's marking device.

In some further embodiments, the local agent may compare locate receiver data against marking device data to determine whether the scope of facilities detected matches the scope of facilities marked. For example, the local agent may identify GPS points associated with a marking material color corresponding to the facility type being processed (e.g., gas) and compute an extrapolated length of marking based on the identified GPS points. If there is a significant difference between the length of facilities detected and the length of facilities marked (e.g., exceeding a certain percentage threshold, such as 5%, 10% or 20%), an appropriate alert may be presented to the technician and/or transmitted to a supervisor.

Figure 19:
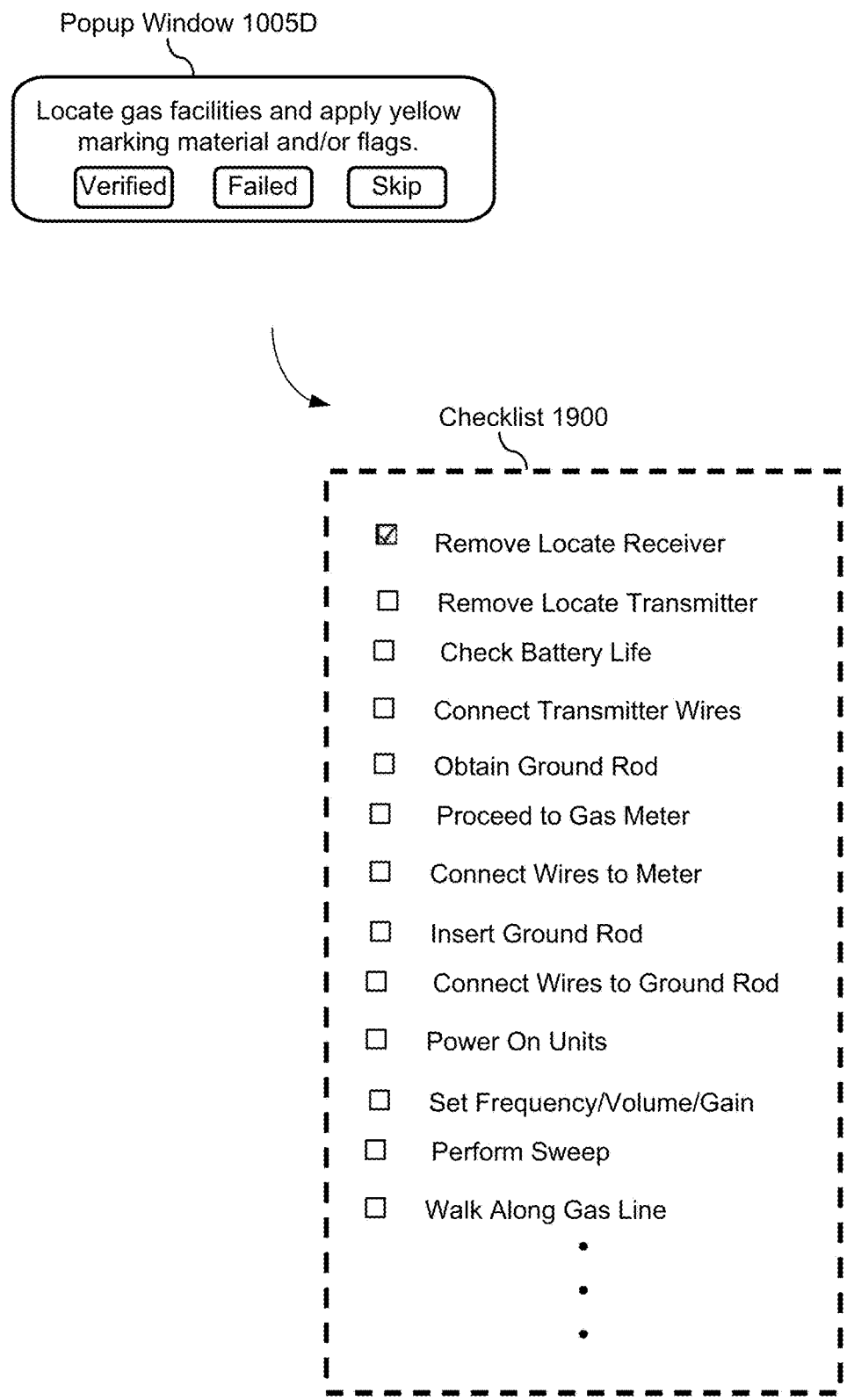

As with other workflow tasks discussed above, a checklist associated with step 10 of the 20083771309 workflow may be presented to the technician to provide further guidance. For example, as shown in FIG. 19, a checklist 1900 may be shown concurrently with the popup window 1005D. The checklist 1900 may contain a number of items to be completed by the technician in any suitable ordering: remove locate receiver from a carrying case or a docking station in the vehicle; remove locate transmitter from a carrying case or a docking station in the vehicle; check battery life for the locate transmitter and the locate receiver; connect transmitter wires using appropriate clips; obtain a ground rod from the vehicle; physically proceed to the gas meter; connect transmitter wires to the meter; connect transmitter wires to the ground rod and insert the ground rod into the ground to ground the transmitter wires; power on the locate transmitter and receiver; set operation parameters such as frequency, volume and/or gain; perform sweep operation using locate receiver to determine a direction in which gas facilities leave the gas meter; and trace or walk along the detected gas facilities. Again, such a checklist may ensure that the technician follows all recommended or necessary procedures when locating and marking gas facilities.

It should be appreciated that the present disclosure is not limited to the examples described above, as other types of data analyses and system responses may also be suitable. Some further examples of data analyses and system responses (e.g., alerts) may be as follows.

The local agent may use location information such as address and/or GPS coordinates associated with the current locate and/or marking operation to retrieve a corresponding facilities map, and determine whether a number of actuations of a marking device correlate (e.g., within an acceptable tolerance) to an expected facility length derived based on the facilities map. Visual and/or audible alerts may be generated accordingly. For example, in the event of a mismatch, the locate technician may be asked to verify and confirm the markings.

The local agent may determine whether geo-location data received from the marking device correlate (e.g., within an acceptable tolerance) to facilities geo-locations obtained from the facilities map. Again, appropriate visual and/or audible alerts may be generated accordingly.

The local agent may also analyze other ticket information, such as any instructions regarding a preferred connection point for a locate transmitter to a facility. Information regarding an actual connection point may be available from locating equipment data received from the locate transmitter. Visual and/or audible alerts may be generated if there is a mismatch. As another example, if a damage history relating to the dig area is available in the ticket information, the local agent may notify the locate technician of the nature of past damages and/or recommend appropriate precautionary actions.

Additionally, any of the methods, apparatus and systems described in the following applications may be used to analyze the collected locating equipment data and to generate one or more appropriate system responses. Each of these applications are hereby incorporated by reference herein:

U.S. patent application Ser. No. 12/493,109, filed on Jun. 26, 2009, entitled "Methods and Apparatus for Quality Assessment of a Field Service Operation;"

U.S. patent application Ser. No. 12/557,732, filed on Aug. 7, 2009, entitled "Methods and Apparatus for Quality Assessment of a Field Service Operation Based on Geographic Information;"

U.S. patent application Ser. No. 12/571,356, filed on Sep. 30, 2009, entitled "Methods and Apparatus for Analyzing Locate and Marking Operations with Respect to Facilities Maps;"

U.S. patent application Ser. No. 12/572,202, filed on Oct. 1, 2009, entitled "Methods and Apparatus for Analyzing Locate and Marking Operations with Respect to Historical Information;"

U.S. patent application Ser. No. 12/568,087, filed on Sep. 28, 2009, entitled "Methods and Apparatus for Generating an Electronic Record of Environmental Landmarks Based on Marking Device Actuations;" and U.S. patent application Ser. No. 12/572,260, filed on Oct. 1, 2009, entitled "Methods and Apparatus for Analyzing Locate and Marking Operations with Respect to Environmental Landmarks."

For example, in accordance with various embodiments described in above-referenced applications, a quality assessment of a locate and/or marking operation may be performed based on the collected locating equipment data, with or without human input. In some embodiments, the collected locating equipment data may be compared to "reference information" or "reference data" (which in some instances is derived from information/data contained in a "reference" electronic record). Examples of types of reference information/data used in a quality assessment process may include, but are not limited to: 1) information/data derived from or relating to one or more facilities maps that illustrate the presumed locations of underground facilities purportedly present in a geographic area proximate to or surrounding and subsuming the work site; 2) information/data derived from or relating to one or more previous locate and/or marking operations at or near the work site (referred to herein as "historical tickets" or "historical data"); and/or 3) information/data relating to one or more environmental landmarks present in a geographic area proximate to or surrounding and subsuming the dig area (e.g., the work site and its environs), or within the dig area itself (referred to herein as "landmark information," which may be available, for example, from facilities maps, historical tickets, and/or field data collected at or around the time of the locate and/or marking operation being assessed). For each type of reference information, suitable criteria and/or metrics may be developed to facilitate an automated determination of quality assessment.

As a more specific example, locating equipment data such as geographic information, facility type information, and/or other information relating to an underground facility detected and/or marked may be compared to reference information including geographic and/or other information relating to the corresponding facility as indicated on one or more facilities maps (e.g., all or some of the locating equipment data may be compared to reference information derived from one or more facilities maps). The comparison may generally involve determining whether or not there is agreement between the locating equipment data and the reference information provided by the one or more facilities maps, which may in turn involve identifying at least one correspondence or discrepancy between the compared information, and in some instances a degree of correspondence.

As another example, some or all of the locating equipment data may be compared to some or all of the contents of a reference electronic record. For example, the reference electronic record may comprise data derived from or relating to one or more previous (or "historical") locate and/or marking operations conducted at the same work site as the current locate and/or marking operation. The types of data being compared between the current locating equipment data and the reference electronic record may include geographic information, facility type information, and/or other information relating to the facilities identified and/or marked during the current and historical locate and/or marking operations.

As a further example, the reference information may comprise data relating to one or more environmental landmarks ("landmark information," e.g., geographic information and/or landmark category/type information relating to one or more environmental landmarks), and a variety of assessments are possible. For instance, some or all of the locating equipment data such as geographic information, facility type information, and/or other information relating to an underground facility identified and/or marked may be compared to reference information comprising landmark information to determine whether or not the location and/or type of one or more facilities identified and/or marked during the locate and/or marking operation are expected in view of the location and/or type of one or more environmental landmarks. Such a comparison may include identifying at least one correspondence or discrepancy between the compared data based on or more criteria. The landmark information may be derived, for example, from one or more facilities maps, one or more historical tickets, or may be collected together with (e.g., essentially concurrently with) various information relating to the locate and/or marking operation (the locate and/or marking operation to be assessed may include acquisition of landmark information relating to one or more environmental landmarks, and this landmark information may be used for the assessment).

XI. Conclusion

In summary, the various concepts disclosed herein relating to: ticket information, ticket use, processing, parsing, analysis, formatting, appearance, display, and the like; generation or work orders, technician checklists, and workflows; implementation and execution of work orders, checklists, and workflows; and generation of completed tickets, completed/updated checklists, completed/updated workflows (collectively referred to as technician activity logs) provide various advantages including, but not limited to: (1) providing systematic ways of guiding locate technicians with respect to the work scope and/or workflow of locate and/or marking operations, thereby improving quality and/or operating efficiency with respect to locate and/or marking operations; (2) providing a mechanism by which the locate technician may acknowledge, add, and/or delete tasks to be performed during locate and/or marking operations prior to performing the locate and/or marking operations; (3) providing ways of manually and/or automatically prompting the locate technician with respect to tasks that are performed during locate and/or marking operations; and (4) providing ways of manually and/or automatically verifying the completion of locate and/or marking operations.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A marking apparatus for performing a marking operation to mark on ground, pavement, or other surface a presence or an absence of at least one underground facility, the apparatus comprising:

an actuator to dispense a marking material so as to form at least one locate mark on the ground, pavement or other surface to mark the presence or the absence of the at least one underground facility;

at least one user interface including at least one display device;

at least one communication interface;

a marking material detection mechanism to detect color information of the marking material dispensed to form the at least one locate mark;

a memory to store processor-executable instructions, wherein the processor-executable instructions include ticket processing software; and a processor communicatively coupled to the memory, the at least one communication interface, the at least one user interface, the marking material detection mechanism, and the actuator, wherein upon execution of the ticket processing software by the processor, the processor:

receives via the at least one communication interface first ticket information that includes at least one locate request ticket pertaining to the marking operation, wherein the marking operation comprises marking, with the at least one locate mark on the ground, pavement, or other surface, the presence or the absence of the at least one underground facility;

controls the at least one display device so as to display second ticket information on the at least one display device, wherein the second ticket information includes a process guide for performing the marking operation, the process guide providing guidance that includes a set of instructions and/or prompts to a locate technician for performing the marking operation to mark the presence or the absence of the at least one underground facility; and wherein the second ticket information is derived from the first ticket information that includes the at least one locate request ticket;

processes the at least one locate request ticket to generate the process guide; and receives the color information of the marking material to determine a type of the at least one underground facility so as to facilitate performing the marking operation based at least in part on the process guide.

2. The apparatus of claim 1, wherein upon execution of the ticket processing software, the processor further stores at least one of the first ticket information and the second ticket information in the memory.

3. The apparatus of claim 1, wherein upon execution of the ticket processing software, the processor controls the at least one communication interface to transmit the second ticket information to at least one external device.

4. The apparatus of claim 1, wherein the first ticket information and the second ticket information includes a work order derived from the at least one locate request ticket.

5. The apparatus of claim 1, wherein:
the first ticket information is the at least one locate request ticket; and
the processor processes the at least one locate request ticket to generate the second ticket information.

6. The apparatus of claim 5, wherein the second ticket information includes a work order, and wherein the processor processes the at least one locate request ticket to generate the work order.

7. The apparatus of claim 5, wherein the process guide includes a checklist for performing the marking operation.

8. The apparatus of claim 5, wherein the process guide includes a workflow for performing the marking operation.

9. The apparatus of claim 5, wherein the processor generates the process guide based on the at least one locate request ticket and auxiliary information derived from at least one of:
one or more facilities maps;
one or more historical records of one or more previous locate and/or marking operations;
one or more industry best practice guides; and
standard operating procedures of a locate contractor performing and/or overseeing the marking operation.

10. The apparatus of claim 5, wherein:
the first ticket information includes a work order for the marking operation, wherein the work order is derived from the locate request ticket; and
the processor processes the work order to generate the second ticket information.

11. The apparatus of claim 10, wherein the processor processes the work order to generate the process guide.

12. The apparatus of claim 11, wherein the process guide includes a checklist for performing the marking operation.

13. The apparatus of claim 11, wherein the process guide includes a workflow for performing the marking operation.

14. The apparatus of claim 11, wherein the processor generates the process guide based on the work order and auxiliary information derived from at least one of:
one or more facilities maps;
one or more historical records of one or more previous locate and/or marking operations;
one or more industry best practice guides; and
standard operating procedures of a locate contractor performing and/or overseeing the marking operation.

15. The apparatus of claim 5, wherein upon execution of the ticket processing software, the processor facilitates execution of the process guide by providing at least one indication to a technician using the apparatus to perform the marking operation.

16. The apparatus of claim 15, wherein the at least one user interface includes at least one visual indicator in addition to the at least one display, and wherein the processor controls the at least one visual indicator so as to provide the at least one indication to the technician as a visual indication.

17. The apparatus of claim 15, wherein the at least one user interface includes at least one audible indicator, and wherein the processor controls the at least one audible indicator so as to provide the at least one indication to the technician as an audible indication.

18. The apparatus of claim 15, wherein the at least one user interface includes at least one tactile indicator, and wherein the processor controls the at least one tactile indicator so as to provide the at least one indication to the technician as a tactile indication.

19. The apparatus of claim 15, wherein the processor controls the at least one display device to generate at least one popup window so as to provide the at least one indication to the technician.

20. The apparatus of claim 5, wherein upon execution of the ticket processing software, the processor receives technician input from the at least one user interface so as to facilitate execution of the process guide, and wherein the processor stores in the memory a technician activity log based at least in part on the technician input.

21. The apparatus of claim 20, wherein the processor controls the at least one display device to generate a touch-screen display graphics user interface (GUI) to receive the technician input.

22. The apparatus of claim 21, wherein the touch-screen display GUI includes at least one popup window, and wherein the processor controls the at least one display device to generate the at least one popup window to receive the technician input.

23. The apparatus of claim 20, wherein:
the apparatus further comprises at least one input device to provide marking information regarding the marking operation;
upon execution of the ticket processing software, the processor further receives at least some of the marking information from the at least one input device so as to facilitate execution of the process guide; and
the processor further stores in the memory the at least some of the marking information received from the at least one input device.

24. The apparatus of claim 23, wherein the processor stores in the memory the at least some of the marking information in the technician activity log.

25. The apparatus of claim 23, wherein the at least one input device comprises one or more of:
a location tracking system to provide geographic information and/or timing information;
a timing system to provide timing information;
the marking material detection mechanism to provide marking material information;
at least one environmental sensor to provide environmental information; and
at least one operational sensor to provide operational information,
wherein the marking information includes at least one of the geographic information, the timing information, the marking material information, the environmental information and the operational information.

26. The apparatus of claim 23, wherein upon execution of the ticket processing software, the processor:
 makes a comparison of the at least some of the marking information and the first ticket information; and
 controls the at least one user interface so as to generate at least one alert to the technician based at least in part on the comparison.

27. The apparatus of claim 23, wherein upon execution of the ticket processing software, the processor modifies the process guide based at least in part on the at least some of the marking information.

28. The apparatus of claim 5, wherein:
 the apparatus further comprises at least one input device to provide marking information regarding the marking operation; and
 upon execution of the ticket processing software, the processor receives at least some of the marking information from the at least one input device so as to facilitate execution of the process guide without any technician input, and wherein the processor stores in the memory a technician activity log based at least in part on the at least some of the marking information.

29. The apparatus of claim 28, wherein the at least one input device comprises one or more of:
 a location tracking system to provide geographic information and/or timing information;
 a timing system to provide timing information;
 the marking material detection mechanism to provide marking material information;
 at least one environmental sensor to provide environmental information; and
 at least one operational sensor to provide operational information,
 wherein the marking information includes at least one of the geographic information, the timing information, the marking material information, the environmental information and the operational information.

30. The apparatus of claim 28, wherein upon execution of the ticket processing software, the processor:
 makes a comparison of the at least some of the marking information and the first ticket information; and
 controls the at least one user interface so as to generate at least one alert to the technician based at least in part on the comparison.

31. The apparatus of claim 28, wherein upon execution of the ticket processing software, the processor modifies the process guide based at least in part on the at least some of the marking information.

32. The apparatus of claim 5, further comprising:
 at least one receiver antenna, communicatively coupled to the processor, to detect a magnetic field from at least one underground facility when present and provide a detection signal to the processor, so as to facilitate performance of a locate operation in addition to the marking operation.

33. A method for facilitating a marking operation performed by a marking apparatus to mark on ground, pavement, or other surface a presence or an absence of at least one underground facility, the marking apparatus comprising:
 an actuator to dispense a marking material so as to form at least one locate mark on the ground, pavement or other surface;
 at least one user interface including at least one display device;
 at least one communication interface;
 a marking material detection mechanism to detect color information of the marking material; and
 a processor communicatively coupled to the memory, the at least one communication interface, the at least one user interface, and the actuator,
the method comprising:
 A) receiving, via the at least one communication interface, at the marking apparatus first ticket information that includes at least one locate request ticket pertaining to the marking operation
 B) displaying on the at least one display device of the marking apparatus second ticket information derived from the first ticket information;
 C) actuating the actuator to dispense the marking material, based at least in part on the displayed second ticket information, so as to form the at least one locate mark on the ground, pavement or other surface to mark the presence or the absence of the at least one underground facility; and
 D) receiving the color information of the marking material to determine a type of the at least one underground facility so as to facilitate performing the marking operation based at least in part on a process guide,
 wherein the first ticket information is the at least one locate request ticket, wherein the second ticket information includes the process guide for performing the marking operation, wherein the processor processes the at least one locate request ticket to generate the process guide, and wherein the process guide provides guidance that includes a set of instructions and/or prompts to a locate technician for performing the marking operation to mark the presence or the absence of the at least one underground facility.

34. The method of claim 33, further comprising:
 storing at least one of the first ticket information and the second ticket information in a memory of the marking apparatus.

35. The method of claim 33, further comprising:
 transmitting the second ticket information from the marking apparatus to at least one external device.

36. The method of claim 33, wherein the first ticket information and the second ticket information includes a work order derived from the at least one locate request ticket.

37. The method of claim 33, wherein the method further comprises processing the at least one locate request ticket to generate the second ticket information, wherein the second ticket information includes one of a work order, a checklist, and a workflow for the marking operation.

38. The method of claim 37, further comprising generating the second ticket information based on the at least one locate request ticket and auxiliary information derived from at least one of:
 one or more facilities maps;
 one or more historical records of one or more previous locate and/or marking operations;
 one or more industry best practice guides; and
 standard operating procedures of a locate contractor performing and/or overseeing the marking operation.

39. The method of claim 33, wherein:
 the first ticket information includes a work order for the marking operation, wherein the work order is derived from the at least one locate request ticket; and
 the method further comprises processing the work order to generate the second ticket information, wherein the second ticket information includes one of a checklist and a workflow for the marking operation.

40. The method of claim 39, further comprising generating the second ticket information based on the work order and auxiliary information derived from at least one of:
one or more facilities maps;
one or more historical records of one or more previous locate and/or marking operations;
one or more industry best practice guides; and
standard operating procedures of a locate contractor performing and/or overseeing the marking operation.

41. The method of claim 33, further comprising:
E) executing the process guide by providing at least one indication to a technician using the marking apparatus to perform the marking operation.

42. The method of claim 41, wherein E) comprises:
E1) providing at least one of a visual indication, an audible indication, and a tactile indication to the technician.

43. The method of claim 42, wherein E1) comprises:
generating at least one popup window on the at least one display device so as to provide the at least one indication to the technician.

44. The method of claim 33, further comprising:
E) receiving technician input so as to facilitate execution of the process guide; and
F) storing in a memory of the marking apparatus a technician activity log based at least in part on the technician input.

45. The method of claim 44, wherein E comprises:
E1) generating on the at least one display device a touch-screen display graphics user interface (GUI) to receive the technician input.

46. The method of claim 45, wherein the touch-screen display GUI includes at least one popup window.

47. The method of claim 44, wherein the marking apparatus further comprises at least one input device to provide marking information regarding the marking operation, and wherein the method further comprises:
receiving at least some of the marking information from the at least one input device so as to facilitate execution of the process guide; and
storing in the memory the at least some of the marking information received from the at least one input device.

48. The method of claim 47, wherein storing comprises storing in the memory the at least some of the marking information in the technician activity log.

49. The method of claim 47, wherein the at least one input device comprises one or more of:
a location tracking system to provide geographic information and/or timing information;
a timing system to provide timing information;
the marking material detection mechanism to provide marking material information;
at least one environmental sensor to provide environmental information; and
at least one operational sensor to provide operational information,
wherein the marking information includes at least one of the geographic information, the timing information, the marking material information, the environmental information and the operational information.

50. The method of claim 47, further comprising:
making a comparison of the at least some of the marking information and the first ticket information; and
generating at least one alert to the technician based at least in part on the comparison.

51. The method of claim 47, further comprising:
modifying the process guide based at least in part on the at least some of the marking information.

52. The method of claim 33, wherein the apparatus further comprises at least one input device to provide marking information regarding the marking operation, and wherein the method further comprises:
receiving at least some of the marking information from the at least one input device so as to facilitate execution of the process guide without any technician input; and
storing in the memory a technician activity log based at least in part on the at least some of the marking information.

53. The method of claim 52, wherein the at least one input device comprises one or more of:
a location tracking system to provide geographic information and/or timing information;
a timing system to provide timing information;
the marking material detection mechanism to provide marking material information;
at least one environmental sensor to provide environmental information; and
at least one operational sensor to provide operational information,
wherein the marking information includes at least one of the geographic information, the timing information, the marking material information, the environmental information and the operational information.

54. The method of claim 52, further comprising:
making a comparison of the at least some of the marking information and the first ticket information; and
generating at least one alert to the technician based at least in part on the comparison.

55. The method of claim 52, further comprising:
modifying the process guide based at least in part on the at least some of the marking information.

56. At least one non-transitory computer readable storage medium encoded with at least one program including processor-executable instructions that, when executed by a processor, perform a method for facilitating a marking operation performed by a marking apparatus to mark on a ground, pavement, or other surface a presence or an absence of at least one underground facility, the marking apparatus comprising:
an actuator to dispense a marking material so as to form at least one locate mark on the ground, pavement or other surface;
at least one user interface including at least one display device;
at least one communication interface; and
a marking material detection mechanism to detect color information of the marking material,
the method comprising:
A) displaying on the at least one display device of the marking apparatus ticket information derived from at least one locate request ticket pertaining to the marking operation;
B) actuating the actuator to dispense the marking material, based at least in part on the displayed ticket information, so as to form the at least one locate mark on the ground, pavement or other surface to mark the presence or the absence of the at least one underground facility; and
C) receiving the color information of the marking material to determine a type of the at least one underground facility so as to facilitate performing the marking operation based at least in part on a process guide, wherein the ticket information derived from the at least one locate request ticket pertaining to the marking operation includes a process guide for performing the marking operation, and wherein the processor processes the at least one locate request ticket to generate the process guide, the process guide providing guidance that includes a set of instructions and/or prompts to a locate technician for performing the marking operation to mark the presence or the absence of the at least one underground facility.

57. The apparatus of 1, wherein upon execution of the processor-executable instructions, the processor:

facilitates execution of the process guide;

generates an updated process guide during and/or upon completion of the execution of the process guide, the updated process guide based at least in part on technician activity pursuant to the execution of the process guide; and provides process guide information relating to the updated process guide to at least one business application of at least one party associated with the locate and/or marking operation, wherein the process guide information is analyzed and/or used by the at least one business application.

58. The apparatus of claim 57, wherein the at least one business application is implemented on a remote computer, and wherein the processor controls the at least one communication interface so as to transmit to the remote computer the process guide information relating to the updated process guide.

59. A system including the apparatus of claim 58 and the remote computer, wherein the at least one business application includes at least one of:

a technician scheduling and dispatch application;
an employee evaluation application;
a quality assessment application;
a data analysis application;
an excavator notification application;
a risk assessment application;
a ticket approval application; and
a billing application.

60. The method of claim 33, further comprising:

E) executing the process guide;

F) generating an updated process guide during and/or upon completion of E), the updated process guide based at least in part on technician activity pursuant to E); and G) providing process guide information relating to the updated process guide to at least one business application of at least one party associated with the locate and/or marking operation, wherein the process guide information is analyzed and/or used by the at least one business application.

61. The method of claim 60, wherein the at least one business application is implemented on a remote computer, and wherein G) comprises:

transmitting the process guide information relating to the updated process guide to the remote computer.

62. The method of claim 60, wherein the at least one business application includes at least one of:

a technician scheduling and dispatch application;
an employee evaluation application;
a quality assessment application; a data analysis application;
an excavator notification application; a risk assessment application;
a ticket approval application; and a billing application.

* * * * *